United States Patent [19]

Kolnick

[11] Patent Number: 5,062,060

[45] Date of Patent: Oct. 29, 1991

[54] COMPUTER HUMAN INTERFACE COMPRISING USER-ADJUSTABLE WINDOW FOR DISPLAYING OR PRINTING INFORMATION

[75] Inventor: Frank C. Kolnick, Willowdale, Canada

[73] Assignee: Motorola Inc., Schaumburg, Ill.

[21] Appl. No.: 355,092

[22] Filed: May 17, 1989

Related U.S. Application Data

[63] Continuation of Ser. No. 625, Jan. 5, 1987, abandoned.

[51] Int. Cl.[5] .......... G06F 3/14

[52] U.S. Cl. .......... 364/521; 364/518; 340/724; 340/750

[58] Field of Search .......... 370/88, 90, 110 H, 86; 340/825.5, 750; 364/521, 523, 518

[56] References Cited

U.S. PATENT DOCUMENTS

| | | | |
|---|---|---|---|
| 3,534,338 | 10/1970 | Christensen et al. | 364/200 |
| 4,555,775 | 11/1985 | Pike | 364/900 |
| 4,587,633 | 5/1986 | Wang et al. | 364/900 |
| 4,598,384 | 7/1986 | Shaw et al. | 364/900 |
| 4,642,790 | 2/1987 | Minshull et al. | 364/900 |
| 4,694,288 | 9/1987 | Harada | 340/721 |
| 4,694,396 | 9/1987 | Weisshaar et al. | 364/300 |
| 4,714,918 | 12/1987 | Barker et al. | 340/724 |

*Primary Examiner*—Gary V. Harkcom
*Assistant Examiner*—Phu K. Nguyen
*Attorney, Agent, or Firm*—Walter W. Nielsen

[57] ABSTRACT

In a computer human interface an adjustable "window" enables the user to view a portion of an abstract, device-independent "picture" description of information. More than one window can be opened at a time. Each window can be sized independently of another, regardless of the applications running on them. The human interface creates a separate "object" (represented by a process) for each active picture and for each active window. The pictures are completely independent of each other. That is, none is aware of the existence of any other, and any picture can be updated without reference to, and without affect upon, any other. The same is true of windows. Thus the visual entity seen on a user's screen is represented by two objects: a window (distinguished by its frame title, icons, etc.) and a picture which is (partially) visible within the boundaries of the window's frame. Multiple pictures can be updated simultaneously, and windows can be moved around on the screen and their sizes changed without the involvement of other windows or pictures. Also, such operations are performed without involving the application updating the window.

3 Claims, 9 Drawing Sheets

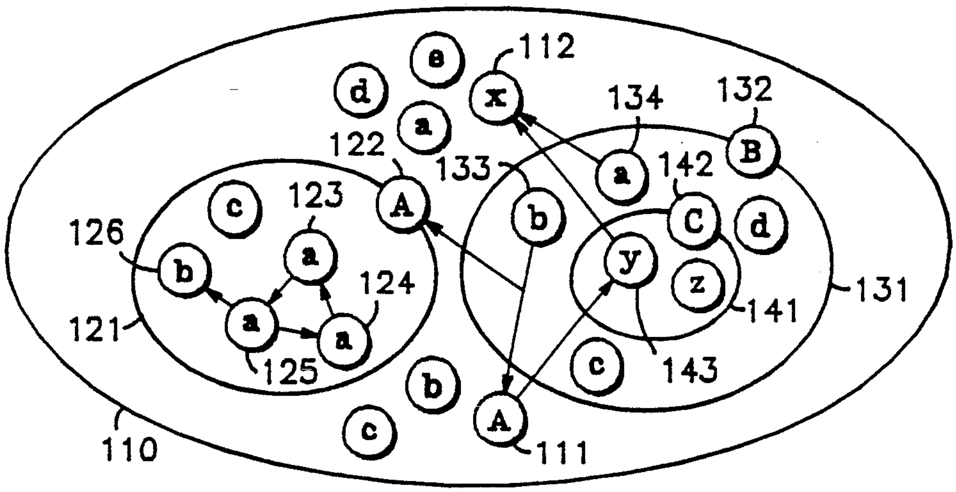
FIG. 5
FIG. 6
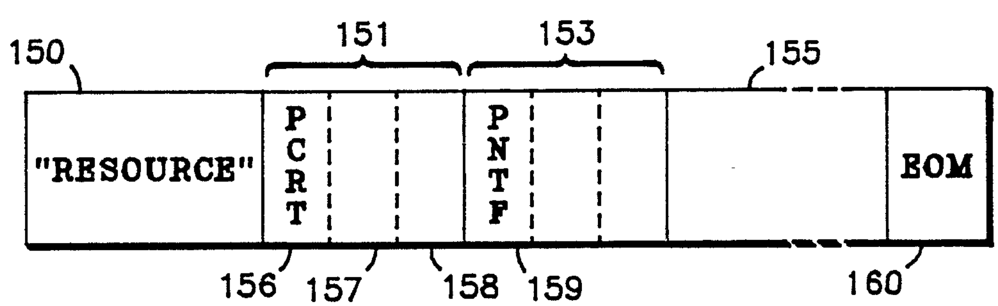

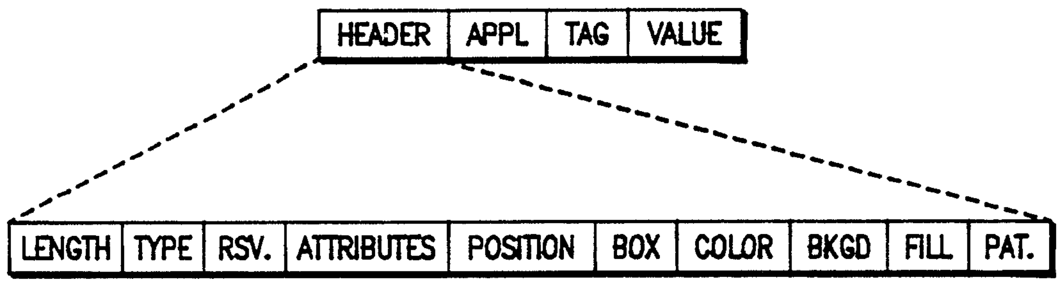
FIG. 10
FIG. 11
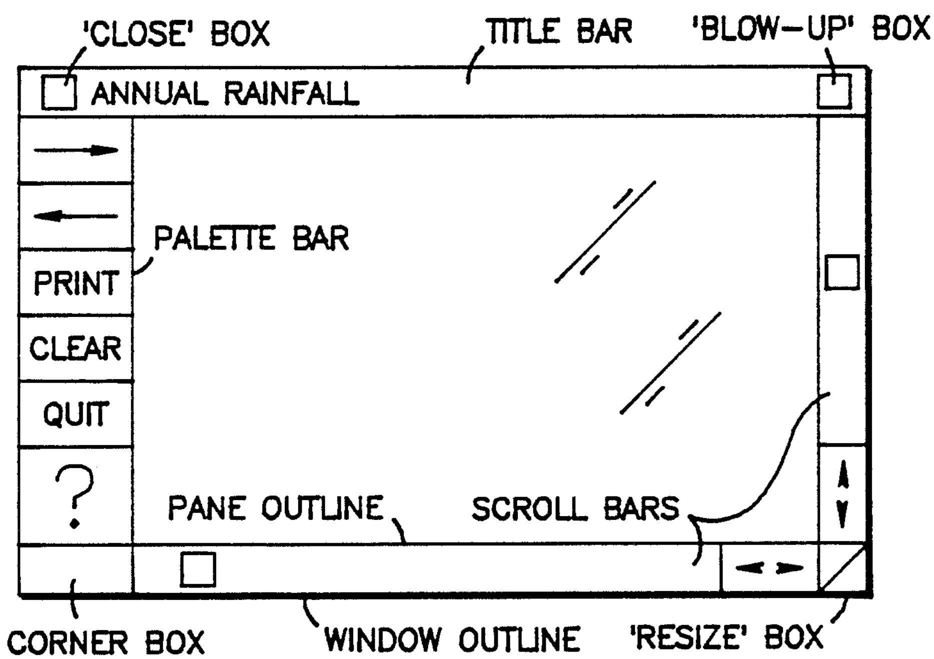

COMPUTER HUMAN INTERFACE COMPRISING USER-ADJUSTABLE WINDOW FOR DISPLAYING OR PRINTING INFORMATION

This application is a continuation of prior application Ser. No. 000,625, filed Jan. 5, 1987 now abandoned.

CROSS REFERENCE TO RELATED APPLICATIONS

The present invention is related to the following inventions, all filed on May 6, 1985, and all assigned to the assignee of the present invention:

1. Title: Nested Contexts in a Virtual Single Machine; Inventors: Andrew Kun, Frank Kolnick, Bruce Mansfield; Ser. No.: 730,903 (now abandoned) and 07/270,437 (now abandoned.)
2. Title: Computer System With Data Residence Transparency and Data Access Transparency; Inventors: Andrew Kun, Frank Kolnick, Bruce Mansfield; Ser. No.: 730.929 (now abandoned), 07/110,614 (now abandoned) and 07/300,687, (now U.S. Pat. No. 5,014,192).
3. Title Network Interface Module With Minimized Data Paths; Inventors: Bernhard Weisshaar, Michael Barnea; Ser. No.: 760,621, now U.S. Pat. No. 4,754,395.
4. Title: Method of Inter-Process Communication in a Distributed Data Processing System; Inventors: Bernhard Weisshaar, Andrew Kun, Frank Kolnick, Bruce Mansfield; Ser. No.: 730.892, now U.S. Pat. No. 4,694,396.
5. Title: Logical Ring in a Virtual Single Machine; Inventor: Andrew Kun, Frank Kolnick, Bruce Mansfield; Ser. No : 730,923 (now abandoned) and Ser. No. 07/183,469 (continuation) and 07/183,469, now U.S. Pat. No. 5,047,925.
6. Title: Virtual Single Machine With Messâge-Like Hardware Interrupts and Processor Exceptions; Inventors: Andrew Kun, Frank Kolnick, Bruce Mansfield; Ser. No.: 730,922, now U.S. Pat. No. 4,835,685.

The present invention is also related to the following inventions, all filed on even date herewith, and all assigned to the assignee of the present invention:

7. Title: Computer Human Interface With Multi-Application Display; Inventor: Frank Kolnick; Ser. No.: 000,625 (now abandoned), and 07/355,092 (continuation).
8. Title: Object-Oriented Software Architecture Supporting Input/Output Device Independence; Inventor: Frank Kolnick; Ser. No.: 000,619 (now abandoned), and 07/361,738 (continuation).
9. Title: Self-Configuration of Nodes in a Distributed Message-Based Operating System; Inventor: Gabor Simor; Ser. No.: 000,621.
10. Title: Process Traps in a Distributed Message-Based Operating System; Inventors: Gabor Simor; Ser. No.: 000,624 (now abandoned 07/336,630 (now abandoned) 07/476,115 (now abandoned, and 07/649, (continuation).
12. Title: Computer Human Interface With Multiple Independent Active Pictures and Windows; Inventor: Frank Kolnick; Ser. No.: 000,626 (now abandoned), and 07/274,674 (now abandoned).

BACKGROUND OF THE INVENTION FIELD OF THE INVENTION

This invention relates generally to digital data processing, and, in particular, to a human interface system in which information is represented in at least one abstract, device-independent picture with a user-adjustable window onto such picture.

DESCRIPTION OF THE RELATED ART

It is known in the data processing arts to provide an output display device in which one or more "windows" present information to the viewer. By means of such windows the user may view portions of several applications (e.g. word-processing, spreadsheet, etc.) simultaneously. However, in the known "windowing" art each window is necessarily of identical size. The ability to size each window independently to any desired dimension is at present unknown.

There is therefore a significant need to be able to provide within the human interface of a data processing operating system the capability of adjusting the sizes of multiple windows independently of one another.

SUMMARY OF INVENTION

Accordingly, it is an object of the present invention to provide a data processing system having an improved human interface.

It is further an object of the present invention to provide an improved data processing system human interface which allows a user to independently adjust the sizes of a plurality of windows appearing on an output device such as a video display unit or printer.

These and other objects are achieved in accordance with a preferred embodiment of the invention by providing a human interface in a data processing system, the interface comprising means for representing information in at least one abstract, device-independent picture, means for generating a first message, such first message comprising size information, and a console manager process responsive to the first message for creating a window onto the one picture, the size of the window being determined by the size information contained in the first message.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

FIG. 5 shows how messages may be sent between processes within nested contexts.

FIG. 6 shows a standard message format used in the distributed data processing system of the present invention.

FIG. 10 shows the general structure of a complete picture element.

FIG. 11 shows the components of a typical screen as contained within the human interface system of the present invention.

DESCRIPTION OF THE PREFERRED EMBODIMENT

The present invention can be implemented either in a single CPU data processing system or in a distributed data processing system—that is, two or more data processing systems (each having at least one processor) which are capable of functioning independently but which are so coupled as to send and receive messages to and from one another.

A Local Area Network (LAN) is an example of a distributed data processing system. A typical LAN comprises a number of autonomous data processing "nodes", each comprising at least a processor and memory. Each node is capable of conducting data processing operations independently In addition, each node is coupled (by appropriate means such as a twisted wire pair, coaxial cable, fiber optic cable, etc.) to a network of other nodes which may be, for example, a loop, star, tree, etc., depending upon the design considerations.

Figure 1:
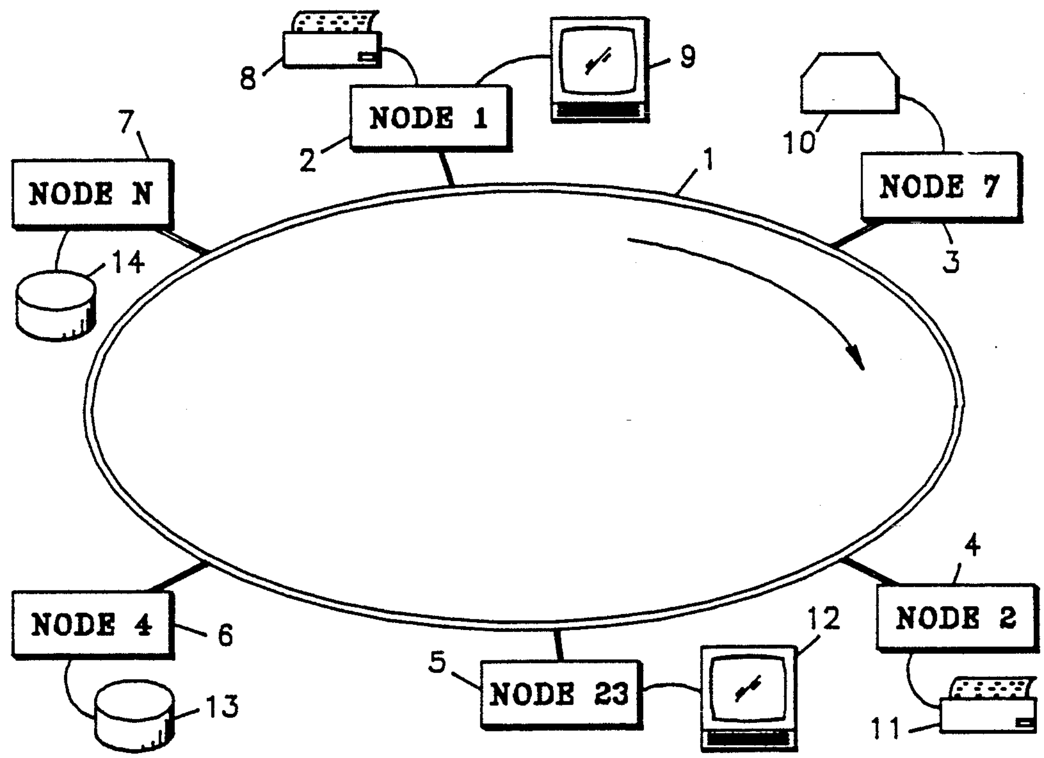
FIG. 1 shows a representational illustration of a single network, distributed message-based data processing system of the type incorporating the present invention.

With reference to FIG. 1, a distributed computer configuration is shown comprising multiple nodes 2–7 (nodes) loosely coupled by a local area network (LAN) 1. The number of nodes which may be connected to the network is arbitrary and depends upon the user application. Each node comprises at least a processor and memory, as will be discussed in greater detail with reference to FIG. 2 below. In addition, each node may also include other units, such as a printer 8, operator display module (ODM) 9, mass memory module 13, and other I/O device 10.

Figure 2:
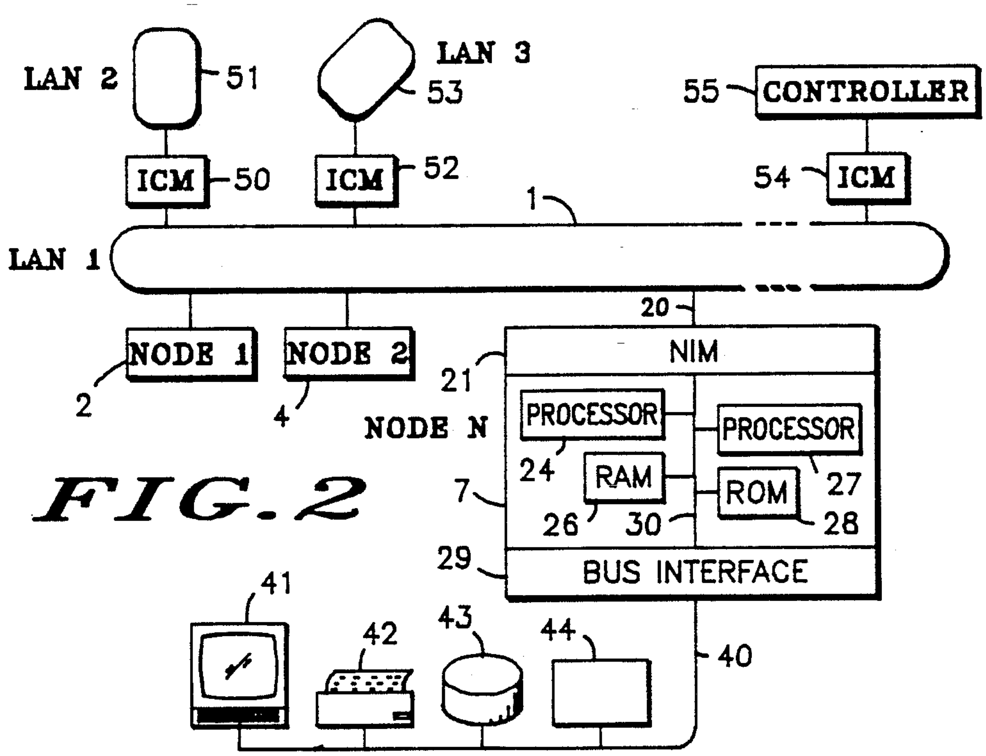
FIG. 2 shows a block diagram illustrating a multiple network, distributed message-based data processing system of the type incorporating the present invention.

With reference now to FIG. 2, a multiple-network distributed computer configuration is shown. A first local area network LAN 1 comprises several nodes 2,4, and 7. LAN 1 is coupled to a second local area network LAN 2 by means of an Intelligent Communications Module (ICM) 50. The Intelligent Communications Module provides a link between the LAN and other networks or remote processors (such as programmable controllers).

LAN 2 may comprise several nodes (not shown) and may operate under the same LAN protocol as that of the present invention, or it may operate under any of several commercially available protocols, such as Ethernet; MAP, the Manufacturing Automation Protocol of General Motors Corp.; Systems Network Architecture (SNA) of International Business Machines, Inc.; SECS-II; etc. Each ICM 50 is programmable for carrying out one of the above-mentioned specific protocols. In addition, the basic processing module of the node itself can be used as an intelligent peripheral controller (IPC) for specialized devices.

LAN 1 is additionally coupled to a third local area network LAN 3 via ICM 52. A process controller 55 is also coupled to LAN 1 via ICM 54.

A representative node N (7, FIG. 2) comprises a processor 24 which, in a preferred embodiment is a processor from the Motorola 68000 family of processors. Each node further includes a read only memory (ROM) 28 and a random access memory (RAM) 26. In addition, each node includes a Network Interface Module (NIM) 21, which connects the node to the LAN, and a Bus Interface 29, which couples the node to additional devices within a node. While a minimal node is capable of supporting two peripheral devices, such as an Operator Display Module (ODM) 41 and an I/O Module 44, additional devices (including additional processors, such as processor 27) can be provided within a node. Other additional devices may comprise, for example, a printer 42, and a mass-storage module 43 which supports a hard disk and a back-up device (floppy disk or streaming tape drive).

The Operator Display Module 41 provides a keyboard and screen to enable an operator to input information and receive visual information.

While a single node may comprise all of the above units, in the typical user application individual nodes will normally be dedicated to specialized functions. For example, one or more mass storage nodes may be set up to function as data base servers. There may also be several operator consoles and at least one node for generating hard-copy printed output. Either these same nodes, or separate dedicated nodes, may execute particular application programs.

The system is particularly designed to provide an integrated solution for office or factory automation, data acquisition, and other real-time applications. As such, it includes a full complement of services, such as a graphical output, windows, menus, icons, dynamic displays, electronic mail, event recording, and file management. Software development features include compilers, a window-oriented editor, a debugger, and performance-monitoring tools.

LOCAL AREA NETWORK

The local area network, as depicted in either FIG. 1 or FIG. 2, ties the entire system together and makes possible the distributed virtual machine model described below. The LAN provides high throughput, guaranteed response, reliability, and low entry cost. The LAN is also autonomous, in the sense that all system and applications software is unaware of its existence. For example, any Network Interface Module (e.g. NIM 21, FIG. 2) could be replaced without rewriting any software other than that which directly drives it.

The LAN interconnection medium may be twisted-pair or coaxial cable. Two channels (logically, two distinct networks) may be provided for reliability and for increased throughput.

The LAN architecture is a logical ring, in which an electronic "token" is constantly passed from node to node at high speed. The current holder of the token may use it to send a "frame" of data or may pass it on to the next node in the ring. The NIM only needs to know the logical address and status of its immediately succeeding neighbor. The NIM's responsibility is limited to detecting the failure of that neighbor or the inclusion of a new neighbor. In general, adjustment to failed or newly added nodes is automatic.

The network interface maps directly into the processor's memory. Data exchange occurs through a dual-ported buffer pool which contains a linked list of pending "frames". Logical messages, which vary in length, are broken into fixed-size frames for transmission and are reassembled by the receiving NIM. Frames are sequence-numbered for this purpose. If a frame is not acknowledged within a short period of time, it is retransmitted a number of times before being treated as a failure.

As described above with reference to FIG. 2, the LAN may be connected to other LAN's operating under the same LAN protocol via so-called "bridgeways", or it may be connected to other types of LAN's via "gateways".

SOFTWARE MODEL

The computer operating system of the present invention operates upon processes, messages, and contexts, as such terms are defined herein. Thus this operating system offers the programmer a hardware abstraction, rather than a data or control abstraction.

A "process", as used within the present invention, is defined as a self-contained package of data and executable procedures which operate on that data, comparable to a "task" in other known systems. Within the present invention a process can be thought of as comparable to a subroutine in terms of size, complexity, and the way it is used. The difference between processes and subroutines is that processes can be created and destroyed dynamically and can execute concurrently with their creator and other "subroutines".

Within a process, as used in the present invention, the data is totally private and cannot be accessed from the outside, i e.. by other processes. Processes can therefore be used to implement "objects", "modules", or other higher-level data abstractions. Each process executes sequentially. Concurrency is achieved through multiple processes, possibly executing on multiple processors.

Every process in the distributed data processing system of the present invention has a unique identifier (PID) by which it can be referenced. The PID is assigned by the system when the process is created, and it is used by the system to physically locate the process.

Every process also has a non-unique, symbolic "name", which is a variable-length string of characters. In general the name of a process is known system-wide. To restrict the scope of names, the present invention utilizes the concept of a "context".

A "context" is simply a collection of related processes whose names are not known outside of the context. Contexts partition the name space into smaller, more manageable subsystems. They also "hide" names, ensuring that processes contained in them do not unintentionally conflict with those in other contexts.

A process in one context cannot explicitly communicate with, and does not know about, processes inside other contexts. All interaction across context boundaries must be through a "context process", thus providing a degree of security. The context process often acts as a switchboard for incoming messages, rerouting them to the appropriate sub-processes in its context.

A context process behaves like any other process and additionally has the property that any processes which it creates are known only to itself and to each other. Creation of the process constitutes definition of a new context with the same name as the process.

Any process can create context processes. Each new context thus defined is completely contained inside the context in which it was created and therefore is shielded from outside reference. This "nesting" allows the name space to be structured hierarchically to any desired depth.

Conceptually, the highest level in the hierarchy is the system itself, which encompasses all contexts. Nesting is used in top-down design to break a system into components or "layers", where each layer is more detailed than the preceding one. This is analogous to breaking a task down into subroutines, and in fact many applications which are single tasks on known systems may translate to multiple processes in nested contexts.

A "message" is a buffer containing data which tells a process what to do and may supply it with information it needs co carry out its operation. Each message buffer can have a different length (up to 64 kilobytes). By convention, the first field in the message buffer defines the type of message (e.g., "read", "print", "status", "event", etc.).

Messages are queued from one process to another by name or PID. Queuing avoids potential synchronization problems and is used instead of semaphores, monitors, etc. The sender of a message is free to continue after the message is sent. When the receiver attempts to get a message, it will be suspended until one arrives if none are already waiting in its queue. Optionally, the sender can specify that it wants to wait for a reply and is suspended until that specific message arrives. Messages from any other source are not dequeued until after that happens.

Within the present invention, messages are the only way for two processes to exchange data. There is no concept of a "global variable". Shared memory areas are not allowed, other than through processes which essentially "manage" each area by means of messages. Messages are also the only form of dynamic memory that the system handles. A request to allocate memory therefore returns a block of memory which can be used locally by the process but can also be transmitted to another process.

The context nesting level determines the "scope of reference" when sending messages between processes by name. From a given process, a message may be sent to all processes at its own level (i.e., in the same context) and (optionally) to any arbitrary higher level. The contexts are searched from the current context upward until a match is found. All processes with the given name at that level are then sent a copy of the message. A process may also send a message to itself or to its parent (the context process) without knowing either name explicitly, permitting multiple instances of a process to exist in different contexts, with different names.

Sending messages by PID obviates the need for a name search and ignores context boundaries. This is the most efficient method of communicating.

Processes are referenced without regard to their physical location via a small set of message-passing primitives. As mentioned earlier, every process has both a unique system-generated identifier and a not necessarily unique name assigned by the programmer. The identifier provides quick direct access, while the name has a limited scope and provides symbolic, indirect access.

Figure 3:
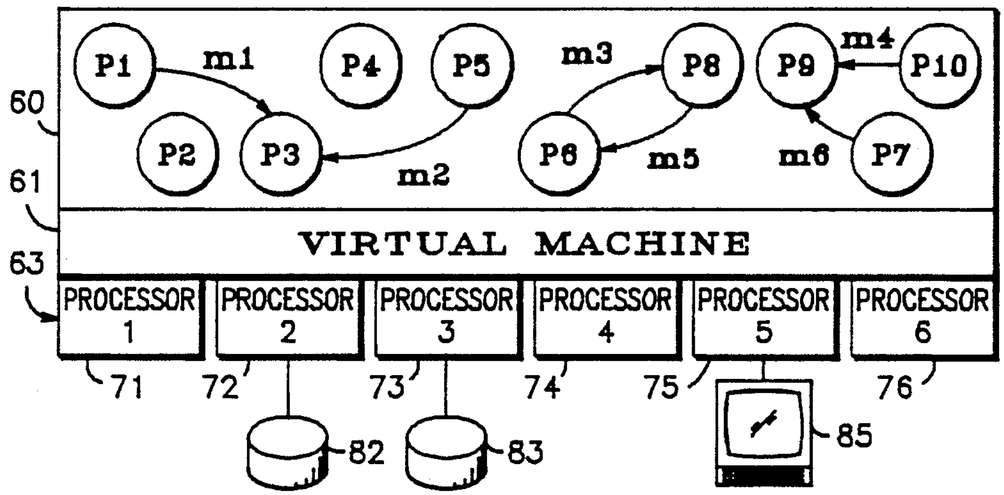
FIG. 3 shows an architectural model of a data processing system of the type incorporating the present invention.

With reference to FIG. 3, an architectural model of the present invention is shown. The bottom, or hardware, layer 63 comprises a number of processors 71–76, as described above. The processors 71–76 may exist physically within one or more nodes. The top, or software layer 60 illustrates a number of processes P1–P10 which send messages m1–m6 to each other. The middle layer 61, labelled "virtual machine", isolates the hardware from the software, and it allows programs to be written as if they were going to be executed on a single processor. Conversely, programs can be distributed across multiple processors without having been explicitly designed for that purpose.

THE VIRTUAL MACHINE

As discussed earlier, a "process" is a self-contained package of data and executable procedures which operate on that data. The data is totally private and cannot be accessed by other processes. There is no concept of shared memory within the present invention. Execution of a process is strictly sequential. Multiple processes execute concurrently and must be scheduled by the operating system. The processes can be re-entrant, in which case only one copy of the code is loaded even if multiple instances are active.

Every process has a unique "process identifier number" (PID) by which it can be referenced. The PID is assigned by the system when the process is created and remains in effect until the process terminates. The PID assignment contains a randomizing factor which guarantees that the PID will not be re-used in the near future. The contents of the PID are irrelevant to the programmer but are used by the virtual machine to physically locate the process. A PID may be thought of as a "pointer" to a process.

Every process also has a "name" which is a variable-length string of characters assigned by the programmer A name need not be unique, and this ambiguity may be used to add new services transparently and to aid in fault-tolerance.

Figure 4:
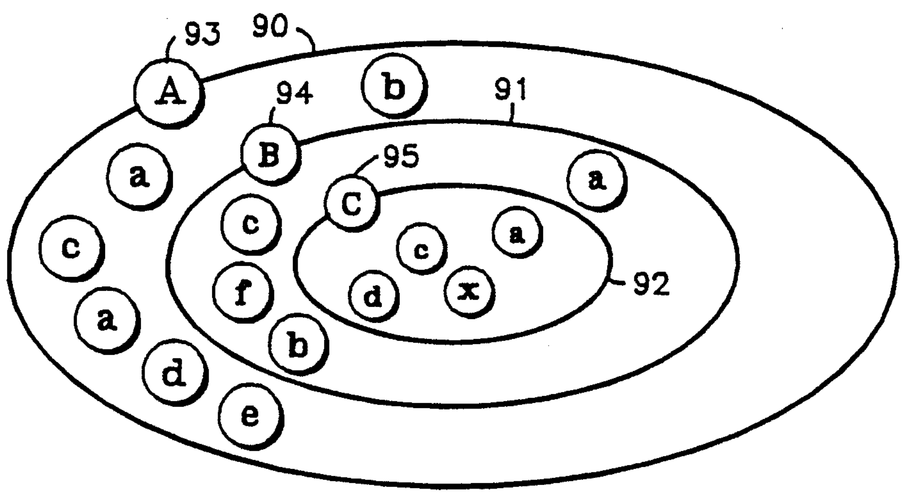
FIG. 4 shows the relationship between software contexts and processes as they relate to the data processing system of the present invention.

FIG. 4 illustrates that the system-wide name space is partitioned into distinct subsets by means of "contexts" identified by reference numerals 90–92. A context is simply a collection of related processes whose names are not known outside of the context. Context 90, for example, contains processes A, a, a, b, c, d, and e. Context 91 contains processes B, a, b, c, and f. And context 92 contains processes C, a, c, d, and x.

One particular process in each context called the "context process", is known both within the context and within the immediately enclosing one (referred to as its "parent context"). In the example illustrated in FIG. 4, processes A–C are context processes for contexts 90–92, respectively. The parent context of context 91 is context 90, and the parent context of context 92 is context 91. Conceptually, the context process is located on the boundary of the context and acts as a gate into it.

Processes inside context 92 can reference any processes inside contexts 90 and 91 by name. However, processes in context 91 can only access processes in context 92 by going through the context process C. Processes in context 90 can only access processes in context 92 by going through context processes B and C.

The function of the context process is to filter incoming messages and either reject them or reroute them to other processes in its context. Contexts may be nested, allowing a hierarchy of abstractions to be constructed. A context must reside completely on one node. The entire system is treated as an all-encompassing context which is always present and which is the highest level in the hierarchy. In essence, contexts define localized protection domains and greatly reduce the chances of unintentional naming conflicts.

If appropriate, a process inside one context can be "connected" to one inside another context by exchanging PID's, once contact has been established through one or the other of the context processes. Most process servers within the present invention function that way. Initial access is by name. Once the desired function (such as a window or file) is "opened", the user process and the service communicate directly via PID's.

A "message" is a variable-length buffer (limited only by the processor's physical memory size) which carries information between processes. A header, inaccessible to the programmer, contains the destination name and the sender's PID. By convention, the first field in a message is a null-terminated string which defines the type of message (e.g., "read", "status", etc.) Messages are queued to the receiving process when they are sent. Queuing ensures serial access and is used in preference to semaphores, monitors, etc.

Messages provide the mechanism by which hardware transparency is achieved. A process located anywhere in the system may send a message to any other process anywhere else in the system (even on another processor) if it knows the process name. This means that processes can be dynamically distributed across the system at any time to gain optimal throughput without changing the processes which reference them. Resolution of destinations is done by searching the process name space.

Transparency applies with some restrictions across bridgeways (i.e., the interfaces between LAN's operating under identical network protocols) and, in general, not at all across gateways (i e., the interfaces between LAN's operating under different network protocols) due to performance degradation. However, they could so operate, depending upon the required level of performance.

INTER-PROCESS COMMUNICATION

All inter-process communication is via messages. Consequently, most of the virtual machine primitives are concerned with processing messages. The virtual machine kernel primitives are the following:

ALLOC—requests allocation of a (message) buffer of a given size.

FREE—requests deallocation of a given message buffer.

PUT—end a message to a given destination (by name or PID).

GET—wait for and dequeue the next incoming message, optionally from a specific process (by PID).

FORWARD—pass a received message through to another process.

CALL—send a message, then wait for and dequeue the reply.

REPLY—send a message to the originator of a given message.

ANY_MSG—returns "true" if the receive queue is not empty, else returns "false"; optionally, checks if any messages from a specific PID are queued.

To further describe the function of the kernel primitives, ALLOC handles all memory allocations. It returns a pointer to a buffer which can be used for local storage within the process or which can be sent to another process (via PUT, etc.). ALLOC never "fails", but rather waits until enough memory is freed to satisfy the request.

The PUT primitive queues a message to another process. The sending process resumes execution as soon as the message is queued.

FORWARD is used to quickly reroute a message but maintain information about the original sender (whereas PUT always makes the sending process the originator of the message).

REPLY sends a message to the originator of a previously received message, rather than by name or PID.

CALL essentially implements remote subroutine invocations, causing the caller to suspend until the receiver executes a REPLY. Subsequently, the replied message is dequeued out of sequence, immediately upon arrival, and the caller resumes execution.

The emphasis is on concurrency, so that as many processes as possible are executed in parallel. Hence neither PUT nor FORWARD waits for the message to be delivered. Conversely, GET suspends a process until a message arrives and dequeues it in one operation. The ANY_MSG primitive is provided so that a process may determine whether there is anything of interest in the queue before committing itself to a GET.

When a message is sent by name, the destination process must be found in the name space. The search path is determined by the nesting of the contexts in which the sending process resides. From a given process, a message can be sent to all processes in its own context or (optionally) to those in any higher context. Refer to FIG. 5. The contexts are searched from the current one upward until a match is found or until the system context is reached. All processes with the same name in that context are then queued a copy of the message.

For example, with reference to FIG. 5, assume that in context 141 process y sends a message to ALL processes by the name x. Process y first searches within its own context 141 but finds no process x. The process y searches within the next higher context 131 (its parent context) but again finds no process x. Then process y searches within the next higher context 110 and finds a process x, identified by reference numeral 112. Since it is the only process x in context 110, it is the only recipient of the message from process y.

If process a in context 131 sends a message to ALL processes by the name x, it first searches within its own context 131 and, finding no processes x there, it then searches within context 110 and finds process x.

Assume that process b in context 131 sends a message to ALL processes by the name A. It would find process A (111) in context 110, as well as process A (122) which is the context process for context 121.

A process may also send a message to itself or to its context process without knowing either name explicitly.

The concept of a "logical ring" (analogous to a LAN) allows a message to be sent to the NEXT process in the system with a given name. The message goes to exactly one process in the sender's context, if such a process exists. Otherwise the parent context is searched.

The virtual machine guarantees that each NEXT transmission will reach a different process and that eventually a transmission will be sent to the logically "first" process (the one that sent the original message) in the ring, completing the loop. In other words, all processes with the same name at the same level can communicate with each other without knowing how many there are or where they are located. The logical ring is essential for distributing services such as a data base. The ordering of processes in the ring is not predictable.

For example, if process a (125) in context 121 sends a message to process a using the NEXT primitive, the search finds a first process a (124) in the same context 121. Process a (124) is marked as having received the message, and then process a (124) sends the message on to the NEXT process a (123) in context 121. Process a (123) is marked as having received the message, and then it sends the message on to the NEXT process a, which is the original sender process a (125), which knows not to send it further on, since it's been marked as having already received the message.

Sending messages directly by PID obviates the need for a name search and ignores context boundaries. This is known as the DIRECT mode of transmission and is the most efficient. For example, process A (111) sends a message in the DIRECT mode to process y in context 141.

If a process sends a message in the LOCAL transmission mode, it sends it only to a process having the given name in the sender's own context.

In summary, including the DIRECT transmission mode, there are five transmission modes which can be used with the PUT, FORWARD, and CALL primitives:

ALL—to all processes with the given name in the first context which contains that name, starting with the sender's context and searching upwards through all parent contexts.

LOCAL—to all processes with the given name in the sender's context only.

NEXT—to the next process with the given name in the same context as the sender, if any; otherwise it searches upwards through all parent contexts until the name is found.

LEVEL—sends to "self" (the sending process) or to "context" (the context process corresponding to the sender's context); "self" cannot be used with CALL primitive.

DIRECT—sent by PID.

Messages are usually transmitted by queueing a pointer to the buffer containing the message. A message is only copied when there are multiple destinations or when the destination is on another node.

OPERATING SYSTEM

The operating system of the present invention consists of a kernel, which implements the primitives described above, plus a set of processes which provide process creation and termination, time management (set time, set alarm, etc.) and which perform node start-up and configuration. Drivers for devices are also implemented as processes (EESP's), as described above. This allows both system services and device drivers to be added or replaced easily. The operating system also supports swapping and paging, although both are invisible to applications software.

Unlike known distributed computer systems, that of the present invention does not use a distinct "name server" process to resolve names. Name searching is confined to the kernel, which has the advantage of being much faster.

A minimal bootstrap program resides permanently (in ROM) on every node, e.g. ROM 28 in node N of FIG. 2. The bootstrap program executes automatically when a node is powered up and begins by performing basic on-board diagnostics. It then attempts to find and start an initial system code module. The module is sought on the first disk drive on the node, if any. If there isn't a disk, and the node is on the LAN, a message will be sent out requesting the module. Failing that, the required software must be resident in ROM. The initialization program of the kernel sets up all of the kernel's internal tables and then calls a predefined entry point of the process.

In general, there exists a template file describing the initial software and hardware for each node in the system. The template defines a set of initial processes (usually one per service) which are scheduled immediately after the node start-up. These processes then start up their respective subsystems. A node configuration service on each node sends configuration messages to each subsystem when it is being initialized, informing it of the devices it owns. Thereafter, similar messages are sent whenever a new device is added to the node or a device fails or is removed from the node.

Thus there is no well-defined meaning for "system up" or "system down"—as long as any node is active, the system as a whole may be considered to be "up". Nodes can be shut down or started up dynamically without affecting other nodes on the network. The same principle applies, in a limited sense, to peripherals. Devices which can identify themselves with regard to type, model number, etc. can be added or removed without operator intervention.

FIG. 6 shows the standard format of a message in a distributed data processing system of the type incorporating the present invention. The message format comprises a message i.d. portion 150; one or more "triples" 151, 153, and 155; and an end-of-message portion 160. Each "triple" comprises a group of three fields, such as fields 156–158.

The first field 156 of "triple" 151, designated the PCRT field, represents the name of the process to be created. The second field 157 of "triple" 151 gives the size of the data field. The third field 158 is the data field.

The first field 159 of "triple" 153, designated the PNTF field, represents the name of the process to notify when the process specified in the PCRT field has been created.

A message can have any number of "triples", and there can be multiple "triples" in the same message containing PCRT and PNTF fields, since several processes may have to be created (i.e. forming a context, as described hereinabove) for the same resource.

As presently implemented, portion 150 is 16 bytes in length, field 156 is 4 bytes, field 157 is 4 bytes, field 158 is variable in length, and EOM portion 160 is 4 bytes.

HUMAN INTERFACE—GENERAL

The Human Interface of the present invention provides a set of tools with which an end user can construct a package specific to his applications requirements. Such a package is referred to as a "metaphor", since it reflects the user's particular view of the system. Multiple metaphors can be supported concurrently. One representative metaphor is, for example, a software development environment.

The purpose of the Human Interface is to allow consistent, integrated access to the data and functions available in the system. Since users' perceptions of the system are based largely on the way they interact with it, it is important to provide an interface with which they feel comfortable. The Human Interface allows a systems designer to create a model consisting of objects that are familiar to the end user and a set of actions that can be applied to them.

The fundamental concept of the Human Interface is that of the "picture". All visually-oriented information, regardless of interpretation, is represented by pictures. A picture (such as a diagram, report, menu, icon, etc ) is defined in a device-independent format which is recognized and manipulated by all programs in the Human Interface and all programs using the Human Interface. It consists of "picture elements", such as "line", "arc", and "text", which can be stored compactly and transferred efficiently between processes. All elements have common attributes like color and fill pattern. Most also have type-specific attributes, such as typeface and style for text. Pictures are drawn in a large "world" co-ordinate system composed of "virtual pixels".

Because all data is in the form of pictures, segments of data can be freely copied between applications. e.g., from a live display to a word processor. No intermediate format or conversion is required. One consequence of this is that the end user or original equipment manufacturer (OEM) has complete flexibility in defining the formats of windows, menus, icons, error messages, help pages, etc. All such pictures are stored in a library rather than being built into the software and so are changeable at any time without reprogramming. A comprehensive editor is available to define and modify pictures on-line.

All interaction with the user's environment is through either "virtual input" or "virtual output" devices. A virtual input device accepts keyboards, mice, light pens, analog dials, pushbuttons, etc. and translates them into text, cursor-positioning, action, dial, switch, and number messages. All physical input devices must map into this set of standard messages. Only one process, an input manager for the specific device, is responsible for performing the translation. Other processes can then deal with the input without being dependent on its source.

Similarly, a virtual output manager translates standard output messages to the physical representation appropriate to a specific device (screen, printer, plotter, etc.) A picture drawn on any terminal or by a process can be displayed or printed on any device, subject to the physical limitations of that device.

Figure 7:
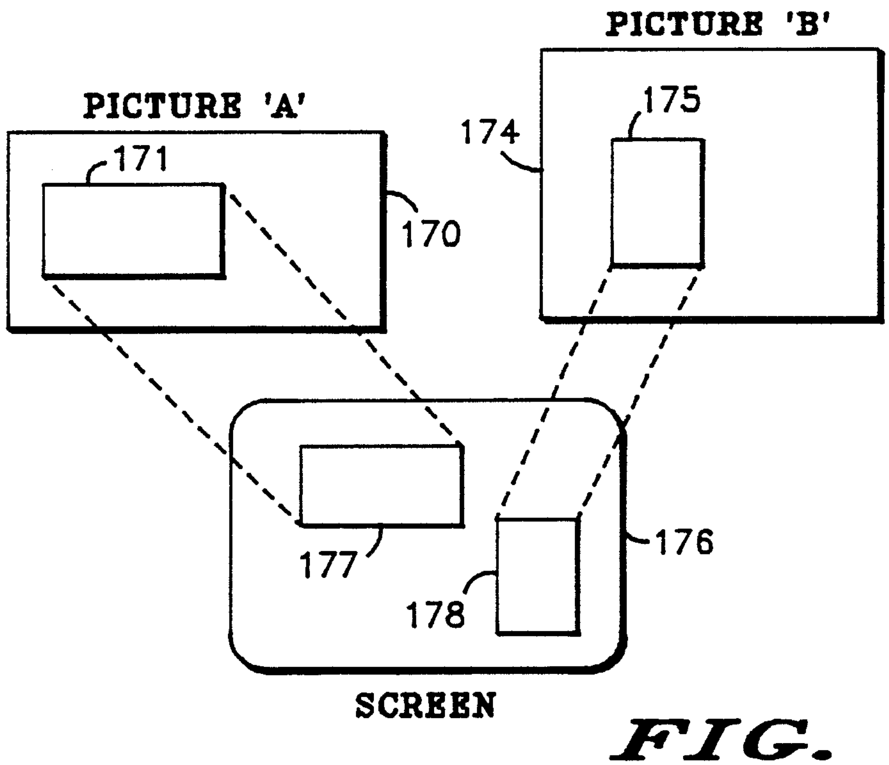
FIG. 7 shows the relationship between pictures, views, and windows in the human interface of a data processing system of the type incorporating the present invention.

With reference to FIG. 7, two "pictures " are illustrated—picture A (170) and picture B (174).

The concept of a "view" is used to map a particular rectangular area of a picture to a particular device. In FIG. 7, picture A is illustrated as containing at least one view 171, and picture B contains at least one view 175. Views can be used, for example, to partition a screen for multiple applications or to extract page-sized subsets of a picture for printing.

If the view appears on a screen it is contained in a "window". With reference again to FIG. 7, view 171 of picture A is mapped to screen 176 as window 177, and view 175 of picture B is mapped as window 178.

The Human Interface allows the user to dynamically change the size of the window, move the window around on the screen, and move the picture under the window to view different parts of it (i.e., scroll in any direction). If a picture which is mapped to one or more windows changes, all affected views of that picture on all screens are automatically updated. There is no logical limit to the number or sizes of windows on a particular screen. Since the system is distributed, it's natural for pictures and windows to be on different nodes. For example, several alarm displays can share a single, common picture.

The primary mechanism for interacting with the Human Interface is to move the cursor to the desired object and "select" it by pressing a key or button. An action may be performed automatically upon selection or by further interaction, often using menus. For example, selecting an icon usually activates the corresponding application immediately. Selecting a piece of text is often followed by selection of a common such as "cut" or "underline". Actions can be dynamically mapped to function keys on a keyboard so that pressing a key is equivalent to selecting an icon or a menu item. A given set of cursors (the cursor changes as it moves from one application picture to another), windows, menus, icons, and function keys define a "metaphor".

The Human Interface builds on the above concepts to provide a set of distributed services. These include electronic mail, which allows two or more users at different terminals to communicate with each other in real time or to queue files for later delivery, and a forms manager for data entry. A subclass of windows called "virtual terminals" provides emulation of standard commercially available terminals.

Figure 8:
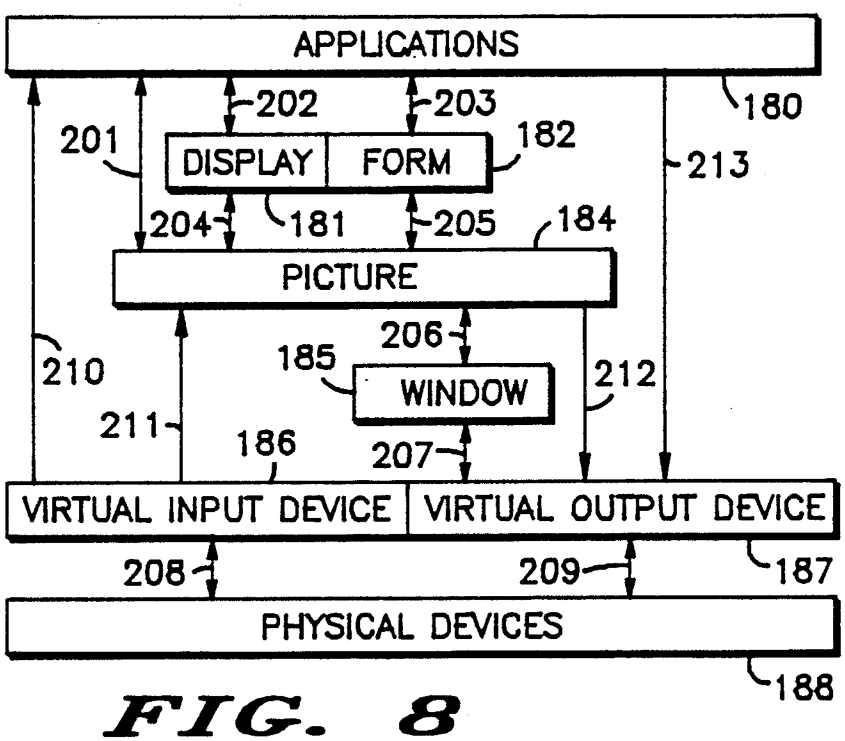
FIG. 8 shows a conceptual view of the different levels of human interface within a data processing system incorporating the present invention.

FIG. 8 shows the different levels of the Human Interface and data flow through them. Arrows 201-209 indicate the most common paths, while arrows 210-213 indicate additional paths. The interface can be configured to leave out unneeded layers for customized applications. The philosophy behind the Human Interface design dictates one process per object. That is, a process is created for each active window, picture, input or output device, etc. As a result, the processes are simplified and can be distributed across nodes almost arbitrarily.

MULTIPLE INDEPENDENT PICTURES AND WINDOWS

A picture is not associated with any particular device, and it is of virtually unlimited size. A "window" is used to extract a specified rectangular area—called a "view'"—of picture information from a picture and pass this data to a virtual output manager.

The pictures are completely independent of each other. That is, none is aware of the existence of any other, and any picture can be updated without reference to, and without affect upon, any other. The same is true of windows.

Thus the visual entity seen on the screen is really represented by two objects: a window (distinguished by its frame title, scroll bars, etc.), and a picture, which is (partially) visible within the boundaries of the window's frame.

As a consequence of this autonomy, multiple pictures can be updated simultaneously, and windows can be moved around on the screen and their sizes changed without the involvement of other windows or pictures.

Also, such operations are done without the involvement of the application which is updating the window. For example, if the size of a window is increased to look at a larger area of the picture, this is handled completely within the human interface.

HUMAN INTERFACE—PRIMARY FEATURES

The purpose of the Human Interface is to transform machine readable data into human-readable data and vice versa. In so doing the Human Interface provides a number of key services which have been integrated to allow users to interact with the system in a natural and consistent manner. These features will now be discussed.

Device Independence—The Human Interface treats all devices (screens, printers, etc.) as "virtual devices". None of the text, graphics, etc. in the system are tied to any particular hardware configuration. As a result such representations can be entered from any "input" device and displayed on any "output" device without modification. The details of particular hardware idiosyncracies are hidden in low-level device managers all of which have the same interface to the Human Interface software.

Picture Drawing—The Human Interface can draw "pictures" composed of any number of geometric elements, such as lines, circles, rectangles, etc., as well as any arbitrary shape defined by the user. Each element can have its own color and line thickness. In addition closed figures may be filled in with a particular shading pattern in any given color. A picture can be of almost any size. All output from the Human Interface to a user is via pictures, and all input from a user to the Human Interface is stored as pictures, so that there is only one representation of data within the Human Interface.

Text can be freely intermixed with graphical images so that the user need only learn one "editor" to do his job. Consequently it is not necessary to switch between editors or "cut and paste" between pictures. Text characters can be selected from a large predefined character set, which includes mathematical and Greek symbols, among others, and can be typed in a wide variety of fonts, colors, sizes and styles (e.g. bold, italic, or underlined). It is also possible for a user to define his own symbols and add them to the character set.

Windowing—The Human Interface allows the user to partition a screen into as many "sub-screens" or "windows" as required to view the information he desires. The Human Interface places no restrictions on the contents of such windows, and all windows can be simultaneously updated in real time with data from any number of concurrently executing programs. Any picture can be displayed, created, or modified ("edited") in any window Also any window can be expanded or contracted, or it can be moved to a new location on the screen at any time.

If the current picture is larger than the current window, the window can be scrolled over the picture, usually in increments of a "line" or a "page". It is also possible to temporarily expand or contract the visible portion of the picture ("zoom in" or "zoom out") without changing the window's dimensions and without changing the actual picture.

Dialog Management—The Human Interface is independent of any particular language or visual representation. That is, there are no built-in titles, menus, error messages, help text, icons, etc. for interacting with the system. All such information is stored as pictures which can be modified to suit the end user's requirements, either prior to or after installation. The user can modify the supplied dialog with his own at any time.

Data Entry—The Human Interface provides a generalized interface between the user and any program (such as a data base manager) which requires data from the user. The service is called "forms management", because a given data structure is displayed as a fill-in-the-blanks type of "form" consisting of numerous modifiable fields with descriptive labels. The Human Interface form is interactive, so that data can be verified as it is entered, and the system can assist the user by displaying explanatory text when appropriate (on demand or as a result of an error).

Communication Between Users—The Human Interface permits two or more users to "converse" with each other in real time or to send "mail" to each other. Conversation is performed through a window on each of the user's screens. Mail is sent by creating a picture (text or diagrams or a combination thereof) and specifying a destination. The destination may be one particular user, a group of users, or all users in the system (i.e. a "broadcast"). Transmission may be immediate or delayed until a given date and time or until the given user(s) sign onto the system. When mail arrives at the destination, the receiving user is informed and may then read, save, print, or erase the picture.

Event Management—The Human Interface can record any arbitrary event for future reference. The Human Interface defines a simple, yet flexible grammar for forming "sentences" which describe events and which the Human Interface can use to parse in order to manipulate events for specific requests. For example, events can be dynamically displayed on a screen by time and/or priority, or they can be scanned for a particular "subject" or "object" or any other attribute. Each event can be time-stamped by the sender; if not, it is automatically time-stamped upon receipt.

The Human Interface records all of its own actions, such as printing a report or signing-on a user, and it provides this service to any applications program. In addition, the Human Interface can be requested to trigger any given action upon the occurrence of any given event, thus providing a kind of closed-loop control service to applications.

Modularity—The Human Interface comprises a number of separate software components which can be replicated and distributed throughout the hardware configuration to achieve optimal performance. For example, each time a new "console" (for example, keyboard plus screen) is connected to the system, a new "Console" component is created to manage it. There is no logical limit to the number of consoles that the Human Interface can handle. In general the relevant software component is located close to the hardware or other resources on which it most depends.

HUMAN INTERFACE—BASIC COMPONENTS

The Human Interface comprises the following basic components:

Console Manager—It is the central component of a Console context and consequently is the only manager which knows all about its particular "console". It is therefore aware of all screens and keyboards, all windows, and all pictures. Its primary responsibility is to coordinate the activities of the context. This consists of starting up the console (initializing the device managers, etc.) creating and destroying pictures, and allocating and controlling windows for processes in the Human Interface and elsewhere. Thus all access to a console must be indirect, through the relevant Console Manager.

The Console Manager also implements the first level of Human Interface interaction, via menus, prompts, etc., so that applications processes don't have to. Rather than using built-in text and icons, it depends upon the Dialog Manager to provide it with the visible features of the system. Thus all cultural and user idiosyncracies (such as language) are hidden from the rest of the Human Interface.

A Console Manager knows about the following processes: the Output Manager(s) in its context, the Input Manager in its context, the Window Managers in its context, the Picture Managers in its context, and the Dialog Manager in its context. The following processes know about the Console Manager: any one that wants to.

When a Console Manager is started, it waits for the basic processes needed to communicate with the user to start up and "sign on". It this is successful, it is ready to talk to users and other processes (i.e., accept messages from the Input Manager and other processes). All other permanent processes in the context (Dialog, etc.) are assumed to be activated by the system start-up procedure. The "In" and "Cursor" processes (see "Input Manager" and "Output Manager" below) are created by the Console Manager at this time.

The Console Manager generally clears the entire screen and displays appropriate status text during the course of the start-up (by sending picture elements directly to its Output Manager(s)). If any part of the start-up fails, it displays appropriate "error" text and possibly waits for corrective action from a user.

The Console Manager views the screen as being composed of blank (unused) space, windows, and icons. Whenever an input character is received, the Console Manager determines how to handle it depending upon the location of the cursor and the type of input, as follows:

A. Requests to create or eliminate a window are handled within the Console Manager. A window may be opened anywhere on the screen, even on top of another window. A new Picture Manager and possibly a Window Manager may be created as a result, and one or more new messages may be generated and sent to them, or the manager(s) may be told to quit.

B. Icons can only be selected, then moved or opened. The Console Manager handles selection and movement directly. It sends notification of an "open" to the Dialog Manager, which sends a notification to the application process associated with the icon and possibly opens a default window for it.

C. For window-dependent actions, if the cursor is outside all windows, the input is illegal, and the Console Manager informs the user; otherwise the input is accepted. Request which affect the window itself (such as "scroll" or "zoom") are handled directly by the Console Manager. A "select" request is pre-checked, the relevant picture elements are selected (by sending a message to the relevant Picture Manager), and the message is passed on to the process currently responsible for the window. All other inputs are passed directly to the responsible process without being pre-checked.

If the cursor is on a window's frame, the only valid actions are to move, close, or change the dimensions of the window, or select an object in the frame (such as a menu or a scroll bar). These are handled directly by the Console Manager.

D. Requests for Human Interface services not in the Console context are treated as errors.

A new window is opened by creating a new Window Manager process and telling it its dimensions and the location of its upper left corner on the screen. It must also be given the PID of a Picture Manager and the coordinates of the part of the picture it is to display, along with the dimensions of a "clipping polygon", if that information is available. (It is not possible to create a window without a picture.) The type and contents of the window frame are also specified. Any of these parameters may be changed at any time.

A new instance of a picture is created by creating a new Picture Manager process with the appropriate name and, optionally, telling it the name of a "file" from which to get its picture elements. If a file is not provided, an "empty" picture is created, with the expectation that picture-drawing requests will fill it in.

Menus, prompts, help messages, error text, and icons are simply predefined pictures (provided through the Dialog Manager) which the Console Manager uses to interact with users. They can therefore be created and edited to meet the requirements of any particular system the same way any picture can be created and edited. Menus and help text are usually displayed on request, although they may sometimes be a result of another operation.

Prompts are displayed when the system needs information from the user. Error text is displayed whenever the user tries to do something that is illegal or when the system is having problems of its own (e.g. "printer out of paper"). Icons are displayed by the Console Manager automatically when a specific frame of reference is requested by the user. The Console Manager may also display informational messages (such as "console starting up") which are automatically erased when the associated action is finished.

Picture Manager—It is created when a picture is built, and it exits when the picture is no longer required. There is one Picture Manager per picture. The Picture Manager constructs a device-independent representation of a picture using a small set of elemental "picture elements" and controls modification and retrieval of the elements.

A Picture Manager knows about the following processes: the process which created it, and the Draw Manager. The following processes know about the Picture Manager: the Console Manager in the same context, and Window Managers in the same context.

A Picture Manager is created to handle exactly one picture, and it need only be created when that picture is being accessed. It can be told to quit at any time, deleting its representation of the picture. Some other process must copy the picture to a file if it needs to be saved.

When a Picture Manager first starts up, its internal picture is empty. It must receive a "load file" request, or a series of "draw" requests, before a picture is actually available. Until that is done any requests which refer to specific elements or locations in the picture will receive an appropriate "not found" status message.

A picture is logically composed of device-independent "elements", such as text, line, arc, and symbol. In general, there is a small number of such elements. Each element consists of a common header, which includes the element's position in the picture's coordinate system, its color, size, etc., and a "value" which is unique to the element's type (e.g. a character string, etc.). The header also specifies how the element combines with other elements in the picture (overlays them, merges with them, etc.). A special element type called "null" is also supported to facilitate the removal of picture elements from pictures or other similar large lists without forcing time-consuming compaction procedures. Any element can therefore be redefined to "null", indicating that it should be ignored for all future processing.

The "null" color (zero) is treated as transparent when used in either the foreground or the background. Specifically, if the foreground color is null, the element itself is not drawn, but it may still be filled in. If the background color is null, the element is not filled in. If the shading pattern is null, and the color is not null, the background fill is solid.

A picture is represented in an internal format which may be different from the external representation of picture elements and which is, in any case, hidden from other processes. This representation is designed to optimize retrieval of picture elements, with a secondary emphasis on adding new elements and modifying or erasing old ones. The order in which the elements were originally drawn is preserved (unless explicit "order" requests have been received to re-arrange them).

Requests to "animate" an element result in the creation of a separate, local "animate" process which performs the necessary transformations and sends the appropriate requests (usually "draw" or "erase") back to the Picture Manager periodically.

A Picture Manager processes incoming requests one at at time, as it receives them. Each message can change the state of the picture for later requests. The Picture Manager supports numerous operations, including the following: "draw" new elements; "modify", "overwrite", or "erase" existing elements, "copy" or "move" elements to another location in the same picture or to any other given process; "group" elements together into one (or "ungroup" them); "scale" them (i.e. expand, stretch, or shrink them); and "rotate" them. It can also be asked to "notify" a particular process if any elements within a given rectangular area (the "viewport") are changed and to determined whether a given location coincides (or come close to) any element in the picture. Any response to a request (e.g., multiple picture elements) is sent in a single message.

When an element is sent as the result of an outstanding "notify" request, all elements which overlap it (and all elements which overlap those elements) are sent as well. These are sent together in one message. The background is displayed by generating a "rectangle" element of the same size as the current viewport with a null foreground color and the appropriate background pattern and color. This element is always the lowest level in the picture; i.e., it is sent before all others. All erasure of elements from a display is accomplished by "draw" requests which redisplay the background and/or elements in the picture, overwriting the "erased" elements. There is no explicit "erase" request to a window (or output) manager.

Input Manager—There is one Input Manager per set of "logical input devices" (such as keyboards, mice, light pens, etc.) connected to the system. The Input Manager handles input interrupts and passes them to the console manager. Cursor movement inputs may also be sent to a designated output manager.

The Input Manager knows about the following processes: the process which initialized it, and possibly one particular Output Manager in the same context. The following process knows about the Input Manager: the Console Manager in the same context.

An Input Manager is created (automatically, at system start-up) for each set of "logical input devices" in the system, thus implementing a single "virtual keyboard". There can only be one such set, and therefore one Input Manager, per Console context. The software (message) interface to each manager is identical, although their internal behavior is dependent upon the physical device(s) to which they communicate. All input devices interrupt service routines (including mouse, digitizing pad, etc.) are contained in Input Managers and hidden from other processes. When ready, each Input Manager must send an "I'm here" message to the closest process named "Console".

An Input Manager must be explicitly initialized and told to proceed before it can begin to process input interrupts. Both of these are performed using appropriate messages. Whichever process initializes the manager becomes tightly coupled to it, i.e., they can exchange messages via PID's rather than by name. The Input Manager will send all inputs to this process (usually the Console Manager). This coupling cannot be changed dynamically; the manager would have to be re-initialized. Between the "initialize" and the "proceed" an Input Manager may be sent one or more "set" requests to define its behavior. It does not need to be able to interpret the meaning of any input beyond distinguishing cursor from non-cursor. Device-independent parameters (such as pixel size and density) are not downloaded but rather are assumed to be built into the software, some part of which, in general, must be unique to each type of Input Manager.

An Input Manager can be dynamically "linked" to a particular Output Manager, if desired. If so, all cursor control input (or any other given subset of the character set) will be sent to that manager, in addition to the initializing process, as it is received. This assignment can be changed or cut off at any time. (This is generally useful only if the output device is a screen.)

In general, input is sent as single "characters", each in a single "K" (i.e. keyboard string) message (unbuffered) to the specified process(es). Some characters, such as "shift one" or a non-spacing accent, are temporarily buffered until the next character is typed and are then sent as a pair. Redefinable characters, including all displayable text, cursor control commands, "action keys", etc. are sent as triples.

New output devices can be added to the "virtual keyboard" at any time by re-initializing the manager and down-loading the appropriate parameters, followed by a "proceed". All input is suspended while this is being done. Previously down-loaded parameters and the screen assignment are not affected. Similarly, devices can be disconnected by terminating (sending "quit" requests for) them individually. A non-specific "quit" terminates the entire manager.

Where applicable, an Input Manager will support requests to activate outputs on its device(s), such as lights or sound generators (e.g., a bell).

The Input Process is a distinct process which is created by each Console Manager for its Input Manager to keep track of the current input state. In general, this includes a copy of its last input of each type (text, function key, pointer, number, etc.), the current redefinable character set number, as well as Boolean variables for such conditions as "keyboard locked", "select key depressed" (and being held down), etc. The process is simply named "In". The Input Manager is responsible for keeping this process up-to-date. Any process may examine (but not modify) the contents of "In".

Output Manager—There is one Output Manager per physical output device (screen, printer, plotter, etc.) connected to the system. Each Output Manager converts (and possibly scales) standard "pictures" into the appropriate representation on its particular device.

The Output Manager knows about the following processes: the process which initialized it, and the Draw Manager in the same context. The following processes know about the Output Manager: the Console Manager in the same context, the Input Manager in the same context, and the Window Manager in the same context.

An Output Manager is created (automatically, at system start-up) for each physical output device in the system, thus implementing numerous "virtual screens". There can be any number of such devices per Console context. The software (message) interface to each manager is identical, although their internal behavior is dependent upon the physical device(s) to which they communicate. All output interrupt service routines (if any) are contained in Output Manager and hidden from other processes. Each manager also controls a process called Cursor which holds information concerning its own cursor. When ready, each Output Manager must send an "I'm here" message to the closest process named "Console".

An Output Manager must be explicitly initialized and told to proceed before it can begin to actually write to its device. Both of these are performed using appropriate Human Interface messages. Which process initializes the manager becomes tightly coupled to it; i.e., they can exchange messages via PID's rather than by name. This coupling cannot be changed dynamically; the manager would have to be re-initialized. Between the "initialize" and the "proceed" an Output Manager may be sent one or more "set" requests to define its behavior. Device-independent parameters (such as pixel size and density) are not down-loaded but rather are assumed to be built into the software, some part of which, in general, must be unique to each type of Output Manager. Things like a screen's background color and pattern are down-loadable at start-up time and at any other time.

In general, an Output Manager is driven by "draw" commands (containing standard picture elements) sent to it by any process (usually a Window Manager). Its primary function then is to translate picture elements, described in terms of virtual pixels, into the appropriate sequences of output to its particular device. It uses the Draw Manager to expand elements into sets of real pixels and keeps the Cursor process informed of any resulting changes in cursor position. It looks up colors and shading patterns in predefined tables. The "null" color (zero) is interpreted as "draw nothing" whenever it is encountered. A "clear" request is also supported. It changes a given polygonal area to the screen's default color and shading pattern.

Any "draw" request can be preceded by a "clip" request. "Clip" means "don't display pixels outside of given polygon", i.e. only the logical AND of the polygonal area and the given picture elements is drawn. The clip request applies only to the next draw request received from the same process and is then discarded.

"Text" elements are displayed by the output device's built-in character generator, if possible. However, most text is created from predefined bit-maps which are stored in a Human Interface library. Different bit-maps exist for various combinations of font and size. Sizes which are not explicitly stored must be calculated from the available bit-maps when required. The style is always generated dynamically, i.e., it is calculated from the basic bit-map.

Output Managers also accept "K" messages (i.e. keyboard strings) containing cursor movement commands. If the associated device is a screen, the manager erases the cursor from its current position (if necessary. i.e. if the cursor is not supported directly by the hardware) and redraws it in its new location. It uses the Cursor Process to get a symbol element representing the cursor's current shape and color, and it tells it the new location after it has redrawn the cursor. (The manager may have to ask its initializing process to redraw the part of the picture which was previously obscured by the cursor after it moves it.) If the associated device is not a real screen, cursor movement commands are simply ignored.

If possible, an Output Manager should be able to save, restore, move, and copy rectangular areas of the virtual screen. These are primarily speed-optimizing operations, and they need not always be supplied. In general, an Output Manager can be queried for its characteristics. e.g., whether it supports the above functions, whether it is bit-mapped or character-oriented, the output dimensions (in pixels or characters, as appropriate), the physical size, etc.

The Cursor Process is a distinct process which is created by each Console Manager in its context to keep track of the cursor. That process, which has the same name as the screen (not the Output Manager), knows the current location of the cursor, all of the symbols which may represent the cursor on the screen, which symbol is currently being used, how many real pixels to move when a cursor movement command is executed, etc. It can, in general, be accessed for any of this information at any time by any process. The associated Output Manager is the prime user of this process and is responsible for keeping it up to date. The associated Input Manager (if any) is the next most common user, requesting the cursor's position every time it processes a "command" input.

Dialog Manager—There is one Dialog Manager per console, and it provides access to a library of "pictures" which define the menus, help texts, prompts, etc. for the Human Interface (and possibly the rest of the system), and it handles the user interaction with those pictures.

The Dialog Manager knows about the following processes: none. The following processes know about the Dialog Manager: the Console Manager in the same context.

One Dialog Manager is created automatically, at system start-up, in each Console context. Its function is to handle all visual interaction with users through the input and output managers. Its purpose is to separate the external representation of such interaction from its intrinsic meaning. For example, the Console Manager may need to ask the user how many copies of a report he wants. The phrasing of the question and the response are irrelevant—they may be in English, Swahili, or pictographic, so long as the Console Manager ends up with an integral number or perhaps the response "forget it".

In general, the Dialog Manager can be requested to load (from a file) or dynamically create (from a given specification) a picture which represents a menu, error message, help (informational) text, prompt, a set of icons, etc. This picture is usually displayed until the user responds.

Response to help or error text is simply acknowledgement that the text has been read. The response to a prompt is the requested information. The user can respond to a menu by selecting an item in the menu or by cancelling the menu (and thus cancelling any actions the menu would have caused). Icons can be selected and then moved or "opened". Opening an icon generally results in an associated application being run.

"Selection" is done through an Input Manager which sends a notification to the Console Manager. The Console Manager filters this response through the Dialog Manager which interprets it and returns the appropriate parameter in a message which is then passed on to the process which requested the service.

All dialog is represented as pictures, mostly in free format. Help and error dialog are the simplest and are unstructured except that one element must be "tagged" to identify it as the "I have read this text" response target symbol. The text is displayed until the user selects this element.

Prompts have three tagged elements: one which defines the response area (i.e., where the user will type the information requested by the prompt), a "cancel" target, and an "enter" target. The prompt is displayed until either one of the latter two elements is selected. The response is returned as a text string, with an indication of which target element was selected. The "response" element may be omitted, in which case the prompt is just a question and the response is a simple yes or no (represented by "enter" and "cancel").

A menu picture is highly structured. The first element must be a text element which contains the menu's title for display and for reference by the software. This may be followed by an "explanation" element to describe the menu items. Neither of these elements is selectable.

The menu proper contains a list of "macro" picture elements, one per selectable choice or "item". Each macro consists of three elements. The first element is mandatory and describes the item (via text or a symbol). It must contain a tag which is what is actually sent back to the requesting process when the item is selected along with the item's ordinal number (1 to n, of there are n items). For example, the item element may define an icon, such as a house. The tag might be "H" or "house" or anything else the system designer feels is appropriate. An item number of zero and a tag of "NONE" are sent if the menu is closed without selecting any item. A single character may optionally be associated with the element. Typing the given character on the keyboard has the same effect as selecting the item from the menu.

The second and third elements in the macro are optional and may be represented by null strings (a single null byte) if not required. The second element describes the "alternate" state of the item. It is displayed when the item is selected and remains in effect until the item is selected again. In other words, the item is toggled between two options. The element must contain a tag (as described for the first element) to identify it. The third element describes the "unavailable" state of the item, and it is displayed when that particular option is marked as not being selectable at the time the menu is requested, as described below.

The last element in the menu picture is a simple text string consisting of a pair of characters for each item in the menu. The list describes whether the item is available (can be selected) or unavailable and which is its current state (normal or alternate). This list can (and should) be changed dynamically by messages to the Dialog Manager to reflect the current options available to the user.

Icons are small pictures which represent applications or services and are organized into sets (or "frames of reference") of related functions. A set is a picture composed of "macro" elements, one per icon. Each macro comprises a single "symbol" element (which may itself be a macro) and a text element describing the label to be displayed with the symbol. The label element may be null. The macro element must be tagged with the name of the process to which notification is sent when the icon is "opened", and it must specify whether a window should be opened automatically before sending the notification.

Draw Manager—There is one Draw Manager per console, and it provides access to a library of "pictures" which define the menus, help, prompts, etc., for the Human Interface (and possibly the rest of the system), and it handles the user interaction with those pictures.

The Draw Manager knows about the following processes: none. The following processes know about the Draw Manager: the Picture Managers in the same context, and the Output Managers in the same context.

One Draw Manager is created automatically, at system start-up, in each context that requires expansion of picture elements into bit-maps. Its sole responsibility is to accept one or more picture elements, of any type, in one message and return a list of bit-map ("symbol") elements corresponding to the figure generated by the elements, also in one message. Various parameters can be applied to each element, most notably scaling factors which can be used to transform an element or to convert virtual pixels to real pixels. The manager must be told to exit when the context is being shut down.

Window Manager—There is one per current instance of a "window" on a particular screen. A Window Manager is created when the window is opened and exits when the window is closed. It maps a given picture (or portion thereof) to a rectangular area of a given size on the given screen; i.e., it logically links a device-independent picture to a device-dependent screen. A "frame" can be drawn around a window, marking its boundaries and containing other information, such as a title or menu. Each manager is also responsible for updating the screen whenever the contents of its window changes.

The Window Manager knows about the following processes: the process that created it; one particular Picture Manager in the same context; and one particular Output Manager in the same context. The following processes know about the Window Manager: the Console Manager in the same context.

The Window Manager's main job is to copy picture elements from a given rectangular area of a picture to a rectangular area (called a "window") on a particular screen. To do so it interacts with exactly one Picture Manager and one Output Manager. A Window Manager need only be created when a window is "opened" on the screen and can be told to quit when the window is "closed" (without affecting the associated picture). When opened, the Window Manager must draw the outline, frame, and background of the window. When closed, the window and its frame must be erased (i.e. redrawn in the screen's background color and pattern). "Moving" a window (changing its location on the screen) is essentially the same as closing and re-opening it.

A Window Manager can only be created and destroyed by a Console Manager, which is responsible for arranging windows on the screen, resolving overlaps, etc. When a Window Manager is created, it waits for an "initialize" message, initializes itself, returns an "I'm here" message to the process which sent it the "initialize" message, then waits for further messages. It does not send any messages to the Output Manager until it has received all of the following: its dimensions (exclusive of frame), the outline line-type, size and color, background color, location on the screen, a clipping polygon, scaling factors, and framing parameters. A Window Manager also has an "owner", which is a particular process which will handle commands (through the Console Manager, which always has prime control) within the window.

Any of the above parameters can be changed at any time. In general, changing any parameter (other than the owner) causes the window to be redrawn on the screen.

A "frame", which may consist of four components (called "bars"), one along each edge of the window, may be placed around the given window. The bars are designated top, bottom, left, and right. They can be any combination of simple line segment, title bar, scroll bar, menu bar, and palette bar. These are supplied to the message as four separate lists (in four separate messages) of standard picture elements, whcih can be changed at any time by sending a new message referencing the bar. The origin of each bar is [0.0] relative to the upper left corner of the window.

The Console Manager may query a Window Manager for any of its parameters, to which it responds with messages identical to the ones it originally received. It can also be asked whether a given absolute cursor position is inside its window (i.e. inside the current clipping polygon) or its frame, and for the cursor coordinates relative to the origin of the window or any edge of the frame.

A Window Manager is tightly coupled to its creator (a Console Manager), Picture Manager, and Output Manager; i.e. they communicate with each other using process identifiers (PID's). Consequently, a Window Manager must inform its Picture Manager when it exits, and it expects the Picture Manager to do the same.

Once the Window Manager knows the picture it is accessing and the dimensions of its window (or any time either of these changes) it requests the Picture Manager to send it all picture elements which completely or partially lie within the window. It also asks it to notify it of chanages which will affect the displayed portion of the picture. The Picture Manager will send "draw" messages to the Window Manager (at any time) to satisfy these requests.

The Window Manager performs gross clipping on all picture elements it receives, i.e. it just determines whether each element could appear inside the current clipping polygon (which may be smaller than the window at any given moment, if other windows overlap this one).

A Window Manager can be told to "freeze" (stop updating) its display and to "unfreeze" it. It can also be asked to redraw any given rectangular sub-area of the picture it is displaying.

Window Managers deal strictly in virtual pixels and have no knowledge about the physical characteristics of the screen to which they are writing. Consequently, a window's size and location are specified in virtual pixels, implying a conversion from real pixels if these are different.

Print Manager—There is one per "output subsystem", i.e. per pool of output devices. The Print Manager coordinates output to hard-copy devices (i.e. to their Output Managers). It provides a comprehensive queueing service for files that need to be printed. It can also perform some minimal formatting of text (justification, automatic page numbering, headers, footers, etc.)

The Print Manager knows about the following processes: Output Managers in the same context, and a Picture Manager in the same context. The following processes know about the Print Manager: any one that wants to.

One Print Manager is created automatically, at start-up time, in each Print context. It is expected to accept general requests for hard-copy output and pass them on, one message (usually corresponding to one "line" of output) at a time, to the appropriate Output Manager. It can also accept requests which refer to files (i.e. to File Manager processes). Each such message, known as a "spool" request, also contains a priority, the number of copies desired, specific output device requirements (if any) and special form requirements (if any).

Based on these parameters, as well as the size of the file, the amount of time the request has been waiting, and the availability of output devices, the Print Manager maintains an ordered queue of outstanding requests. It dequeues them one at a time, select an Output Manager, and builds a picture (using a Picture Manager). It then requests (from the Picture Manager) and "prints" (plots, etc.) one "page" at a time until the entire file has been printed.

The Print Manager recognizes specially marked ("tagged") picture elements which define headers, footers, foot-notes, and page formatting parameters (such as "page break" "set page number", etc.).

HUMAN INTERFACE—RELATIONSHIPS BETWEEN COMPONENTS

Figure 9:
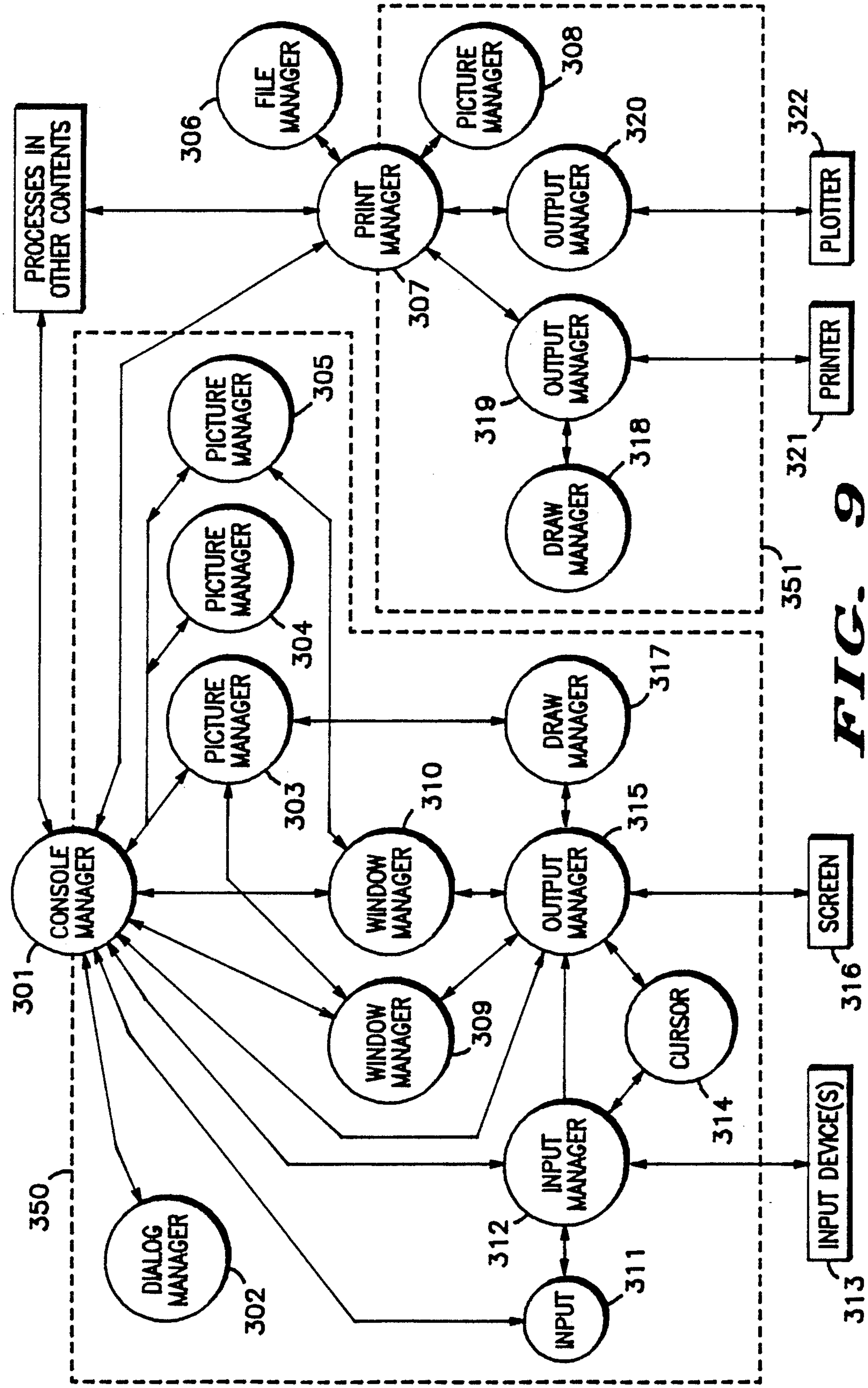
FIG. 9 illustrates the relationship between the basic human interface components in a typical working environment.

The eight Human Interface components together provide all of the services required to support a minimal human interface. The relationships between them are illustrated in FIG. 9, which shows at least one instance of each component. The components represented by circles 301, 302, 307, 312, 315, and 317–320 are generally always present and active, while the other components are created as needed and exit when they have finished their specific funtions. FIG. 9 is divided into two main contexts: "Console" 350 and "Print" 351.

Cursor 314 and Input 311 are examples of processes whose primary function is to store data. "Cursor"'s purpose is to keep track of the cursor position on the screen and all parameters (such as the symbols defining different cursors) pertinent to the cursor. One cursor process is created by the Console Manager for each Output Manager when it is initialized. The Output Manager is responsible for updating the cursor data, although "Cursor" may be queried by anyone "Input" keeps track of the current input state, such as "select key is being held down", "keyboard locked", etc. One input process is created by each Console Manager. The console's input message updates the process; any other process may query it.

The Human Interface is structured as a collection of subsystems, implemented as contexts, each of which is responsible for one broad area of the interface. There are two major contexts accessible from outside the Human Interface: "Console" and "Print". They handle all screen/keyboard interaction and all hard-copy output, respectively. These contexts are not necessarily unique. There may be one or more instances of each in the system, with possibly several on the same cell. Within each, there may be several levels of nested contexts.

The possible interaction between various Human Interface components will now be described.

Console Manager/Other Contexts—Processes of other contexts may send requests for console services or notification of relevant events directly to the Console Manager(s). The Console Manager routes messages to the appropriate service. It also notifies (via a "status" message) the current owner of a window whenever an object in its window has been selected. Similarly, it sends a message to an application when a user requests that application in a particular window.

Console Manager/Input Manager—The Console Manager initializes the Input Manager and usually assigns a particular Output Manager to it. The Input Manager always sends all input (one character, one key, one cursor movement, etc. at a time) directly to the Console Manager. It may also send "status" messages, either in response to a "download", "initialize", or "terminate" request, or any time an anomaly arises.

Console Manager/Output Manager—The Console Manager displays information on its "prime" output device during system start-up and shut-down without using pictures and windows. It therefore sends picture elements directly to an Output Manager. The Console Manager is also responsible for moving the cursor on the screen while the system is running, if applicable. The Console Manager (or any other Human Interface manager, such as an "editor") may change the current cursor to any displayable symbol. Output Managers will send "status" messages to the Console Manager any time an anomaly arises.

Console Manager/Picture Manager—The Console Manager creates Picture Managers on demand and tells each of them the name of a file which contains picture elements, if applicable. A Picture Manager can also accept requests from the Console Manager (or anyone else) to add elements to a picture individually, delete elements, copy them, move them, modify their attributes, or transform them. It can be queried for the value of an element at (or close to) a given location within its picture. The Console Manager will tell a Picture Manager to erase its picture and exit when it is no longer needed. A Picture Manager usually sends "status" messages to the Console Manager whenever anything unusual (e.g., an error) occurs.

Console Manager/Window Manager—The Console Manager creates Window Managers on demand. Each Window Manager is told its size, the PID of an Output Manager, the coordinates (on the screen) of its upper left outside corner, the characteristics of its frame, the PID of a particular Picture Manager, the coordinates of the first element from which to start displaying the picture, and the name of the process which "owns" the window. While a window is active, it can be requested to re-display the same picture starting at a different element or to display a completely different picture.

The coordinates of the window itself may be changed, causing it to move on the screen, or it may be told to change its size, frame, or owner. A Window Manager can be told to "clip" the picture elements in its display along the edges of a given polygon (the default polygon is the inside edge of the window's frame). It can also be queried for the element corresponding to a given coordinate. The Console Manager will tell a Window Manager to "close" (erase) its window and exit when it is no longer needed. A Window Manager sends "status" messages to the Console Manager to indicate success or failure of a request.

Console Manager/Dialog Manager—The Dialog Manager accepts requests to load and dynamically create "pictures" which represent menus, prompts, error messages, etc. In the case of interactive pictures (such as menus), it also interprets the response for the Console Manager. Other processes may also use the Dialog Manager through the Console Manager.

Console Manager/Print Manager—Console Managers generally send "spool" requests to Print Managers to get hard-copies of screens or pictures. An active picture must first be copied to a file. The Print Manager returns a "status" message when the request is complete or if it fails.

Window Manager/Picture Manager—A Window Manager requests lists of one or more picture elements from the relevant Picture Manager, specified by the coordinates of a rectangular "viewport" in the picture. It can also request the Picture Manager to automatically send changes (new, modified, or erased elements), or just notification of changes, to it. The Picture Manager sends "status" messages to notify the Window Manager of changes or errors.

Window Manager/Output Manager—A Window Manager sends lists of picture elements to its Output Manager, prefixed by the coordinates of a polygon by which the Output Manager is to "clip" the pixels of the elements as it draws them. A given list of picture elements can also be scaled by a given factor in any of its dimensions. The Output Manager returns a "status" message when a request fails.

Input Manager/Output Manager—The Input Manager sends all cursor movement inputs to a pre-assigned Output Manager (if any), as well as to the Console Manager. This assignment can be changed dynamically.

Print Manager/Other Processes—The Print Manager accepts requests to "spool" a file or to "print" one or more picture elements. It sends a "status" message at the completion of the request or if the request cannot be carried out. The status of a queued request can also be queried or changed at any time.

Print Manager/File Manager—The Print Manager reads picture elements from a File Manager (whose name was sent to it via a "spool" request). It may send a request to "delete" the file back to the File Manager after it has finished printing the picture.

Print Manager/Picture Manager—A Print Manager creates a Picture Manager for each spooled picture that it is currently printing, giving it the name of the relevant file. It then requests "pages" of the picture (depending upon the characteristics of the output device) one at a time. Finally, it tells the Picture Manager to go away.

Print Manager/Output Manager—The Print Manager sends picture elements to an Output Manager. The Output Manager sends a "status" message when the request completes or fails or when an anomaly arises on the printer.

Draw Manager/Other Processes—The Draw Manager accepts lists of elements prefixed by explicit pixel parameters (density, scaling factor, etc.). It returns a single message containing a list of bit-map ("symbol") elements of the drawn result for each message it receives.

HUMAN INTERFACE—SERVICE

A Human Interface service is accessed by sending a request message to the closest (i.e. the "next") Human Interface manager, or directly to a specific Console Manager. This establishes a "connection" to an existing Human Interface resource or creates a new one. Subsequent requests must be made directly to the resource, using the connector returned from the initial request, until the connection is broken. The Human Interface manager is distributed and thus spans the entire virtual machine. Resources are associated with specific nodes.

A picture may be any size, often larger than any physical screen or window. A window may only be as large as the screen on which it appears. There may be any number of windows simultaneously displaying pictures on a single screen. Updating a picture which is mapped to a window causes the screen display to be updated automatically. Several windows may be mapped to the same picture concurrently—at different coordinates.

The input model provided by the Human Interface consists of two levels of "virtual devices". The lower level supports "position". "character", "action", and "function key" devices associated with a particular window. These are supported consistently regardless of the actual devices connected to the system.

An optional higher level consists of a "dialog service", which adds "icons", "menus", "prompts", "values", and "information boxes" to the repertoire of device-independent interaction. Input is usually event-driven (via messages) but may also be sampled or explicitly requested.

All dimensions are in terms of "virtual pixels". A virtual pixel is a unit of measurement which is symmetrical in both dimensions. It has no particular size. Its sole purpose is to define the spatial relationships between picture elements. Actual sizes are determined by the output device to which the picture is directed, if and when it is displayed. One virtual pixel may translate to any multiple, including fractions, of a real pixel.

Using the core Human Interface services generally involves: creating a picture (or accessing a predefined picture); creating a window on a particular screen and connecting the picture to it; updating the picture (drawing new elements, moving or erasing old ones, etc.) to reflect changes in the application (e.g. new data); if the application is interactive, repeatedly accepting input from the window and acting accordingly; and deleting the picture or window or both when done.

Creating a new resource is done with an appropriate "create" message, directed to the appropriate resource manager (i.e. the Human Interface manager or Console Manager). Numerous options are available when a resource, particularly a window, is created. For example, a typical application may want to be notified when a specific key is pressed. Pop-up and pull-down menus, and function keys, may also be defined for a window.

All input from the Human Interface is sent by means of the "click" message. The intent of this message is to allow the application program to be as independent of the external input as possible. Consequently, a "click" generated by a pop-up menu looks very much like that generated by pressing a function key or selecting an icon. Event-driven input is initiated by a user interacting with an external device, such as a keyboard or mouse. In this case, the "click" is sent asynchronously, and multiple events are queued.

A program may also explicitly request input, using a menu, prompt, etc., in which case the "click" is sent only when the request is satisfied. A third method of input, which doesn't directly involve the user, is to query the current state of a virtual input device (e.g., the current cursor position).

A "click" message is associated with a particular window (and by implication usually with a particular picture), or with a dialog "metaphor", thus reflecting the two levels of the input model.

Since the visual aspect of the Human Interface is separated from the application aspect, a later redesign of a window, menu, icon, etc. has little or no effect upon existing applications.

HUMAN INTERFACE—DETAILED DESCRIPTION

Connectors

In general, all interaction with a Human Interface resource (console, window, picture, or virtual terminal) must be through a connector to that resource. Connectors to consoles can only be obtained from the Human Interface manager. Connectors to the other resources are available through the Human Interface manager, or through the Console Manager in which the desired resource resides. Requests must specify the path-name of the resource as follows:

[<console_name>][/<screen_name>][/<window_or_picture_name>]

That is, the name of the console, optionally followed by a slash and the name of the screen, optionally followed by a slash and the name of a window, picture, or terminal. The console name may be omitted only if the message is sent directly to the desired console manager. If the screen name is omitted, the first screen configured on the given console is assumed. The window name must be specified if one of those resources is being connected.

Connection Requests

The "create" and "open" requests can be addressed to the "next" Human Interface context ("HI") or to a specific console connector or to the "next" context named "Console". If sent to "HI", a full path-name (the name parameter) must be given., otherwise, only the name of the desired resource is required (e.g., at a minimum, just the name of the window or picture).

If a picture manager process is created locally by an application, for private use, an "init"—message with the same contents as "create" or "open"—must be sent directly to the picture process. The response will be "done" or "failed".

The following are the various Connection Requests and the types of information which may be associated with each:

CREATE is used to create a new picture resource, a new window resource, or a new virtual terminal resource.

When used to create a new picture resource, it may contain information about the resource type (i.e. a "picture"); the path-name of the picture; the size; the background color; the highlighting method; the maximum number of elements; the maximum element size; and the path-name of a library picture from which other elements may be copied.

When used to create a new window resource, it may contain information about the resource type (i.e. a "window"); the path-name of the window; the window's title; the window's position on the screen; the size of the window; the color, width, fill color between the outline and the pane, and the style of the main window outline; the color and width of the pane outline; a mapping of part of a picture into the window; a modification notation; a special character notation; various options; a "when" parameter requesting notification of various specified actions on/within the window; a title bar; a palette bar; vertical and horizontal scroll bars; a general use bar; and a corner box.

When used to create a new virtual terminal, it may contain information about the resource type (i.e a "terminal"); the path-name of the terminal; the title of the terminal's window; various options; the terminal's position on the screen; the size of the terminal (i.e. number of lines and columns in the window); the maximum height and width of the virtual screen; the color the text inside the window; tab information, emulator process information; connector information to an existing window; window frame color; a list of menu items; and alternative format information.

OPEN is used to connect to a Human Interface service or to an existing Human Interface resource. When used to connect to a Human Interface service, it may contain information about the service type; and the name of the particular instance of the service. This resource must be sent to the Human Interface context.

When used to connect to an existing Human Interface resource it may contain information about the path-name of the resource; the type of resource (e.g. picture, window, or terminal); and the name of the file (for pictures only) from which to load the picture. This request can be sent to a Human Interface manager or a console manager; alternatively the same message with message I.D. "init" specifying a file can be sent directly to a privately owned picture manager.

DELETE is used to remove an existing Human Interface resource from the system, and it may contain information specifying a connection to the resource; the type of resource; and whether, for a window, the corresponding picture is to be deleted at the same time.

CLOSE is used to break a connection to a Human Interface resource, and it may contain information specifying a connection to the resource; and the type of resource.

WHO? is used to request a list of signed-on users, and it may contain a user identification string.

QUERY is used to get the status of a service or resource, and it may contain information about the resource type; the name of the service or resource; a connector to a resource; and information concerning various options.

The following are the various Connection Responses and the types of information which may be associated with each:

CONNECT provides a connection to a Human Interface resource, and it contains information concerning the originator (i.e. the Human Interface or the console); the resource type; the original request message identifier; the name of the resource; and a connector to the resource.

USER contains the names of zero or more currently signed-on users and their locations, and it contains a connector to a console manager followed by the name of the user signed on at that console.

Console Requests

The main purpose of the console is to coordinate the activities of the windows, pictures, and dialog associated with it. Any of the CREATE, OPEN, DELETE, and CLOSE connection requests listed above, except those relating to the consoles, can be sent directly to a known console manager, rather than to the Human Interface manager (which always searches for the console by name). Subsequently, some characteristics of a window, such as its size, can be changed dynamically through the console manager. The current "user" of the console can be changed. And the console can be queried for its current status (or that of any of its resources).

The following are the various Console Requests and the types of information which may be associated with each:

USER is used to change the currently signed-on user, and it contains a user identification string.

CHANGE is used to change the size and other conditions of a window, and it may contain information about a connector to a window or a terminal; new height and width (in virtual pixels); increment to height and width; row and column position; various options; a connector to a new owner process; and whether the window should be the current active window on the screen.

CURSOR is used to move the screen cursor, and it contains position information as to row and column.

QUERY is used to get the current status of the console or one of its resources, and it contains information in the form of a connector to the resource; and various query options (e.g. list all screens, all pictures, or all windows).

BAND starts/stops the rubber-banding function and dragging function, and it contains information about the position of a point in the picture from which to start the operation; the end point of the figure which is to be dragged; the type of operation (e.g. line, rectangle, circle, or ellipse); the color; and the type of line (e.g. solid). In rubber-banding the drawn figure changes in size as the cursor is moved In dragging the figure moves with the cursor.

The following are the various Console Responses and the types of information which may be associated with each:

STATUS describes the current state of a console, and it may contain information about a connector to the console; the originator; the name of the console; current cursor position; current metaphor size; scale of virtual pixels per centimeter, vertically and horizontally; number of colors supported; current user i.d. string; screen size and name; window connector and name; and picture connector, screen name, and window name.

Picture-Drawing

The picture is the fundamental building block in the Human Interface. It consists of a list of zero or more "picture elements", each of which is a device-independent abstraction of a displayable object (line, text, etc.). Each currently active picture is stored and maintained by a separate picture manager. "Drawing" a picture consists of sending picture manipulation messages to the picture manager.

A picture manager must first be initialized by a CREATE or OPEN request (or INIT, if the picture was created privately). CREATE sets the picture to empty, gives it a name, and defines the background. The OPEN request reads a predefined picture from a file and gives it a name. Either must be sent first before anything else is done. A subsequent OPEN reloads the picture from the file.

The basic request is to WRITE one or more elements. WRITE adds new elements to the end of the current list, thus reflecting the order. Whenever parts of the picture are copied or displayed, this order is preserved. Once drawn, one or more elements can be moved, erased, copied, or replaced. All or part of the picture can be saved to a given file. In addition, there are requests to quickly change a particular attribute of one or more elements (e.g. select them). Finally. the DELETE request (to the console manager; QUIT, if direct to the picture resource) terminates the picture manager, without saving the picture.

Any single element can be "marked" for later reference. If the element is text, then a particular offset in the string can be marked, and a visible mark symbol displayed at that location.

A picture can be shared among several processes ("applications") by setting the "appl" field in the picture elements. Each application process can treat the picture as if it contains only its own elements. All requests made by each process will only affect elements which contain a matching "appl" field. Participating processes must be identified to the picture manager via an "appl" request.

The following are the various Picture-Drawing Requests and the types of information which may be associated with each:

WRITE is used to add new elements to a picture, and it may contain information providing a list of picture elements; the data type; and an indication to add the new elements after the first element found in a given range (instead of the foreground, at the end of the list).

READ is used to copy elements from a picture, and it may contain information regarding the connection to which to send the elements; an indication to copy background elements; and a range of elements to be copied.

MOVE is used to move elements to another location, and it may contain information indicating a point in the picture to which the elements are to be moved; row and column offsets; to picture foreground; to picture background; fixed size increments; and a range of elements to be moved.

REPLACE is used to replace existing elements with new ones, and it may contain information providing a list of picture elements; and a range of elements to be replaced.

ERASE is used to remove elements from a picture, and it may contain information on the range of elements to be erased.

QUIT is used to erase all elements and terminate, and it has no particular parameters (valid only if the picture is private).

MARX is used to set a "marked" attribute (if text, to display a mark symbol), and it may contain information specifying the element to be marked; and the offset of the character after which to display the mark symbol.

SELECT is used to select an element and mark it, and it may contain information specifying the element(s) to be selected; the offset of the character after which to display the mark symbol; the number of characters to select; and a deselect option.

SAVE is used to copy all or part of a picture to a file, and it may contain information specifying the name of the file; and a subset of a picture.

QUERY is used to get the current status, and it has no particular parameters.

BKGD is used to change a picture's background color, and it may contain information specifying the color.

APPL is used to register a picture as an "application", and it may contain information specifying a name of the application; a connection to the application process; and a point of origin inside the picture.

NUMBER is used to get ordinal numbers and identifiers of specific elements, and it may contain information specifying the element(s).

HIT is used to find an element at or closest to a given position, and it may contain a position location in a picture; and how far away from the position the element can be.

[,] is used to start/end a batch, and a first symbol causes all updates to be postponed until a second symbol is received (batches may be nested up to 10 deep).

HIGHLIGHT, INVERT, BLINK, HIDE are used to change a specific element attribute, and they may contain information indicating whether the attribute is set or cleared; and a range of elements to be changed.

CHANGE is used to change one or more element fields, and it may contain information specifying the color of the element; the background color; the fill color; and fill pattern; and a range of elements to be changed.

EDIT is used to modify a text element's string, and it may contain information indicating to edit at the current mark and then move the mark; specifying the currently selected substring is to be edited; an offset into the text at which to insert or from which to start shifting; to shift the text by the given number of characters to/from the given position; tab spacing; a replacement substring; to blank to the end of the element; and a range of elements to be edited.

In general, when a range of elements is specified, a list of one or more parameters is provided (if omitted, then all elements in the picture are referenced by default) according to the following table:

| Keyword | Meaning | Format |
|---|---|---|
| @pos | by position (start of range) | row, column |
| @end | last position of a range | row, column |
| @num | by relative element number | list of numbers |
| @tag | search for a tag | pattern |
| @txt | search for a text element | pattern |
| @sel | "selected" element(s) | keyword only |
| @mrk | "marked" element | keyword only |
| @id | by unique element identifier | list of identifiers |
| @att | by attributes | attribute structure |
| @cnt | the number of elements | count |

Any range parameters which are given restrict the elements which will be affected by the current request. In general, only the intersection of all of the elements satisfying the given conditions are included in the range. For example, specifying pos, end, tag, txt, and sel together means "use all selected text elements between the given coordinates, containing a particular tag and an particular text string".

The following are the various Picture-Drawing responses and the types of information which may be associated with each:

STATUS describes the current status of the picture, and it may contain information specifying a connector to the picture; an original message identifier, if applicable; the name of the picture; the name of the file last read or written; height and width; lowest and highest row/column in the picture; the number of elements; and the number of currently active viewports.

WRITE contains elements copied from a picture, and it may contain information specifying a connector to the picture; a list of picture elements, and the data type.

NUMBER contains element numbers and identifiers, and it may contain information specifying a list of numbers; and a list of element identifiers.

Picture Elements

Picture elements are defined by a collection of data structures, comprising one for a common "header", some optional structures, and one for each of the possible element types. The position of an element is always given as a set of absolute coordinates relative to [0,0] in the picture. This defines the upper left corner of the "box" which encloses each element. Points specified within an element (e.g. to define points on a line) are always given as coordinates relative to this position. In a "macro" the starting position of each individual element is considered to be relative to the absolute starting position of the macro element itself, i.e. they're nested.

FIG. 10 shows the general structure of a complete picture element. The "value" part depends upon the element type. The "appl" and "tag" fields are optional, depending upon indicators set in "attr".

The following is a description of the various fields in a picture element:

Length=length of the entire picture element in bytes

Type=one of the following: text, line, rectangle, ellipse, circle, symbol, array, discrete, macro, null, meta-element Attr=one of the following: selectable, selected, rectilinear, inverted foreground/background, blink, tagged, application mnemonic, hidden, editable, movable, copyable, erasable, transformed, highlighted, mapped/not mapped, marked, copy Pos=Row/col coordinates of upper left corner of the element's box Box=Height/width of an imaginary box which completely and exactly encloses the element Color=color of the element, consisting of 3 sub-fields: hue, saturation, and value

Bkgrnd=background color of the element

Fill=the color of the interior of a closed figure

Pattern=one of 10 "fill" patterns

Appl=a mnemonic referencing a particular application (e.g. forms manager, word-processor, report generator, etc.); allows multiple processes to share a single picture.

Tag=a variable-length, null-terminated string, supplied by the user; it can be used by applications to identify particular elements or classes of elements, or to store additional attributes The attributes relating to the "type" field if designated "text" are as follows:

Options=wordwrap, bold, underline, italic, border, left-justify, right-justify, centered, top of box, bottom of box, middle of box, indent, tabs, adjust box size, character size, character/line spacing, and typeface Select=indicates a currently selected substring by offset from beginning of string, and length String=any number of bytes containing ASCII codes, followed by a single null byte; the text will be constrained to fit within the element's "box", automatically breaking to a new row when it reaches the right boundary of the area Indent=two numbers specifying the indentation of the first and subsequent rows of text within the element's "box"

Tabs=list of [type, position], where "position" is the number of characters from the left edge of the element's box, and "type" is either Left, Right, or Decimal Grow=maximum number of characters (horizontally) and lines (vertically) by which the element's box may be extended by typed input; limits growth right and downward, respectively Size=height of the characters' extent and relative width Space=spacing between lines of text and between characters Face=name of a particular typeface The attributes relating to the "type" field if designated "line" are as follows:

Style=various options such as solid, dashed, dotted, double, dashed-dotted, dash-dot-dot, patterned, etc.

Pattern=a pattern number

Thick=width of the line in pixels

Points=two or more pairs of coordinates (i.e. points) relative to the upper left corner of the box defined in the header The attributes relating to the "type" field if designated "rectangle" are as follows:

Style=same as for "line" above, plus solid with a shadow

Pattern=same as for "line"

Thick=same as for "line"

Round=radius of a quarter-circle arc which will be drawn at each corner of the rectangle The attributes relating to the "type" field if designated "ellipse" are as follows:

Style=solid, patterned, or double

Pattern=same as for "line"

Thick=same as for "line"

Arc=optional start- and end-angles of an elliptical arc

The attributes relating to the "type" field if designated "circle" are as follows:

Style=same as for "ellipse"

Pattern=same as for "line"

Thick=same as for "line"

Center=a point specifying the center of the circle, relative to the upper left corner of the element's box Radius=length of the radius of the circle Arc=optional start- and end-angles of a circular arc A "symbol" is a rectangular space containing pixels which are visible (drawn) or invisible (not drawn). It is represented by a two-dimensional array, or "bit-map" of 1's and 0's with its origin in the upper left corner.

The attributes relating to the "type" field if designated "symbol" are as follows:

Bitmap=a two-dimensional array (in row and column order) containing single bits which are either "1" (draw the pixel in the foreground color) or "0" (draw the pixel in the background color); the origin of the array corresponds to the starting location of the element Alt=A text string which can be displayed on non-bit-mapped devices, in place of the symbol An array element is a rectangular space containing pixels which are drawn in specific colors, similar to a symbol element. It is represented as a two-dimensional array, or "bit-map", of color numbers, with its origin in the upper left corner. The element's "fill" and "pattern" are ignored.

The attributes relating to the "type" field if designated "array" are as follows:

Bitmap=a two-dimensional array (in row and column order) of color numbers; each number either defines a color in which a pixel is to be drawn, or is zero (in which the pixel is drawn in the background color); the origin of the array corresponds to the starting location of the element Alt=an alternate text string which can be displayed on non-bit-mapped devices in place of the array A discrete element is used to plot distinct points on the screen, optionally with lines joining them. Each point is specified by its coordinates relative to the element's "box". An explicit element (usually a single-character text element or a symbol element) may be given as the mark to be drawn at each point. If not, an asterisk is used. The resulting figure cannot be filled.

The attributes relating to the "type" field if designated "discrete" are as follows:

| | |
|---|---|
| Mark = | a picture element which defines the "mark" to be drawn at each point; if not applicable, a null-length element (i.e., a single integer containing the value zero) must be given for this field |
| Style =<br>Pat<br>Thick | type, pattern, and thickness of the line (see "line" element above) |
| Join = | "Y" or "N" (or null, which is equivalent to "N"); if "Y", lines will be drawn to connect the marks |
| Points = | two or more pairs of coordinates; each point is relative to the upper left corner of the "box" defined in the header |

A "macro" element is a composite, made up of the preceding primitive element types ("text", etc.) or other macro elements or both. It can sometimes be thought of as "bracketing" other elements. The coordinates of the contained elements are relative to the absolute coordinates of the macro element. The "length" field of the macro element includes its own header and the "macro" field, plus the sum of the lengths of all of the contained elements. The "text" macro is useful for mixing different fonts and styles in single "unit" (word, etc.) of text.

The attributes relating to the "type" field if designated "macro" are as follows:

Macro=describes the contents of the macro element; may be one of following:
- "N"—normal (contained elements are complete)
- "Y"—list: same as "N", but only one sub-element at a time can be displayed; the others will be marked "hidden", and only the displayed element will be sent in response to requests ("copy", etc.); the "highlight" request will cycle through the sub-elements in order
- "T"—text: same as "N", but the "macro" field is immediately followed by a text "options" field, and a text "select" field; the macro "list" field may be followed by further text parameters (as specified in the options field)

List=any number of picture elements (referred to as sub-elements), formatted as described above; terminated by a null word A "meta-element" is a pseudo-element generated by the picture manager and which describes the picture itself, whenever the picture is "saved" to a file. Subsequently, meta-elements read from a file are used to set up parameters pertinent to the picture, such as its size and background color. Meta-elements never appear in "write" messages issued by the picture manager (e.g. in response to a "read" request, or as an update to a window manager).

The format of the meta-element includes a length field, a type field, a meta-type field, and a value. The 16-bit length field always specifies a length of 36. The type field is like that for normal picture elements. The meta-element field contains one of the following types:

Name=the value consists of a string which names the picture

Size=the maximum row and column, and the maximum element number and size

Backgnd=the picture's background color

Highlt=the picture's highlighting

The format of the value field depends upon the meta-type.

Windowing

A window maps a particular subset (often called a "view") of a given picture onto a particular screen. Each window on a screen is a single resource which handles the "pane" in which the picture is displayed and up to four "frame bars".

With reference to FIG. 11, a frame bar is used to show ancillary information such as a title. Frame bars can be interactive, displaying the names of "pull-down" menus which, when selected, display a list of options or actions pertinent to the window. A palette bar is like a permanently open menu, with all choices constantly visible.

Scroll bars indicate the relative position of the window's view in the picture and also allow scrolling by means of selectable "scroll buttons". A "resize" box can be selected to expand or shrink the size of the window on the screen while a "close" box can be selected to get rid of the window. Selecting a "blow-up" box expands the window to full screen size; selecting it again reduces it to its original dimensions.

A corner box is available for displaying additional user information, if desired.

The window shown in FIG. 11 comprises a single pane, four frame bars, and a corner box. The rectangular element within each scroll bar indicates the relative position of the window in the picture to which it is mapped (i.e. about a third of the way down and a little to the right).

Performing an action (such as a "select") in any portion of the window will optionally send a "click" message to the owner of the window. For example, selecting an element inside the pane will send "click" with "action"="select" and "area"="inside", as well as the coordinates of the cursor (relative to the top left corner of the picture) and a copy of the element at that position.

Selecting the name of a menu, which may appear in any frame bar, causes the menu to pop-up. It is the response to the menu that is sent in the "click" message, not the selection of the menu bar item. Pop-up menus (activated by menu keys on the keyboard) and function keys can also be associated with a particular window.

All windows are created by sending a "create" request to a Console Manager. As described above, "create" is the most complex of the windowing messages, containing numerous options which specify the size and location of the window, which frame bars to display, what to do when certain actions are performed in the window, and so on.

The process which sent the request is known as the "owner" of the window, although this can be changed dynamically. The most recently opened window usually becomes the current "active" window, although this may be overridden or changed.

A subsequent "map" request is necessary to tell the window which picture to display (if not specified in the "create" request). "Map" can be re-issued any number of times.

Other requests define pop-up menus and soft-keys or change the contents of specific frame bars. A window is always opened on top of any other window(s) it overlaps. Depending upon the background specified for the relevant picture, underlying windows may or may not be visible.

The "delete" request unmaps the window and causes the window manager to exit. The owner of the window (if different from the sender of "delete") is sent a "status" message as a result.

The following are the various Windowing Requests and the types of information which may be associated with each:

MAP is used to map or re-map a picture to the window, and it may contain information specifying a connection to the desired picture; and the coordinates in the picture of the upper left corner of the "viewport", which will become [0.0] in the window's coordinate system.

UNMAP is used to disconnect a window from its picture, and it contains no parameters, QUERY is used to get a window's status, and it contains no parameters.

[,] is used to start/ed a "batch", and the presence of a first symbol causes all updates to be postponed until a second symbol is received (batches may be nested up to 10 deep).

MENU defines a menu which will "pop-up" when a menu key is pressed, and it may contain information specifying which menu key will activate the menu; the name of the menu in the Human Interface library (if omitted, "list" must be given); and a name which is returned in the "click" message.

KEYS defines "pseudo-function" keys for the window, and it may contain information specifying the name of a menu in the Human Interface library; a list of key-names; and a name to be returned in the "click" message.

ADD, COPY, ERASE, REPLACE control elements in a frame bar, and they may contain information specifying the type of bar (e.g. title, palette, general, etc.); a list of picture elements for "add" and "replace" (omitted for "copy" and "erase"); and a tag identifying a particular element (not applicable to "add").

HIGHLIGHT, INVERT, HIDE, BLINK change attributes in a frame bar element, and they may contain information specifying a set/clear attribute; the type of bar; and a tag identifying a particular element in the bar.

The following are the various Windowing responses and the types of information which may be associated with each:

STATUS describes the current status of the window, and it may contain information specifying a connector to the window; specifying the originator (i.e. "window"); an original message identifier, if applicable; the subsystem; the name of the window; a connector to the window's console manager; the position of the window on the screen; the pane size and location; a connector to the picture currently mapped to the window; and the size and position of the view.

BAR represents a request to a "copy" request, and it may contain information specifying the type of bar (e.g. title, palette, general, corner box, etc ); and a list of picture elements.

CLICK describes a user-initiated event on or inside the window, and it may contain information specifying what event (e.g. inside a pane, frame bar, corner box, pop-up menu, function key, etc.); a connector to the window manager; a connector to the window's Console Manager; the name of the window; a menu or function-key name; a connector to the associated picture manager; a label from a menu or palette bar item or from a function key; the position of the cursor where the action occurred; the action performed by the user; a copy of the elements at the particular position; the first element's number; the first element's identifier; a copy of the character typed or a boundary indicator or the completion character; and other currently selected elements from all other windows, if any.

Virtual Terminal

In general, a virtual terminal window's behavior emulates that of a particular "real" terminal. If no particular emulation is requested, a simple "generic" terminal is provided.

The virtual terminal resource creates a picture of the given dimensions to represent the virtual "screen". The "screen" is strictly text-oriented and is organized as lines and characters, as reflected in messages. The virtual screen is displayed in a default window created by the terminal manager.

The following are the various Virtual Terminal requests and the types of information which may be associated with each:

WRITE sends the output to a terminal window, and it may contain information specifying a connector to the virtual terminal; the characters to be written; the data type; and the position on the virtual screen.

READ gets input from a terminal window, and it may contain information specifying a connector to the virtual terminal; an optional prompt string; a parameter to protect typed input (i.e. don't "echo"); continuous read (i.e. automatically re-issue the request at the end of every input line); the maximum number of characters to return; and the position on the virtual screen.

CANCEL terminates outstanding requests from processes, it contains no parameters.

SCROLL shifts a subset of lines up or down (inserts blank lines to fill a gap), and it may contain information specifying a starting and ending line number; and the number of lines to shift.

The following are the various Virtual Terminal responses and the types of information which may be associated with each:

STATUS describes the current state of the terminal, and it may contain information specifying a connector to the terminal; specifying the originator (i.e. the "terminal"); an original message identifier, if applicable; the name of the terminal; the height and width in characters; and the name of the emulator (if any).

WRITE is a response from a virtual terminal "read", and it may contain information specifying the name of the terminal; a connector to the terminal; specifying the originator (i.e. the "terminal"); the characters read, followed by a null character; the data type; and the character position within the terminal's "virtual screen".

Dialog Service

The dialog service provides representation-independent interaction with a user (as compared with device-independence, which is at a lower level). To a large extent programmers can ignore how prompts, error messages, etc. are displayed, and how prompts are answered or commands are issued. Thus the visual aspect of the interaction can be tailored to specific applications, users, or devices, independently of the software. For example, requesting a report to be printed may be accomplished by selecting an icon on one system, using a menu on another, and pressing a function-key on a third. The report-printing program would be identical on all three systems.

Dialog comprises five primitive components: menus, prompts, icons, values, and informational boxes. Of these, the first four are primarily for entering data and the last is for telling the user something (e.g. "the printer is out of paper"). They are useable at three different levels.

The least complicated (and also least independent) is exemplified by sending a menu directly to the dialog manager. The dialog manager will construct the appropriate display, then return the item selected by the user. Alternatively, the menu could be placed in a file and activated by sending only the file's name to the dialog manager.

The generalized "click" message is used to indicate that an action has been performed (such as selecting an item from a menu, or selecting an icon).

A "metaphor" defines the visual environment in which the user operates on a particular screen. It consists of any combination of pre-defined windows, icons, menus, and soft-keys appropriate to that environment. In general, a metaphor graphically depicts a real user environment. Thus the icons may represent physical objects in the user's frame of reference, such as file folders or diskettes, menus and messages phrased in familiar terminology, and so on.

The dialog service is most useful for low-volume interaction. For large amounts of data display or input, especially if the data is highly structured, other Human Interface services and tools, or specialized applications programs, would be more appropriate.

All dialog requests are sent directly to the desired console. The picture is always displayed on the screen which the user is using at that moment, and at the most appropriate location (usually the current cursor position). In general, dialog can be referenced indirectly (through a predefined picture in the Human Interface library or a unique file) or can be included explicitly in the request. In the latter case, a default display format is used. The "menu", "prompt", "value", and "dialog" (and "info", if "wait" is specified) are generally expected to be used via the CALL primitive, although they may be used otherwise. The "click" is used by the windowing service.

The following are the various Dialog Requests and the types of information which may be associated with each:

META displays initial/new icons and windows, and it may contain information specifying the name of a picture file in the Human Interface directory; the color of the metaphor background; data in a picture; and the name of the picture file which contains the icon, menu, prompt, and information picture elements.

TITLE is used to replace elements in the metaphor's title, and it may contain information specifying a list of picture elements (existing elements with matching tags are replaced; replacing an element with a null element effectively deletes it; if omitted all tagged elements are deleted).

ICON displays a new icon in the current metaphor, and it may contain information specifying the name of a picture element in the metaphor's current icon library; the identity of the icon on the screen; and a single picture element.

ERASE is used to remove an icon, and it may contain information specifying a particular icon (default: all icons).

MENU is used to create and display a temporary window containing a menu, and it may contain information specifying the absolute position of the dialog window on the screen; a connector to a window within which to display the menu; the relative position of the window (with respect to the given window, if any, otherwise with respect to the screen; any combination of "centered", "upper", "lower", "left", and "right"); the name of a picture element in the metaphor's current library; the number of items to show in the window; specifying that the given items are to be arranged in a given number of evenly-spaced columns; a list of menu items; specifying highlighting; a name returned in the "click" message to help identify the particular menu selected, if more than one is possible; an alternate format; and an optional window title.

PROMPT is used to ask a question and return the answer, and it may contain information specifying absolute position of the dialog window on the screen; a connector to a window within which to display the menu; the relative position of the window (with respect to the given window, if any, otherwise with respect to the screen; the name of a picture element in the metaphor's current library; a question string; the maximum length of a typed response; a list of items any of which can be selected by the user as a response; the maximum width of the text box; a name returned in the "click" message to help identify the particular prompt, if more than one is possible, an alternative format; and a default initial response string.

INFO is used to display an informative message, and it may contain information specifying absolute position of the dialog window on the screen; a connector to a window within which to display the menu; the relative position of the window (with respect to the given window, if any, otherwise with respect to the screen; the name of a picture element in the metaphor's current library; the name of a file containing a picture; information to be displayed; specifying to wait for a response; specifying to highlight the window to indicate that the picture corresponds to an error condition; and the maximum width of the text box.

HIGHLIGHT, INVERT, HIDE, BLINK are used to change an attribute in an icon (etc.) element, and they may contain information specifying whether the attribute is set/cleared; the type of metaphor element (menu, icon, key, title); and identifying the metaphor element (if omitted, all elements of the given type are affected).

OPEN_MENU is used to define or redefine the current "open" key menu, and it has the same format as the MENU request.

CANCEL is used to erase any dialog requested by the sending process, and it may contain information specifying what is to be cancelled (any combination of information, menu, prompt, or value).

The following are the various Dialog responses and the types of information which may be associated with each:

CLICK indicates that an action has occurred in the metaphor, and it may contain information specifying the name of the currently active metaphor from its "title" element, if given, or else its file name; what event (e.g. menu, icon, title, function key, prompt, value, etc ); the name of the menu, picture, etc. (if given); the label assigned to the icon, menu item, etc. in its tag field; a numeric input value; a typed response; the point on the screen where the action occurred; a connector to the associated screen; the console and screen names; a connector to the window or terminal manager, if either was opened automatically; the name of a process to initiate; the name of a process to which to send a message; a message identifier; an optional "argument" descriptor string; and a list of currently selected elements (from all windows), if any.

Metaphor

A "metaphor" picture comprises more-or-less arbitrary picture elements which model a particular frame of reference for the user. For example, the picture may represent a "desktop", with appropriate elements (typewriter, letter "in" and "out" trays, pads of paper, etc.). The name of the metaphor must be unique among metaphors.

ICONS: Selecting an icon causes the metaphor's owner to be notified via a "click" message. Icons are distinguished from other picture elements by tags which contain the following substrings:

Name=a short string which uniquely labels the icon and identifies it to the applications program; the string will be sent (in the "click" message) when the icon is selected.

P=name of the process to activate

M=name of the process to which to send a message

W=position and size of the default window

A=an arbitrary "arguments" string which is passed to the application "as is".

O=a string of single-character options (open a standard window when the icon is opened; open a terminal window when the icon is opened; repeatable)

T=title

Icons must be the last elements in the metaphor picture, following all others. The arguments string ("A" field in the icon's tag) may be arbitrary.

Tagged elements define interactive components of the metaphor, such as icons, menus, etc. The format of the tag contains information which is interpreted dynamically. Untagged elements cannot be selected and are treated as decoration. The formats of all windows are built-in. The owner of an automatically opened window (using the "W" or "T" options) is the dialog manager. An application must issue a "change" request to the console to acquire ownership of the window.

Although a metaphor is usually designed for a particular screen, it will automatically be adjusted to fit any console on which it is displayed.

TITLE: An element tagged "TITLE=metaphor-name" may optionally be included in the picture. The element will occupy the entire top line of the screen. If the element is a macro, all sub-elements in the macro are displayed in the line. Sub-elements must be individually tagged if the title line will be dynamically altered via a "title" request.

Sub-elements tagged "DATE" or "TIME" will automatically display the current date or time. The elements must be "text" and must be large enough to contain the dynamic strings. The data minimally consists of the month and day; if the string is 10 characters or longer, the day of the week will also be displayed.

POP-UP MENUS: Up to 9 elements in the picture may be tagged "MENU=name; n", where "name" identifies a menu in the Human Interface library and "n" indicates which menu key on the keyboard can be used to "pop-up" the menu. "n" may also be a name, indicating that the menu can only be referenced indirectly (via a request or through the nested sub-menu option). Both may also be given, as in "MENU=. . . ; 1; edit".

The name is returned in the "click" message to help distinguish the selection. Normally, menu elements are defined as null (type "n") picture elements. If not (i.e. the element is visible on the screen), the menu will also be displayed any time the element is selected.

An in-line, predefined menu can be set up by replacing the name with a list of explicit menu items, for example: "MENU=copy, cut, paste; 1". One element tagged "OPEN=name" (or "OPEN=list") may be included in the picture to associate a menu with the Human Interface "open" function-key. If such an element is not defined, pressing "open" will cause an "Open" message (containing a "position" field specifying the cursor row and column) to be sent to the owner of the metaphor.

SOFT-KEYS: One element in the picture may be tagged "KEYS=name", where "name" identifies a menu in the Human Interface library. Each item in the menu will be displayed as a "soft key". An in-line, predefined set of keys can be set up by replacing the name with a list of explicit items, for example: "KEYS=open, close, quit". A "name" may be given to the set of keys by appending; "name". e.g. "KEYS=. . . ; name". The name is returned in "click" messages to help identify the response.

The soft-key element is usually a "rectangle" which defines the area of the screen reserved for display of the keys. The element type can also be "n" (null) in which case the keys will not be displayed. The actual number of keys which can be displayed is limited only by the physical size of the screen in use at the time the metaphor is displayed.

The soft-key area is aligned along the appropriate edge of the screen when the metaphor is activated. Selecting a soft-key on the screen is equivalent to selecting the corresponding item from a menu.

LIBRARIES: Menus (as well as icons, prompts, and information) can be stored in "libraries" to which the metaphor may be linked when it is built or when it is initiated. A library consists of individual elements, each of which represents one menu, icon, etc. The first substring of the element's "tag" field is the element's name. The "name" is referenced in the corresponding dialog request ("icon", etc.) or response ("click").

An icon is usually a single element. Menus, prompts, and information are generally composites and must each be stored as a distinct macro element in the library picture.

Library references can be built into a metaphor picture (as opposed to being specified in the "meta" message) by including a null picture element tagged "LIB=picture". "Picture" is the name of a file containing the library picture.

MENU: A "menu" picture comprises two or more menu "items", each of which is simply a picture element, usually of type "text" although there are no restrictions on pictorial menus.

Each item in the menu is described by a simple element, usually text or a symbol. The element is tagged with a string which is to be sent to the application process when that item is selected from the menu. For example, in a menu of colors, blocks in the actual colors might be displayed but the tags could be "red", "blue", etc.

If the menu item is a text string ending in ". . . ", the text (excluding the ellipsis) is assumed to refer to another menu in the Human Interface library. When the item is selected, the referenced menu is automatically brought up. That menu may itself contain further menu references, allowing chaining to any arbitrary depth. Only the final selection is returned to the process.

Preceding an item with "+" indicates that the item is currently "active" and causes a check mark to be displayed beside it whenever the menu is opened. Preceding an item with "-" indicates that the corresponding option is not currently available and cannot be selected An "arguments" string can be appended to the tag of an element in the menu. The string is passed "as is" to the application when the item is selected.

PROMPT: The greater part of a prompt picture comprises text which asks a question, often with some introductory preamble. One element, located anywhere in the picture, may represent a response area. This is generally a rectangular area into which a user can type the information requested by the prompt. This element must be tagged "RESP".

Two further elements, tagged "ENTER" and "CANCEL", display target text or symbols which are used to complete the prompt. When the "enter" element is selected by the user, the text typed in the response area is returned to the originator of the prompt.

If the "cancel" element is selected instead, the prompt is cancelled with a null response. The response element is optional. If omitted, the "enter" and "cancel" elements effectively correspond to "yes" or "no" responses. Typing a "carriage return" character will have the same effect as selecting "enter". The prompt is erased when any response is given, or by an explicit "cancel" request.

INFORMATION: An information picture comprises text (and possibly graphics) which describes something. One element, located anywhere in the picture, is usually tagged "DONE". When this element is selected, the information picture is erased from the display. If no such element is given, the process which requested the information to be displayed must send an explicit "cancel" request when it wants to get rid of it.

Figure 12:
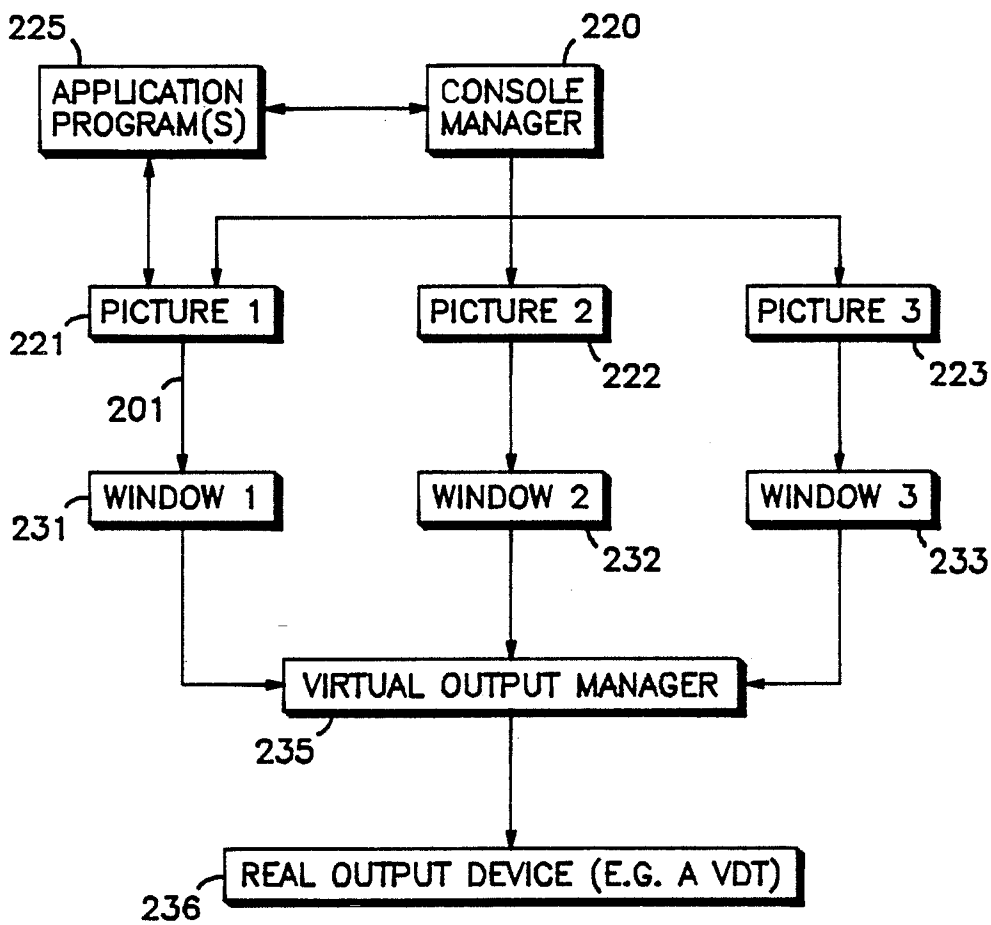
FIG. 12 shows the relationship between pictures, windows, the console manager, and a virtual output manager through which multiple applications can share a single video display device, in accordance with a preferred embodiment of the present invention.

FIG. 12 illustrates the relationship between pictures, windows, the console manager (which creates and destroys the objects), and a virtual output manager (which performs output to physical devices). In response to one or more application programs 225, the console manager 220 may create one or more pictures 221–223. The console manager 220 may also create at least one window for viewing a portion of each picture. The virtual output manager 235 translates the virtual output corresponding to each window into a form suitable for display on a "real" output device such as a video display terminal.

One or more of windows 231–233 can be displayed simultaneously on output device 236. While windows 231–233 are shown to display portions of separate pictures, they could just as well display different portions of a single picture.

Figure 13:
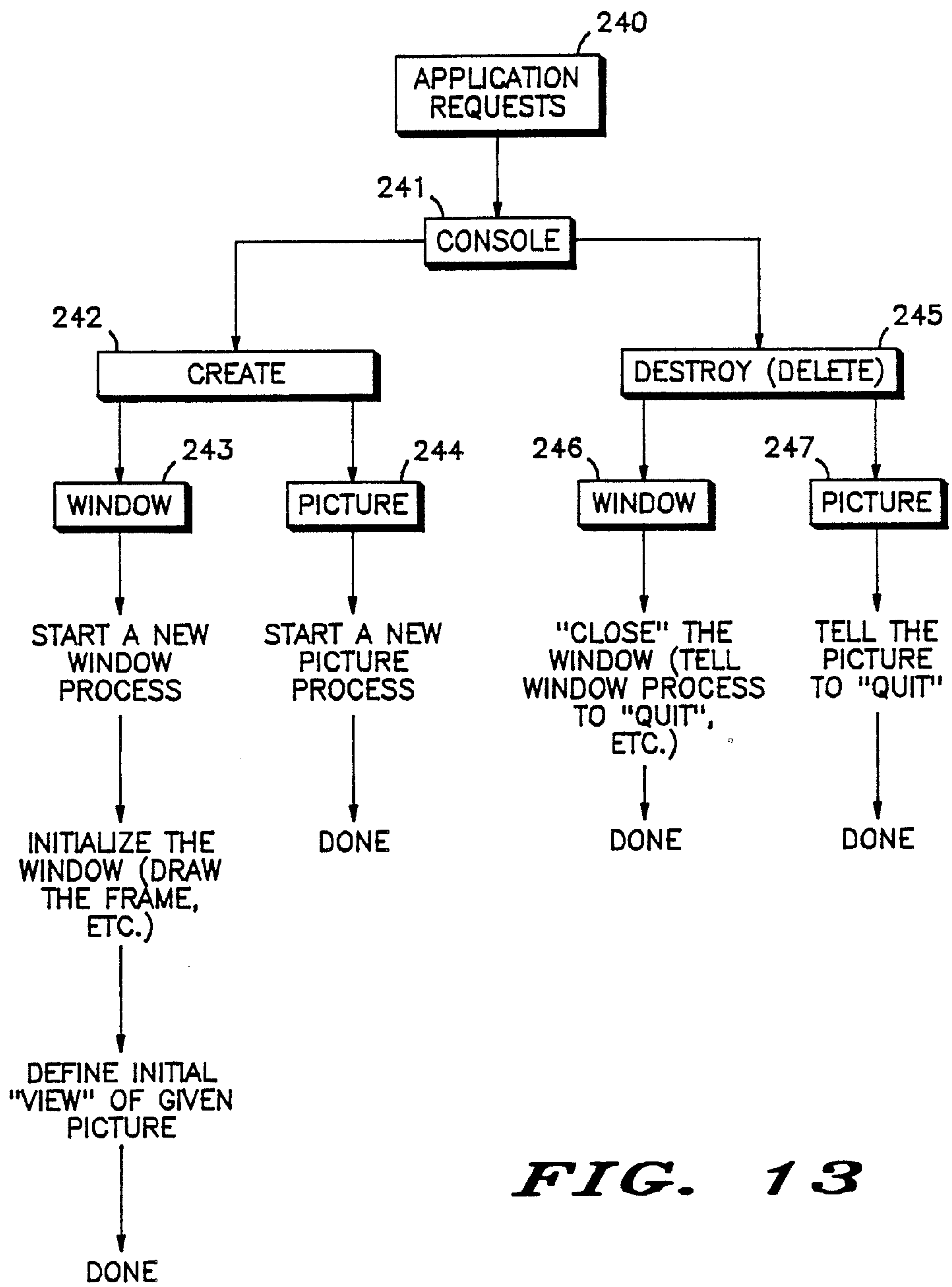
FIG. 13 shows a flowchart illustration how an application program interacts with the console manager process to create/destroy windows and pictures, in accordance with a preferred embodiment of the present invention.

FIG. 13 shows a flowchart illustrating how an application program interacts with the console manager process to create or destroy windows and pictures. In response to application requests 240, the console manager 241 can proceed to an appropriate program module 242 to create a picture 244 or a window 243, or to module 245 to destroy a window 246 or a picture 247.

If the console manager is requested to create a new window 243, it first starts a new window process. Then it initializes the window by drawing the frame, etc. Then it defines the initial view of the given picture.

If the console manager is requested to create a new picture 244 it starts a new picture process.

If the console manager is requested to delete a window 246, it closes the window.

If the console manager is requested to delete a picture 247, it tells the picture to quit.

Figure 14:
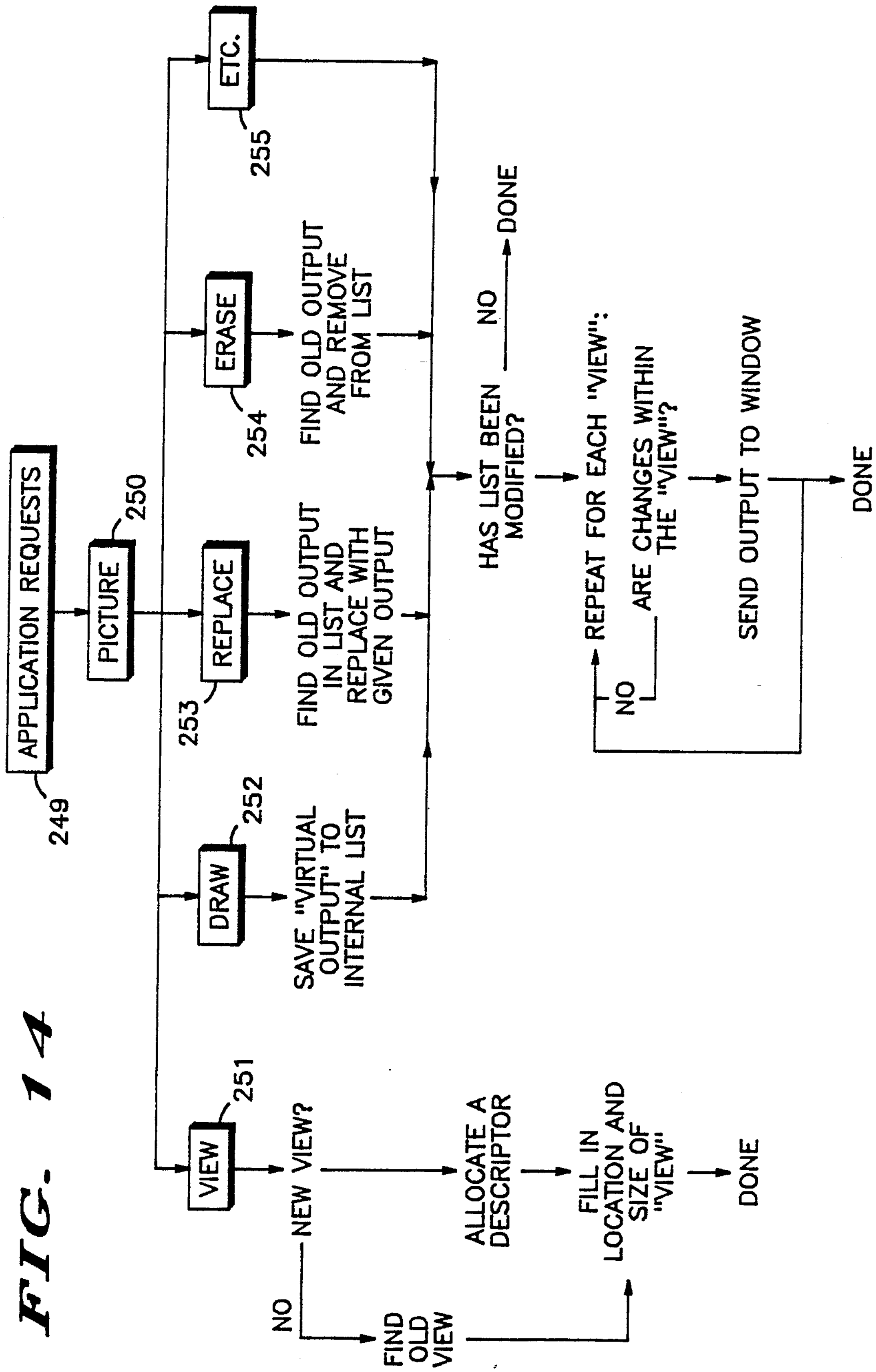
FIG. 14 illustrates an operation to update a picture and see the results in a window of selected size, in accordance with a preferred embodiment of the present invention.

FIG. 14 illustrates an operation to update a picture and see the results in a window of selected size, in accordance with a preferred embodiment of the present invention. The operation performed in FIG. 14 corresponds to that indicated by line segment 201 in FIG. 12.

In response to a request from an application 249, the picture manager 250 may perform any of the indicated update actions. For example, the picture manager 250 may change the view of the picture by allocating a descriptor and accordingly filling in the location and size of the view.

Or the picture manager 250 may draw, replace, erase, etc. picture elements appropriately as requested. It repeats the requested operation for each view.

Description of Source Code Listing

Program Listings A and B contain a "C" language implementation of the concepts relating to adjusting the size of a display window as described hereinabove. The following chart indicates where the relevant portions of the listings may be found.

| Function | |
|---|---|
| | Line Numbers in Program Listing A |
| Main-line: initialization; accept requests | 190–222 |
| Determine type of request | 329–369 |
| Create: | 418–454 |
| Create a window | 1298–1600 |
| Create a picture | 440–447 |
| Destroy (delete) | 456–484 |
| | Line Numbers in Program Listing B |
| Main-line: initialization; start processing | 125–141 |
| Accept requests; check for changes | 161–203 |
| Determine type of request | 239–310 |
| View: | 1205–1249 |
| Draw: | 410–457 |
| Replace: | 537–585 |
| Erase: | 587–609 |

It will be apparent to those skilled in the art that the herein disclosed invention may be modified in numerous ways and may assume many embodiments other than the preferred form specifically set out and described above. For example, its utility is not limited to a distributed data processing system or any other specific type of data processing system.

Accordingly, it is intended by the appended claims to cover all modifications of the invention which fall within the true spirit and scope of the invention.

PROGRAM LISTING A

```
     Module          : %M% %I%
     Date submitted  : %E% %U%
     Author          : Frank Kolnick
     Origin          : cX
     Description     : Console Manager

*************************************************************************/

#ifndef lint
static char SrcId[] = "%Z% %M%:%I%";
#endif
/* Console manager:  global data */

#include    <cX.h>                                          /* cX definitions */
#include    <HI.h>                                          /* picture, etc. definitions */
#include    <memory.h>
#include    <string.h>
#include    <gen codes.h>
static long none[2] = {0,0};

#define     MIN_HT  (1*VCHAR_HT)                            /* minimum window height */
#define     MIN_WD  (5*VCHAR_WD)                            /* minimum window width */
#define     POOL_SIZE 10                                    /* #nodes in local pool */
#define     activate(node) if (!node->never) map->active = node

typedef struct names                                        /* name of console, etc.: */
{
    char            type of structure[16];                  /*     (identifies struct.) */
    char            console[32];                            /*     console's name */
    char            class[32];                              /*     console's class */
    char            screen[32];                             /*     screen's name */
    char            user[64];                               /*     screen's user's name */
    char            metaphor[32];                           /*     preferred metaphor */
    } ...

typedef struct editstat                                     /* editing status: */
{
```

```
        char                    type_of_structure[16];  /*      (identifies struct.) */
        char                    type;                   /*      element type */
        char                    *text;                  /*      start of text */
        char                    *text_end;              /*      end of text */
        char                    *pos;                   /*      position in text */
        char                    *draw_msg;              /*      original msg. */
        unsigned long           msg_size;               /*      msg. size */
        P_E_HDR                 *hdr;                   /*      ->element header */
        short                   row, col;               /*      element position */
        short                   height, width;          /*      box dimensions */
        CONNECTOR               picture;                /*      conn. to picture mgr. */
} EDIT;

typedef struct mapnode                                  /* maps pictures to windows:   */
{
        struct mapnode          *nxt, *pre;             /*      links */
        short                   row, col;               /*      window's position */
        short                   height, width;          /*      pane size */
        short                   out_ht, out_wd;         /*      outer dimensions */
        short                   outer;                  /*      outline + pane width */
        short                   top, bottom;            /*      window margins... */
        short                   left, right;            /*      ... */
        short                   fill_row, fill_col;     /*      position and area ... */
        short                   fill_ht, fill_wd;       /*      ... before 'fill' */
        char                    outline, pane;          /*      outline & pane widths */
        char                    style;                  /*      outline style */
        unsigned char           pool;                   /*      'from local pool' */
        CONNECTOR               owner;                  /*      conn. to creator */
        CONNECTOR               terminal;               /*      conn. to terminal */
        CONNECTOR               window, picture;        /*      to window, picture */
        char                    name[32];               /*      window's name */
        char                    device[32];             /*      input device's name */
        unsigned char           metaphor;               /*      metaphor window */
        unsigned char           tight;                  /*      close-fitting window */
        unsigned char           default_pos;            /*      default position */
        unsigned char           chars;                  /*      character-oriented */
        unsigned char           on_element;             /*      notify on select */
        unsigned char           on_select;              /*      ... select anywhere */
        unsigned char           on_cancel;              /*      ... select cancelled */
        unsigned char           on_open;                /*      ... 'open' key */
        unsigned char           on_modify;              /*      ... modification */
        unsigned char           on_close;               /*      ... before close */
        unsigned char           on_quit;                /*      ... after close */
        unsigned char           on_window_edge;         /*      ... edge of window */
        unsigned char           on_picture_edge;        /*      ... edge of picture */
        unsigned char           on_anychar;             /*      ... any input char. */
        unsigned char           on_delete;              /*      ... char. deleted */
```

```
        unsigned char     on_box;                   /*      ... end of box */
        unsigned char     on_location;              /*      ... cursor location */
        unsigned char     on_insert;                /*      ... new element */
        unsigned char     auto_highlight;           /*      auto. highlighting */
        unsigned char     editable;                 /*      can edit picture */
        unsigned char     multi_select;             /*      multi-elem. selection */
        unsigned char     never;                    /*      don't make active */
        unsigned char     remap;                    /*      remap at window edge */
        unsigned char     nonmod;                   /*      non-modifiable */
        unsigned char     fixed;                    /*      immoveable */
        unsigned char     keep_open;                /*      user can't close */
        short             title, menu, palette;     /*      title (etc.) bar... */
        short             Vscroll, Hscroll;         /*      heights/widths... */
        short             general_use;              /*      ... */
        short             corner, resize_box;       /*      ... */
        unsigned char     move_mark;                /*      move mark on 'select' */
        unsigned char     special[22];              /*      special chars. */
        unsigned char     term[12];                 /*      end-of-input chars. */
        EDIT              *edit;                    /*      ->editing descriptor */
    } MAPNODE;

    typedef struct screen_descr                     /* screen parameters: */
    {
        char              type_of_structure[16];    /*      (identifies struct.) */
        short             row, col;                 /*      cursor position */
        short             height, width;            /*      screen dimensions */
        short             meta_row, meta_col;       /*      metaphor limits... */
        short             meta_ht, meta_wd;         /*      ... */
        short             char_ht, char_wd;         /*      char. dimensions */
        short             colors;                   /*      no. of colors */
        unsigned char     char_gen;                 /*      'h/w char. generator' */
        unsigned char     char_align;               /*      'align to char.' */
        unsigned char     bit_map;                  /*      'bit-mapped display' */
        unsigned char     fonts;                    /*      'variable fonts' */
    } SCREEN;

    typedef struct windowstat                       /* window status: */
    {
        char              type_of_structure[16];    /*      (identifies struct.) */
        char              area;                     /*      current area */
        char              bar;                      /*      current bar */
        short             row, col,                 /*      converted cursor pos. */
        P_E_HDR           *hdr;                     /*      ->element header */
        short             elem_row, elem_col;       /*      current element pos'n */
        short             prev_row, prev_col;       /*      prev. element pos'n */
        unsigned char     different;                /*      'current != prev.' */
        MAPNODE           *node;                    /*      ->corresponding node */
        MAPNODE           *previous;                /*      ->previous node */
    } WINDOW;
```

```
typedef struct selstat                                    /* selection status: */
{
    char              type_of_structure[16];  /*     (identifies struct.) */
    unsigned char     pending;                /*      select in progress */
    char              area;                   /*     original window area */
    short             row, col;               /*     orig. pos'n in window */
    MAPNODE           *map;                   /*     ->original map node */
} SELECTION;

typedef struct cur_message                                /* current message: */
{
    char              type_of_structure[16];  /*     (identifies struct.) */
    char              *buff;                  /*     ->msg. buffer */
    CONNECTOR         sender;                 /*     conn. to sender */
    long              size;                   /*     size of msg. */
} MESSAGE;

typedef struct process_ids                                /* identifies key processes: */
{
    char              type_of_structure[16];  /*     (identifies struct.) */
    CONNECTOR         output;                 /*     Output Manager */
    CONNECTOR         input;                  /*     Input Manager */
    CONNECTOR         dialogue;               /*     Dialog Manager */
    CONNECTOR         self;                   /*     this process */
    CONNECTOR         owner;                  /*     initializing process */
} COMMS;

typedef struct lists                                      /* list pointers, etc.: */
{
    char              type_of_structure[16];  /*     (identifies struct.) */
    MAPNODE           *pool;                  /*     ->buffer pool */
    long              count;                  /*     current #window nodes */
    MAPNODE           *active;                /*     ->active node, if any */
    MAPNODE           *first;                 /*     ->start of list */
    MAPNODE           *last;                  /*     ->end of list */
    MAPNODE           *last_active;           /*     ->prev. active node */
    MAPNODE           *metaphor;              /*     ->metaphor node */
} LIST;

/*  Local functions:  */

MAPNODE    *find_window(), *create_window(), *create_terminal();
long       NewProc();
```

```
/* Console manager:  main-line */

PROCESS(Console)
{
    NAME                    *name;
    SCREEN                  *screen;
    LIST                    *map_ptr;
    SELECTION               *sel;
    WINDOW                  *window;
    MESSAGE                 *msg_ptr;
    CONNS                   *conn_ptr;
    register LIST           *map;
    register MESSAGE        *msg;
    register CONNS          *conn;
    register short          go = YES;
    long                    list_size = 0, *req = NULL;

    Set_event_key("Console mgr.");
    init_CM(&name,&screen,&map_ptr,&sel,&window,&msg_ptr,&conn_ptr);
    map = map_ptr;
    msg = msg_ptr;
    conn = conn_ptr;
    start_up(name,screen,conn);
    while (go)
    {
        msg->buf = Get(0,&msg->sender,&msg->size);
        if (!*(msg->buf+1))
            input(screen,map,sel,window,msg,conn,*msg->buf);
        else
            request(name,screen,ma[illegible],msg,conn,msg->buf,msg->size);
        highlight(map->active,map);
        free_requests(msg->buf,[illegible]ze,&req,&list_size);
    }
    Exit();
}

free_requests(msg,size,req,list_size)
register char    *msg, **req;
register long    size, *list_size;
{
    register char    *temp, *next;

    if (msg)
    {
        *(char**)msg = *req;
        *req = msg;
        *list_size += size;
        if (!Any_msg(NULL) || *list_size > 1000)
            for (temp = *req, *req = NULL, *list_size = 0; temp; temp = next)
            {
```

```
                next = *(char**)temp;
                Free(temp);
            }
        }
    }

    init CM(name,screen,map,sel,window,msg,conn)
    register NAME          **name;
    register SCREEN        **screen;
    register LIST          **map;
    register SELECTION     **sel;
    WINDOW                 **window;
    MESSAGE                **msg;
    CONNS                  **conn;
    {
        *name = (NAME *) Alloc(sizeof(NAME),YES);
        *screen = (SCREEN *) Alloc(sizeof(SCREEN),YES);
        *map = (LIST *) Alloc(sizeof(LIST),YES);
        *sel = (SELECTION *) Alloc(sizeof(SELECTION),YES);
        *window = (WINDOW *) Alloc(sizeof(WINDOW),YES);
        *msg = (MESSAGE *) Alloc(sizeof(MESSAGE),YES);
        *conn = (CONNS *) Alloc(sizeof(CONNS),YES);
        memset(*name,0,sizeof(NAME));
        strcpy(*name,"name:");
        memset(*screen,0,sizeof(SCREEN));
        strcpy(*screen,"screen:");
        memset(*map,0,sizeof(LIST));
        strcpy(*map,"list:");
        memset(*sel,0,sizeof(SELECTION));
        strcpy(*sel,"selection:");
        memset(*window,0,sizeof(WINDOW));
        strcpy(*window,"window:");
        memset(*msg,0,sizeof(MESSAGE));
        strcpy(*msg,"message:");
        memset(*conn,0,sizeof(CONNS));
        strcpy(*conn,"conns:");
        (*map)->pool = (MAPNODE *) Alloc(POOL_SIZE*sizeof(MAPNODE),YES);
        memset((*map)->pool,0,POOL_SIZE*sizeof(MAPNODE));
    }
```

```
start up(name,screen,conn)
register NAME    *name;
register SCREEN *screen;
register CONNS  *conn;
{
    register char   *msg;
    CONNECTOR       config;
    short           *p;
    long            size;

    while ((msg = Get(0,&conn->owner,&size)) && strcmp(msg,"init"))
    {
        reply status(msg,msg,"not ready",0);
        Free(msg);
    }
    strcpy(name->console,Find triple(msg,"name",size,none,2,NULL));
    conn->self = *(CONNECTOR *) Find_triple(msg,"self",size,none,4,NULL);
    Free(msg);
    if (config.pid = NewProc("CMconfig","//processes/CMconfig",YES,-1))
    {
        Put(DIRECT,config.pid,Newmsg(32,"I",NULL));
        while (!Any_msg(config.pid))
            if (Any_msg(conn->owner.pid))
                Forward(DIRECT,config.pid,Get(conn->owner.pid,0,0));
            else
                Free(Call(NEXT,"Clock",
                    Newmsg(64,"set","attr=#5s",0,0,0,5,0),0,0));
        msg = Get(config.pid,0,&size);
        conn->input = *(CONNECTOR*) Find_triple(msg,"inp ",size,none,4,NULL);
        conn->output = *(CONNECTOR*) Find_triple(msg,"outp",size,none,4,NULL);
        conn->dialogue = *(CONNECTOR*) Find_triple(msg,"dial",size,none,4,NULL);
        Free(msg);
        if (msg = Call(DIRECT,conn->output.pid,Newmsg(32,"query",NULL),0,&size))
        {
            p = (short *) Find triple(msg,"scrn",size,none,4,NULL);
            screen->meta ht = screen->height = *p++;
            screen->meta_wd = screen->width = *p;
            screen->char_gen = screen->char align =
                (char) Find triple(msg,"char",size,NO,0,NULL);
            screen->colors = *(short*) Find triple(msg,"clrs",size,none,2,NULL);
            screen->bit map = (char) Find triple(msg,"bmap",size,NO,0,NULL);
            screen->fonts = (char) Find_triple(msg,"font",size,NO,0,NULL);
            Free(msg);
        }
        else
            Note("'query' to output mgr. failed",msg);
        Put(DIRECT,conn->owner.pid,
            Newmsg(128,"ready","serv=#S; name=#S","console",name->console));
    }
}
```

```
request(name,screen,map,sel,msg,conn,buf,size)
register NAME           *name;
SCREEN                  *screen;
register LIST           *map;
SELECTION               *sel;
register MESSAGE        *msg;
register CONNS          *conn;
register long           buf, size;
{
    if (!strcmp(buf,"create"))
        Create_resource(screen,map,buf,size,&conn->output,&msg->sender);
    else if (!strcmp(buf,"write"))
        element_selected(map,sel,msg);
    else if (!strcmp(buf,"delete"))
        Delete_resource(map,msg,conn,sel);
    else if (!strcmp(buf,"Meta"))
        Metaphor(screen,map,buf,size,&conn->output,&conn->dialogue);
    else if (!strcmp(buf,"user"))
        Set_user(name,buf,size);
    else if (!strcmp(buf,"resource"))
        ;
    else if (!strcmp(buf,"query"))
        Query(name,screen,map,msg,conn);
    else if (!strcmp(buf,"change"))
        Change(screen,map,msg);
    else if (!strcmp(buf,"remapped"))
        remap(&msg->sender,NULL,F_triple(buf,"conn",0,0,8,0),sel,map);
    else if (!strcmp(buf,"failed"))
        Status(buf,size);
    else if (!strcmp(buf,"done") || !strcmp(buf,"status"))
        ;
    else if (conn->dialogue.pid)
    {
        buf = (long) Realloc(buf,size+20,YES);
        Append_triple(buf,"Cpos",4,&screen->row);
        Forward(DIRECT,conn->dialogue.pid,buf);
        msg->buf = NULL;
    }
    else
        reply_status(buf,buf,"unknown msg id",0);
}
```

```
Query(name,screen,map,msg,conn)
NAME        *name;
SCREEN      *screen;
LIST        *map;
MESSAGE     *msg;
CONNS       *conn;
{
    static char          def_res[] = "console";
    register char        *window_name, *resource, *p;
    register MAPNODE     *node = NULL;
    CONNECTOR            *res;

    resource = Find_triple(msg->buf,"res ",msg->size,def_res,2,NULL);
    if (!strcmp(resource,"console"))
        Reply(msg->buf,Newmsg(500,"console",
            "name=#S; user=#S; clrs=#s; conn=#C; orig=#S",
            name->console,name->user,screen->colors,&conn->self,"console"));
    else
    {
        if (window_name = Find_triple(msg->buf,"name",msg->size,NULL,2,NULL))
        {
            if (!(p = strrchr(window_name,'/')))
                p = window_name;
            for (node = map->first;
                node && strcmp(p,node->name); node = node->nxt) ;

        else if (res = (CONNECTOR*) Find_triple(msg->buf,"conn",0,NULL,1,NULL))
            for (node = map->first; node && node->window.pid != res->pid
                && node->picture.pid != res->pid
                && node->terminal.pid != res->pid; node = node->nxt) ;
        else
            reply_status(msg->buf,"-query","missing name/connector",0);
        if (node)
        {
            if (!strcmp(resource,"window"))
                Forward(DIRECT,node->window.pid,msg->buf);
            else if (!strcmp(resource,"terminal") && node->terminal.pid)
                Forward(DIRECT,node->terminal.pid,msg->buf);
            else if (!strcmp(resource,"picture") && node->picture.pid)
                Forward(DIRECT,node->picture.pid,msg->buf);
            else
                Free(msg->buf);
            msg->buf = NULL;
        }
    }
}
```

```
Create_resource(screen,map,buf,size,output,sender)
SCREEN          *screen;
LIST            *map;
CONNECTOR       *output, *sender;
register long   buf, size;
{
    static char             def_res[] = "window";
    register char           *resource, *p;
    register MAPNODE        *node = NULL;
    register CONNECTOR      *conn = NULL;
    CONNECTOR               picture;

    resource = Find_triple(buf,"res ",size,def_res,2,NULL);
    if (!strcmp(resource,"window")
        && (node = create_window(screen,map,output,"Window",buf,size)))
        {
            conn = &node->window;
            node->owner = *sender;
        }
    else if (!strcmp(resource,"terminal") && (node =
         create_terminal(screen,map,output,buf,size,sender)))
            conn = &node->terminal;
    else if (!strcmp(resource,"picture"))
        (picture.pid = NewProc("picture","//processes/picture",YES,-1))
        {
            p = Alloc(size,YES);
            memcpy(p,buf,size);
            Free(Call(DIRECT,picture.pid,p,0,0));
            conn = &picture;
        }
    if (conn)
        Reply(buf,Newmsg(200,"connect","conn=#C; orig=#S; req=#S; res=#S",
            conn,"console","create",resource));
    else
        reply_status(buf,"-create","unknown resource type",0);
    activate(node);
}

Delete_resource(map,msg,conn,sel)
LIST                *map;
register MESSAGE    *msg;
register CONNS      *conn;
SELECTION           *sel;
{
    register MAPNODE        *node, *temp;
    CONNECTOR               *resource;
```

```
        if (resource=(CONNECTOR*)Find_triple(msg->buf,"conn",msg->size,NULL,8,NULL))
            if (!strcmp(Find_triple(msg->buf,"res ",0,NULL,2,NULL),"picture"))
            {
                Put(DIRECT,resource->pid,Newmsg(32,"quit",NULL));
                remap(&msg->sender,NULL,NULL,sel,map);
            }
            else
            {
                temp = map->active;
                for (node = map->first;
                     node && node->window.pid != resource->pid
                     && node->picture.pid != resource->pid
                     && node->terminal.pid != resource->pid; node = node->nxt) ;
                if (node)
                    close_window(node,map,sel,conn);
                if (Find_triple(msg->buf,"rply",msg->size,NO,0,NULL))
                    reply_status(msg->buf,"+delete","resource deleted",cX_DELETED);
                map->active = temp;
            }
    }

    input_screen,map,sel,window,msg,conn,msgid)
    SCREEN              *screen;
    LIST                *map;
    SELECTION           *sel;
    register WINDOW     *window;
    register MESSAGE    *msg;
    CONNS               *conn;
    register char       msgid;
    {
        register char       code;
        register short      *pos;
        register MAPNODE    *node;

        pos = (short *) Find_once(msg->buf,"pos ",msg->size,none,4,NULL);
        code = *Find_triple(msg->buf,"\0\0\0\0",msg->size,none,1,NULL);
        node = map->active;
        if (msgid == 'K' && node)
            key_input(node,window,msg,code);
        else if (msgid == 'F' && node)
            function_key(node,code,&conn->dialogue);
        else
        {
            node = find_window(map,window,*pos,*(pos+1));
            if (msgid == 'P')
            {
                if (node && window->area == 'I')
                    position(node,window);
                screen->row = *pos;
                screen->col = *(pos+1);
```

```
        }
        if (msgid == 'A')
            action(node,screen,map,sel,window,msg,conn,code,*pos,*(pos+1));
        else if (msgid == 'M')
            menu(node,&map->metaphor,code,pos,&conn->dialogue);
    }
}

key_input(node,window,msg,code)
register MAPNODE    *node;
WINDOW              *window;
register MESSAGE    *msg;
register char       code;
{
    register char    *m;
    register EDIT    *edit;

    if (node->terminal.pid)
    {
        Forward(DIRECT,node->terminal.pid,msg->buf);
        msg->buf = NULL;
    }
    else if (edit = node->edit)
    {
        if (code == 127)
            code = 8;
        if (code < 32)
            edit_text(edit,code,node,window);
        else if (*node->term && node->on_modify && strchr(node->term,code))
            end_edit(node,'M',window->row,window->col,code);
        else if (code < 127)
            if (*edit->pos)
            {
                *edit->pos++ = code;
                if (m = Alloc(edit->msg_size,YES))
                {
                    memcpy(m,edit->draw_msg,edit->msg_size);
                    Put(DIRECT,edit->picture.pid,m);
                }
            }
            else if (node->on_box)
                notify_process(node,
                    edit->row,edit->col,'B','I',edit->hdr,code,NULL);
        move_mark(edit->row,
            edit->col+(edit->pos-edit->text)*VCHAR_WD,&node->picture);
        if (*node->special && strchr(node->special,code))
            notify_process(node,edit->row,edit->col,'!','I',NULL,code,node);
    }
    else if (node->on_anychar)
        if ((code > 31 && code < 127) || code == 13 || code == 8)
            notify_process(node,edit->row,edit->col,'A','I',NULL,code,node);
}
```

```
edit_text(edit,code,node,window)
register EDIT        *edit;
register char        code;
register MAPNODE     *node;
register WINDOW      *window;
{
    register char    *m;

    if (node->picture.pid)
        switch (code)
        {
            case 8:     if (edit->pos > edit->text)
                        {
                            edit->pos--;
                            memcpy(edit->pos,edit->pos+1,strlen(edit->pos+1));
                            *edit->text_end = ' ';
                            if (m = Alloc(edit->msg_size,YES))
                            {
                                memcpy(m,edit->draw_msg,edit->msg_size);
                                Put(DIRECT,edit->picture.pid,m);
                            }
                        }
                        else if (node->on_delete)
                            notify_process(node,edit->row,edit->col,
                                'D','I',edit->hdr,code,NULL);
                        break;
            case 9:
                        break;
            case 11:
                        break;
            case 12:
                        break;
            case 10:
            case 13:    if (node->on_modify)
                            end_edit(node,'M',window->row,window->col,code);
        }
}

end_edit(node,why,row,col,code)
register MAPNODE     *node;
register char        why, code;
register short       row, col;
{
    register char    *element = NULL, *reply = NULL;
    register EDIT    *edit;

    if (edit = node->edit)
    {
        if (why && (why != 'X' || node->on_cancel))
        {
```

```
            reply = Call(DIRECT,node->picture.pid,Newmsg(64,"hit",
                "pos=#2s",(edit->hdr)->row,(edit->hdr)->col),0,0);
                  element = Find_triple(reply,"data",0,NULL,1,NULL);
            notify_process(node,row,col,why,'I',element,code,NULL);
            Free(reply);
        }
        Put(DIRECT,node->picture.pid,Newmsg(64,"select",
            "@pos=#2s; off",(edit->hdr)->row,(edit->hdr)->col));
        Free(edit->draw_msg);
        edit->draw_msg = NULL;
        Free(node->edit);
        node->edit = NULL;
    }
}

position(node,window)
register MAPNODE    *node;
register WINDOW     *window;
{
    register short      *reply;
    register P_E_HDR    *hdr;

    if (node->auto_highlight)
    {
        if (window->different)
            Put(DIRECT,node->picture.pid,Newmsg(32,"select","off"));
        reply = (short *) Call(DIRECT,node->picture.pid,
                Newmsg(64,"hit","pos=#2s; sel",window->row,window->col),0,0);
        if (hdr = (P_E_HDR *) Find_triple(reply,"data",0,NULL,1,NULL))
        {
            window->different = (window->node != window->previous
                                 || hdr->row != window->prev_row
                                 || hdr->col != window->prev_col);
            window->prev_row = window->elem_row;
            window->prev_col = window->elem_col;
            window->elem_row = hdr->row;
            window->elem_col = hdr->col;
        }
        if (reply)
            Free(reply);
    }
    if (node->on_location)
        notify_process(node,window->row,window->col,'L','I',NULL,NULL,NULL);
}

action(node,screen,map,sel,window,msg,conn,act,row,col)
register MAPNODE    *node;
register SCREEN     *screen;
register LIST       *map;
register SELECTION  *sel;
register WINDOW     *window;
MESSAGE             *msg;
CONNS               *conn;
```

```
register char          act;
register short         row, col;
{
     switch (act)
     {
          case 's':  select(node,screen,map,sel,window,msg,conn);
                     break;
          case 'W':  Put(DIRECT,conn->dialogue.pid,
                          Newmsg(64,"Open","pos=%2s",row,col));
                     break;
          case 'X':  if (sel->pending)
                          deselect(screen,map,sel,row,col);
                     break;
          case 'u': case 'd': case 'l': case 'r':
          case 'U': case 'D': case 'L': case 'R':
                     scroll(act,map->active);
                     break;
          case 'N':  next window(map);
                     break;
          case 'C':  cancel(sel);
                     break;
          case 'w':  close(node,map,sel,conn);
                     break;
          case 'H':  notify_process(node,row,col,'?',NULL,NULL,NULL,map->active);
                     break;
          case 'T':  NewProc("test","//processes/test",NO,-1);
                     break;
          case '-':  Put(DIRECT,conn->output.pid,Newmsg(32,"hide",NULL));
                     break;
          case '+':  Put(DIRECT,conn->output.pid,Newmsg(32,"restore",NULL));
     }
}

function key(node,key no,dialogue)
register MAPNODE       *node;
char                   key no;
register CONNECTOR     *dialogue;
{
     register char     *reply;

     if (key no && node)
          if (reply = Call(DIRECT,node->window.pid,Newmsg(64,"keys?",NULL),0,0))
               if (!strcmp(reply,"keys"))
               {
                    reply = Realloc(reply,256,YES);
                    strcpy(reply,"Key");
                    Append triple(reply,"num ",1,&key no);
                    Append triple(reply,"ownr",8,&node->owner);
                    Put(DIRECT,dialogue->pid,reply);
               }
               else
                    Free(reply);
}
```

```
menu(node,metaphor,key_no,pos,dialogue)
register MAPNODE     *node, *metaphor;
register char        key_no;
short                *pos;
CONNECTOR            *dialogue;
{
     register char        *reply;
     register CONNECTOR   *owner = NULL;

     if (node)
          owner = &node->owner;
     else
          node = metaphor;
     if (key_no && node && (reply = Call(DIRECT,node->window.pid,
          Newmsg(64,"menu?","key=#b",key_no),0,0)))
          if (!strcmp(reply,"failed"))
          {
               Free(reply);
               reply = NULL;
               if (reply = Call(DIRECT,metaphor->window.pid,
                    Newmsg(64,"menu?","key=#b",key_no),0,0))
                    if (!strcmp(reply,"failed"))
                    {
                         Free(reply);
                         reply = NULL;
                    }
          }
     if (reply)
     {
          reply = Realloc(reply,256,YES);
          strcpy(reply,"Menu");
          Append_triple(reply,"pos ",4,pos);
          if (owner)
               Append_triple(reply,"owner",4,owner);
          Put(DIRECT,dialogue->pid,reply);
     }
}

close(node,map,sel,conn)
register MAPNODE     *node;
register LIST        *map;
register SELECTION   *sel;
register CONNS       *conn;
{
     if (node && !node->keep_open)
          if (node->on_close)
               notify_process(node,0,0,'C',NULL,NULL,NULL,map->active);
          else
               close_window(node,map,sel,conn);
}
```

```
close window(node,map,sel,conn)
register MAPNODE     *node;
register LIST        *map;
register SELECTION   *sel;
CONNS                *conn;
{
    end edit(node,'X',0,0,NULL);
    Put(DIRECT,node->window.pid,Newmsg(32,"Q",NULL));
    if (node->terminal.pid)
    {
        Put(DIRECT,node->terminal.pid,Newmsg(32,"quit",NULL));
        Put(DIRECT,node->picture.pid,Newmsg(32,"quit",NULL));
    }
    node->window.pid = node->picture.pid = node->terminal.pid = NULL;
    if (node == map->active)
    {
        Put(DIRECT,conn->dialogue.pid,Newmsg(32,"keys",NULL));
        next_window(map);
    }
    if (node == map->active)
        map->active = NULL;
    if (node == sel->map)
    {
        sel->map = NULL;
        sel->pending = NO;
    }
    if (node->on quit)
        notify_process(node,0,0,'Q',NULL,NULL,NULL,map->active);
    unmap(node,map);
    free node(node);
    clip_window(map->last);
}

next window(map)
register LIST    *map;
{
    register MAPNODE    *node;

    if ((node = map->active) && node->nxt)
        node = node->nxt;
    while (node && node->never && node != map->active)
    {
        node = node->nxt;
        if (!node)
            node = map->first;
    }
    if (node)
    {
        unmap(node,map);
        map after(node,NULL,map);
        activate(node);
        clip_window(map->last);
    }
```

```
}

select(node,screen,map,sel,window,msg,conn)
register MAPNODE      *node;
LIST                  *map;
register SELECTION    *sel;
register WINDOW       *window;
register MESSAGE      *msg;
CONNS                 *conn;
{
    if (sel->pending)
        cancel(sel);
    if (node)
    {
        Put(DIRECT,node->picture.pid,Newmsg(32,"select","off"));
        sel->row = window->row;
        sel->col = window->col;
        sel->area = window->area;
        sel->map = node;
        if (sel->area != 'I')
        {
            if (!node->metaphor)
                sel_window(node,screen,map,sel,window,conn);
        }
        else if (!node->terminal.pid)
            sel_element(node,map,sel,msg);
        activate(node);
    }
}

sel_element(node,map,sel,msg)
register MAPNODE        *node;
LIST                    *map;
register SELECTION      *sel;
register MESSAGE        *msg;
{
    register char   *reply;
    long            size;

    if (node->move_mark)
        move_mark(sel->row,sel->col,&node->picture);
    if (reply = Call(DIRECT,node->picture.pid,
        Newmsg(64,"hit","pos=#2s; sel",sel->row,sel->col),0,&size))
            if (!strcmp(reply,"write"))
            {
                Free(msg->buf);
                sel->pending = YES;
                msg->buf = reply;
                msg->size = size;
                msg->sender = node->picture;
                element_selected(map,sel,msg);
            }
            else if (node->on_select)
            {
```

```
                        notify_process(node,
                                sel->row,sel->col,'s','I',NULL,NULL,map->active);
                        Free(reply);
                }
}

element_selected(map,sel,msg)
LIST                    *map;
register SELECTION      *sel;
register MESSAGE        *msg;
{
        register MAPNODE        *node;
        register P_E_HDR        *hdr;
        register short          row, col;

        node = sel->map;
        if (!sel->pending)
                for (node = map->first;
                        node && (node->picture.pid != msq->sender.pid); node = node->nxt);
        if (node && node->picture.pid == msg->sender.pid)
        {
                activate(node);
                end_edit(node,'X',0,0,NULL);
                if (hdr = (P_E_HDR*) Find_triple(msg->buf,"data",msg->size,NULL,1,NULL))
                {
                        row = hdr->row;
                        col = hdr->col;
                        if (sel->pending)
                        {
                                row = sel->row;
                                col = sel->col;
                                if (node->on_element)
                                        notify_process(node,row,col,'S','I',hdr,NULL,map->active);
                        }
                        if (hdr->attr.editable && hdr->type == 't')
                                start_edit(msg,node,hdr,row,col);
                        else
                                Put(DIRECT,node->picture.pid,Newmsg(32,"select","off"));
                }
        }
        sel->pending = NO;
}

start_edit(msg,node,hdr,row,col)
MESSAGE                 *msg;
register MAPNODE        *node;
register P_E_HDR        *hdr;
register short          row, col;
{
        register EDIT   *edit;
        register short  offset;
        register char   *pos;
```

```
        node->edit = edit = (EDIT *) Alloc(sizeof(EDIT),YES);
        strcpy(edit,"edit:");
        edit->draw_msg = msg->buf;
        strcpy(edit->draw_msg,"replace");
        edit->msg_size = msg->size;
        msg->buf = NULL;
        offset = (((row - hdr->row) * hdr->width) + (col - hdr->col)) / VCHAR_WD;
        edit->hdr = hdr;
        edit->picture.pid = node->picture.pid;
        edit->type = edit->hdr->type;
        pos = (char *) hdr + sizeof(P_E_HDR);
        if (hdr->attr.appl)
            pos += 4;
        if (hdr->attr.tagged)
            pos += strlen(pos) + 1;
        Long_align(pos);
        pos += sizeof(long) + 2 * sizeof(short);
        edit->text = edit->text_end = edit->pos = pos;
        edit->text_end += strlen(pos) - 1;
        edit->pos += offset;
        edit->row = hdr->row;
        edit->col = hdr->col;
        edit->height = hdr->height;
        edit->width = hdr->width;
        move_mark(row,col,&node->picture);
    }

    sel_window(node,screen,map,sel,window,conn)
    register MAPNODE        *node;
    LIST                    *map;
    SCREEN                  *screen;
    register SELECTION      *sel;
    register WINDOW         *window;
    CONNS                   *conn;
    {
        register char   *tag = NULL;

        sel->pending = NO;
        if (window->hdr && window->hdr->attr.tagged && window->hdr->attr.selectable)
        {
            tag = (char *) window->hdr + sizeof(P_E_HDR);
            if (window->hdr->attr.appl)
                tag += 4;
        }
        if (tag && strcmp(tag,"RESIZE!"))
        {
            if (!strcmp(tag,"CLOSE!"))
                close(node,map,sel,conn);
            else if (!strcmp(tag,"FILL!"))
                fill_screen(node,screen,map);
            else if (!strcmp(tag,"UP!") || !strcmp(tag,"DOWN!")
                    || !strcmp(tag,"LEFT!") || !strcmp(tag,"RIGHT!"))
                scroll(*tag-'A'+'a',node);
            else
```

```
            notify_process(node,window->row,window->col,
                'S',window->bar,window->hdr,NULL,node);
    }
    else if (sel->pending = !node->nonmod && (window->area == 'r'
            || window->area == 'c' || !strcmp(tag,"RESIZE!")))
    {
        Put(DIRECT,node->window.pid,Newmsg(64,"c","colr=#b; bar=#b",CYAN,'O'));
        Put(DIRECT,node->window.pid,
            Newmsg(64,"c","colr=#b; bar=#b; tag=#S",RED,'r',"RESIZE!"));
    }
    else if (sel->pending = !nod[illegible]xed)
        Put(DIRECT,node->window[illegible]Newmsg(64,"c","colr=#b; bar=#b",RED,'O'));
}

fill_screen(node,screen,map)
register MAPNODE    *node;
register SCREEN     *screen;
register LIST       *map;
{
    register short  map_row, map_col, term_adjust, *p;
    char            *reply;

    if (!node->fill_ht)
    {
        Put(DIRECT,node->window.pid,
            Newmsg(64,"c","colr=#b; bar=#b; tag=#S",RED,'T',"FILL!"));
        term_adjust = screen->meta_ht - node->out_ht;
        memcpy(&node->fill_row,&node->row,4*sizeof(short));
        node->row = node->col = 0;
        node->height = screen->meta_ht - node->top - node->bottom;
        node->width = screen->meta_wd - node->left - node->right;
    }
    else
    {
        Put(DIRECT,node->window.pid,
            Newmsg(64,"c","colr=#b; bar=#b; tag=#S",0,'T',"FILL!"));
        memcpy(&node->row,&node->fill_row,4*sizeof(short));
        term_adjust = node->out_ht - screen->meta_ht;
        node=>fill_ht = 0;
    }
    align_window(screen,node);
    if (reply = Call(DIRECT,node->window.pid,Newmsg(32,"query",NULL),0,0)
    {
        p = (short *) Find_triple(reply,"view",0,none,4,NULL);
        map_row = *p++;
        map_col = *p;
        Free(reply);
        if (node->terminal.pid)
            if ((map_row -= term_adjust) < 0)
                map_row = 0;
        Put(DIRECT,node->window.pid,
            Newmsg(128,"set","pos=#2s; size=#2s; map=#2s",
            node->row,node->col,node->height,node->width,map_row,map_col));
        activate(node);
        clip_window(map->last)
    }
}
```

```
cancel(sel)
register SELECTION  *sel;
{
    register MAPNODE    *node;

    if ((node = sel->map) && sel->pending)
    {
        end_edit(node,'X',0,0,NULL);
        if (node->picture.pid)
            Put(DIRECT,node->picture.pid,Newmsg(32,"select","off"));
        if (node->window.pid)
        {
            Put(DIRECT,node->window.pid,Newmsg(64,"c","colr=#b; bar=#b",0,'O'));
            Put(DIRECT,node->window.pid,
                Newmsg(64,"c","colr=#b; bar=#b; tag=#S",0,'r',"RESIZE!"));
        }
    }
    sel->pending = NO;
}

deselect(screen,map,sel,row,col)
register SCREEN     *screen;
register LIST       *map;
register SELECTION  *sel;
register short      row, col;
{
    register MAPNODE    *node;

    sel->pending = NO;
    node = sel->map;
    if (sel->area == 'r' || sel->area == 'c')
    {
        resize(screen,node,
            row - node->row - node->top - node->bottom,
            col - node->col - node->left - node->right);
        Put(DIRECT,node->window.pid,
            Newmsg(64,"c","colr=#b; bar=#b; tag=#S",0,'r',"RESIZE!"));
    }
    else
    {
        node->row = row;
        node->col = col;
        align_window(screen,node);
        Put(DIRECT,node->window.pid,
            Newmsg(64,"set","pos=#2s",node->row,node->col));
    }
    clip_window(map->last);
    Put(DIRECT,node->window.pid,Newmsg(64,"c","colr=#b; bar=#b",0,'O'));
}

resize(screen,node,new_ht,new_wd)
register SCREEN     *screen;
register MAPNODE    *node;
```

```
register short       new_ht, new_wd;
{
    register short       map_row, map_col, *p;
    register char        *reply;

    if (new_ht < MIN_HT)
        new_ht = MIN_HT;
    if (new_wd < MIN_WD)
        new_wd = MIN_WD;
    node->height = new_ht;
    node->width = new_wd;
    reply = Call(DIRECT,node->window.pid,Newmsg(32,"query",NULL),0,0);
    p = (short *) Find_triple(reply,"view",0,none,4,NULL);
    map_row = *p++;
    map_col = *p;
    Free(reply);
    if (node->terminal.pid)
    {
        map_row = map_row - (new_ht - node->out_ht);
        map_row = (map_row / VCHAR_HT) * VCHAR_HT;
    }
    align_window(screen,node);
    Put(DIRECT,node->window.pid,Newmsg(128,"set","size=#2s; map=#2s",
        node->height,node->width,map_row,map_col));
    ut(DIRECT,node->window.pid,Newmsg(64,"c","colr=#b; bar=#b",0,'O'))
}

scroll(direction,node)
register char       direction;
register MAPNODE    *node;
{
    register char   *reply;
    register short  low_row, low_col, pict_ht, pict_wd, *p;
    short           map_row, map_col;

    if (node && node->picture.pid && node->window.pid && !node->metaphor)
        if (reply = Call(DIRECT,node->window.pid,Newmsg(64,"query",NULL),0,0))
        {
            if (p = (short *) Find_triple(reply,"view",0,NULL,4,NULL))
            {
                map_row = *p++;
                map_col = *p;
                Free(reply);
                reply =
                    Call(DIRECT,node->picture.pid,Newmsg(32,"query",NULL),0,0);
                p = (short *) Find_triple(reply,"size",0,NULL,4,NULL);
                pict_ht = *p++;
                pict_wd = *p;
                p = (short *) Find_triple(reply,"low ",0,NULL,4,NULL);
                low_row = *p++;
                low_col = *p;
                scroll_pos(node,direction,
                    &map_row,&map_col,low_row,low_col,pict_ht,pict_wd);
                Put(DIRECT,node->window.pid,Newmsg(64,"map",
                    "to=#C; at=#2s",node->picture,map_row,map_col));
```

```
                }
                Free(reply);
            }
}

scroll_pos(node,direction,map_row,map_col,low_row,low_col,pict_ht,pict_wd)
register MAPNODE        *node;
register char           direction;
register short          low_row, low_col, pict_ht, pict_wd, *map_row, *map_col;
{
    switch (direction)
    {
        case 'u':   if (*map_row - low_row >= VCHAR_HT)
                        *map_row -= VCHAR_HT;
                    break;
        case 'd':   if (pict_ht - (*map_row-low_row) - node->height >= VCHAR_HT)
                        *map_row += VCHAR_HT;
                    break;
        case 'l':   if (*map_col - low_col >= VCHAR_WD)
                        *map_col -= VCHAR_WD;
                    break;
        case 'r':   if (pict_wd - (*map_col-low_col) - node->width >= VCHAR_WD)
                        *map_col += VCHAR_WD;
                    break;
        case 'U':   if (*map_row - low_row >= node->height)
                        *map_row -= node->height;
                    else
                        *map_row = low_row;
                    break;
        case 'D':   if (pict_ht - (*map_row - low_row) >= 2 * node->height)
                        *map_row += node->height;
                    else
                        *map_row = pict_ht - low_row - node->height;
                    break;
        case 'L':   if (*map_col - low_col >= node->width)
                        *map_col -= node->width;
                    else
                        *map_col = low_col;
                    break;
        case 'R':   if (pict_wd - (*map_col - low_col) >= 2 * node->width)
                        *map_col += node->width;
                    else
                        *map_col = pict_wd - low_col - node->width;
    }
}

notify_process(node,row,col,act,area,hdr,indic,active)
register MAPNODE        *node;
register P_E_HDR        *hdr;
register char           act, area;
char                    indic;
short                   row, col;
MAPNODE                 *active;
{
```

```
        register char     *p, *m;
        register int      len = 0;

        if (hdr)
            len = *(short *) hdr;
        m = Newmsg(len+200,"click",
            "from=#C; map=#C; name=#S; actn=#b; what=#b; pos=#2s",
            &node->window,&node->picture,node->name,act,area,row,col);
        if (hdr)
        {
            p = Append_triple(m,"data",len+6,hdr);
            ((P_E_HDR*)p)->attr.selected = NO;
            p += *(short *) p;
            *(...) align(p);
            (short *) p = NULL;
        }
        if (indic)
            Append_triple(m,"char",1,&indic);
        if (active)
            Append_triple(m,"acty",4,&active->owner);
        Put(DIRECT,node->owner.pid,m);
    }

    Metaphor(screen,map,buf,size,output,dialogue)
    register SCREEN      *screen;
    register LIST        *map;
    register long        buf, size, output;
    CONNECTOR            *dialogue;
    {
        register short       *p;
        register MAPNODE     *node;

        screen->meta_row = screen->meta_col = 0;
        screen->meta_ht = screen->height;
        screen->meta_wd = screen->width;
        if (node = create_window(screen,map,output,"Metaphor",buf,size))
        {
            map->metaphor = node;
            node->owner = *dialogue;
            p = (short *) Find_triple(buf,"area",size,none,8,NULL);
            screen->meta_row = *p++;
            screen->meta_col = *p++;
            screen->meta_ht = *p++;
            screen->meta_wd = *p;
            node->metaphor = node->...ever = node->keep_open = YES;
            node->fixed = node->nonmod = YES;
            Reply(buf,Newmsg(32,"connect","conn=#C",&node->window));
        }
        else
            reply_status(buf,"-Metaphor","can\'t create \'window\'",0);
    }
```

```
MAPNODE *create_terminal(screen,map,output,buf,size,sender)
SCREEN              *screen;
register LIST       *map;
CONNECTOR           *output;
register long       buf, size, sender;
{
    static char          def_type[] = "//processes/terminal";
    register MAPNODE     *node;
    register char        *p;
    CONNECTOR            terminal;

    if (Find_triple(buf,"name",size,NULL,1,NULL))
    {
        if (terminal.pid = NewProc("Terminal",
            Find_triple(buf,"emul",size,def_type,1,NULL),YES,-1))
        {
            p = Alloc(size,YES);
            memcpy(p,buf,size);
            memcpy(p,sender,sizeof(CONNECTOR));
            memcpy(p+sizeof(CONNECTOR),&terminal,sizeof(CONNECTOR));
            p = Call(DIRECT,terminal.pid,p,0,0);
            if (!strcmp(p,"created")
                && (node = create_window(screen,map,output,"Window",p,size)))
            {
                node->terminal = node->owner = terminal;
                Free(p);
                return(node);
            }
        }
        reply_status(buf,"-create","can\'t create \'terminal\'",0);
    }
    else
        reply_status(buf,"-create","(terminal) no name given",0);
    return(NULL);
}

MAPNODE *create_window(screen,map,output,proc,buf,size)
SCREEN             *screen;
LIST               *map;
CONNECTOR          *output;
char               *proc;
register long      buf, size;
{
    static char          def_outl[4] = {GREEN,3,BLACK,'S'};
    register char        *window_name, *title, *p;
    register short       pict_row = 0, pict_col = 0;
    register MAPNODE     *node;
    char                 out_clr, out_fill, pane_clr;
    MAPNODE              *new_node();
```

```
        if ((window name = Find triple(buf,"name",size,NULL,1,NULL))
            && (node = new node(map,window name))
            && (node->window.pid = NewProc(proc,"//processes/window",YES,-1)))
        {
            map after(node,NULL,map);
            title = Find triple(buf,"titl",size,window_name,1,NULL);
            ... node(node,buf,size ...
            strcpy(node->device,Fin... ple(buf,"from" size,none,2,NULL)),
            strncpy(node->term,
                Find triple(buf," ... ",size,none,1,NULL),sizeof(node->term)-1);
            strncpy(node->special,
                Find triple(buf,"spec",size,none,1,NULL),sizeof(node->special)-1);
            p = Find-triple(buf,"outl",size,def_outl,4,NULL);
            out clr = *p++;
            node->outline = *p++;
            if (!(out fill = *p++))
                out fill = BLACK;
            if (!(node->style = *p))
                node->style = 'S';
            node->pane = 0;
            pane clr = out clr;
            if (p = Find_triple(buf,"pane",size,NULL,2,NULL))
            {
                pane clr = *p++;
                node=>pane = *p;
            }
            else if (node->Hscroll || node->Vscroll)
                node->pane = 1;
            if (p = Find_triple(buf,"map ",size,NULL,8,NULL))
            {
                node->picture = *(CONNECTOR *) p;
                if (*(long*)(p-4) > sizeof(CONNECTOR))
                {

                    pict_row = *(short *) (p + sizeof(CONNECTOR));
                    pict_col = *(short *) (p + sizeof(CONNECTOR) + sizeof(short));
                }
            }
            if (init_window(screen,node,output,title,pict_row,pict_col,
                            out_clr,out_fill,0,pane_clr))
            {
                activate(node);

                clip window(map->last);
                return(node);
            }
        }
        reply status(buf,"-create","(window)",0);
        return(NULL);
```

```
init_win(node,buf,size)
register MAPNODE      *node;
register long         buf, size;
{
    static short      def_pos[2] = (0,0), def_size[2] = (5,10);
    register char      *p;

    p = Find_triple(buf,"pos ",size,def_pos,4,NULL);
    node->row = *((short *) p)++;
    node->col = *(short *) p;
    p = Find_triple(buf,"size",size,def_size,4,NULL);
    node->out_ht = node->height = *((short *) p)++;
    node->out_wd = node->width = *(short *) p;
    node->title = check_bar(buf,"tbar",VCHAR_HT);
    node->menu = check_bar(buf,"mbar",VCHAR_HT);
    node->Vscroll = check_bar(buf,"vbar",YES);
    node->Hscroll = check_bar(buf,"hbar",YES);
    node->general_use = check_bar(buf,"gbar",YES);
    node->corner = check_bar(buf,"corn",YES);
    node->resize_box = check_bar(buf,"rsiz",YES);
    if (node->palette = check_bar(buf,"pbar",5*VCHAR_WD))
        node->palette += 2 *VCHAR_WD;
    window_options(node,buf,size);
}

check_bar(ptr,keyw,deflt)
register char     *ptr, *keyw;
register short    deflt;
{
    register short    *p;

    if (!(p = (short *) Find_triple(ptr,keyw,0,NO,0,NULL)))
        return(NO);
    else if (p == (short *) 1)
        return(deflt);
    else
        return(*p);
}

window_options(node,buf,size)
register MAPNODE      *node;
register long         buf, size;
{
    register char     *options, opt;

    options = Find_triple(buf,"when",size,none,1,NULL);
    while (opt = *options++)
        switch (opt)
        {
            case 'S':   node->on_segment = opt;  break;
            case 'X':   node->on_cancel = opt;  break;
            case 's':   node->on_select = opt;  break;
```

```
                case 'O':   node->on_open = opt;  break;
                case 'M':   node->on_modify = opt;  break;
                case 'C':   node->on_close = opt;  break;
                case 'Q':   node->on_quit = opt;  break;
                case 'W':   node->on_window_edge = opt;  break;
                case 'P':   node->on_picture_edge = opt;  break;
                case 'A':   node->on_anychar = opt;  break;
                case 'D':   node->on_delete = opt;  break;
                case 'B':   node->on_box = opt;  break;
                case 'L':   node->on_location = opt;  break;
                case 'H':   node->on_insert = opt;  break;
            }
        options = Find_triple(buf,"opt ",size,none,1,NULL);
        while (opt = *options++)
            switch (opt)
            {
                case 'H':   node->auto_highlight = opt;  break;
                case 'E':   node->editable = opt;  break;
                case 'S':   node->multi_select = opt;  break;
                case 'X':   node->never = opt;  break;
                case 'B':   node->remap = opt;  break;
                case 'N':   node->nonmod = opt;  break;
                case 'F':   node->fixed = opt;  break;
                case 'O':   node->keep_open = opt;  break;
                case 'M':   node->move_mark = opt;  break;
                case '+':   node->tight = opt;  break;
                case '-':   node->picture.pid = NULL;
            }
    }

    init_window(screen,node,output,title,row,col,out_clr,out_fill,out_pat,pane_clr)
    register SCREEN      *screen;
    register MAPNODE     *node;
    CONNECTOR            *output;
    register short       row, col;
    register char        *title;
    register char        out_clr, out_fill, out_pat, pane_clr;

        register char    *msg;
        int              result = NO

        if (node->style == 's' && (screen->colors < 7 || !screen->bit_map))
            node->style = 'S';
        if (node->outline)
            out_line(node);
        if (node->palette)
            node->left = node->palette;
        if (node->resize_box || node->Vscroll)
            node->right += VCHAR_WD;
        if (node->corner && !node->palette)
            node->left += VCHAR_WD;
        if (node->menu || node->general_use)
            node->bottom = VCHAR_HT * 2;
```

```
    else if (node->Hscroll)
        node->bottom = VCHAR_HT;
    align_window(screen,node);
    msg = Newmsg(3000,"init",
        "pos=#2s; size=#2s; outl=#5b; pane=#2b; marg=#4s; scrn=#4s; outp=#C; \
        self=#C; map=#C#2s; name=#S; rply",
        node->row,node->col,node->height,node->width,
        out_clr,node->outline,out_fill,out_pat,node->style,pane_clr,node->pane,
        node->top,node->bottom,node->left,node->right,0,0,screen->height,
        screen->width,output,&node->window,&node->picture,row,col,node->name);
    init_frame(msg,node,title,out_clr);
    msg = Call(DIRECT,node->window.pid,msg,0,0);
    result = strcmp(msg,"failed");
    Free(msg);
    return(result);
}

out_line(node)
register MAPNODE    *node;
{
    node->outer = node->outline + node->pane + (node->outline && node->pane) *
            (node->height/100 + node->width/100 + 2);
    if (node->tight)
    {
        node->top = node->bottom = node->outer;
        node->left = node->right = node->outer + node->width/200;
    }
    else
    {
        node->top = VCHAR_HT;
        node->bottom = node->ou_ _;
        node->left = node->right = VCHAR_WD;
    }
    if (node->style == 's')
    {
        node->bottom += 5;
        node->right += 5;
    }
}

init_frame(msg,node,title,out_clr)
register MAPNODE    *node;
register char       *msg, *title, out_clr;
{
    char                *n, *frame_bar();
    register char       scroll_clr = (4*16)+YELLOW, title_clr = WHITE;
    register P_E_HDR    *hdr;
    st_ _ _ _ort        up_arrow[] = {7,0,0,6,7,12,7,9,10,9,10,3,7,3,7,0};
    _ _ _ic short       down_arr_ _[] = {3,0,3,3,0,?,0,9,3,9,3,12,10,6,3,0};
    static short        left_ar_ _ _ = {6,0,0,7,3,7,3,10,9,10,9,7,12,7,6,0};
    static short        right_a_ _w[] = {3,0,3,3,0,3,6,10,12,3,9,3,9,0,3,0};
    static long         resize_ _bol[] = {0x00007f80,0x7f807f80,0x7f807f80,
                        0x7f807fc4,0x00ec007c,0x003c007c,0x00fc0000,0x00000000};
```

```
if (node->title)
{
    n = frame_bar(msg,"top",400,'T',0,0,node->title,1000,0,out_clr,0,NO);
    draw_filled_rect(&n,0,0,node->title,1000,NULL,0,0,out_clr,0,0,0,0,"a");
    draw_rect(&n,5,10,10,10,"CLOSE!",title_clr,'S',1,"S");
    draw_text(&n,0,3*VCHAR_WD,title,"NAME",title_clr,0,NULL,NULL);
    if (!node->nonmod)
    {
        hdr = (P_E_HDR *) start_macro(&n,0,1000,
              VCHAR_HT-2,2*VCHAR_WD,'N',"FILL!",0,0,"Sa");
        draw_rect(&n,3,0,VCHAR_HT-7,2*VCHAR_WD-4,NULL,title_clr,'S',1,NULL);
        draw_filled_rect(&n,6,3,VCHAR_HT-14,2*VCHAR_WD-10,
              NULL,0,0,title_clr,0,0,0,0,NULL);
        end_macro(&n,hdr);
    }
    draw_end(&n);
}
if (node->Vscroll)
{
    n = frame_bar(msg,"rght",400,'V',node->pane-1,node->pane-1,790,
            node->right-node->pane-node->outline+2,out_clr,BLACK,1,NO);
    draw_rect(&n,node->pane,node->pane,VCHAR_HT-4,
        node->right-(node->pane)-(node->outline),
        "SCROLL!",scroll_clr,'S',1,"Sb");
    draw_poly(&n,875,node->pane+1,
        8,up_arrow,"UP!",scroll_clr,0,0,'S',0,1,"Sa");
    draw_poly(&n,980,node->pane+1,
        8,down_arrow,"DOWN!",scroll_clr,0,0,'S',0,1,"Sa");
    draw_end(&n);
}

if (node->Hscroll)
{
    n = frame_bar(msg,"bot ",400,'H',node->pane-1,0,
            node->bottom-(node->pane)-(node->outline)+2,
            910,out_clr,BLACK,1,NO);
    draw_rect(&n,node->pane,node->pane,
        node->bottom-node->pane-node->outline,
        2*VCHAR_WD-2,"SCROLL!",scroll_clr,'S',1,"Sb");
    draw_poly(&n,node->pane,55,
        8,left_arrow,"LEFT!",scroll_clr,0,0,'S',0,1,"Sa");
    draw_poly(&n,node->pane,990,
        8,right_arrow,"RIGHT!",scroll_clr,0,0,'S',0,1,"Sa");
    draw_end(&n);
}
if (node->menu)
    frame_bar(msg,"bot ",200,'M',node->pane-1,0,
        node->bottom-(node->pane)-(node->outline)+2,
        1000,out_clr,BLACK,1,YES);
if (node->general_use)
    frame_bar(msg,"bot ",200,'G',node->pane-1,0,
        node->bottom-(node->pane)-(node->outline)+2,
        1000 out_clr,BLACK,1,YES);
```

```
    if (node->palette)
        frame_bar(msg,"left",200,'P',0,node->pane,10000,
            node->left-(node->pane)-(node->outline)-1,out_clr,BLACK,1,YES);
    if (node->resize_box)
    {
        n = frame_bar(msg,"rbox",200,NULL,0,0,0,0,scroll_clr,BLACK,1,NO);
        draw_symbol(&n,0,0,16,16,resize_symbol,"RESIZE|",scroll_clr,0,"S");
        draw_end(&n);
    }
    if (node->corner)
        frame_bar(msg,"lbox",200,NULL,0,0,0,0,out_clr,BLACK,1,YES);
}

  *frame_bar(msg,keyw,size,type,row,col,height,width,color,fill,thick,end)
register char      *msg, *keyw;
char               type, color, fill, end;
register short     row, col, height, width, size, thick;
{
    char    *n;

    n = Append_triple(msg,keyw,size,NULL);
    *n++ = type;
    draw_filled_rect(&n,row,col,height,width,
        NULL,color,0,fill,0,'S',0,thick,"a");
    if (end)
        draw_end(&n);
    return(n);
}

Set_user(name,buf,size)
register NAME      *name;
register long      buf, size;
{
    register char   *p;

    if (p = Find_triple(buf,"name",size,NULL,2,NULL))
    {
        strcpy(name->user,p);
        Note("signed on",p);
        Put(ALL,"HI",Newmsg(128,"U","name=#S",p));
    }
}

Change(screen,map,msg)
SCREEN      *screen;
LIST        *map;
MESSAGE     *msg;
{
    register CONNECTOR  *window, *owner = NULL;
    register short      *p;
    register MAPNODE    *node;
```

```
if (window = (CONNECTOR*)Find_triple(msg->buf,"conn",msg->size,NULL,8,NULL))
{
    for (node = map->first; node && node->window.pid != window->pid
        && node->terminal.pid != window->pid; node = node->nxt) ;
    if (node)
    {
        if (p = (short*) Find_triple(msg->buf,"size",msg->size,none,4,NULL))
            resize(screen,node,*p,*(p+1));
        if (Find_triple(msg->buf,"actv",msg->size,NULL,0,NULL)
            && !node->never)
                map->active = node;
        if (owner =
            (CONNECTOR*) Find_triple(msg->buf,"ownr",msg->size,NULL,0,NULL))
                if ((long)owner == 1)
                    owner = &msg->sender;
        if (owner)
        {
            node->owner = *owner;
            if (node->terminal.pid)
            {
                Forward(DIRECT,node->terminal.pid,msg->buf);
                msg->buf = NULL;
            }
        }
        clip_window(map->last);
    }
  }
}

highlight(node,map)
register MAPNODE    *node;
register LIST       *map;
{
    if (node && node != map->last_active)
    {
        if (!node->metaphor)
        {
            Put(LOCAL,"Window"
                Newmsg(64,"highlight","bar=#b; tag=#S",'T',"CLOSE!"));
            if (node->window.pid && node->title)
                Put(DIRECT,node->window.pid,
                    Newmsg(128,"highlight","off; bar=#b; tag=#S",'T',"CLOSE!"));
        }
        if (node->window.pid)
            Put(DIRECT,node->window.pid,Newmsg(32,"keys?",NULL));
        map->last_active = node;
    }
}

move_mark(row,col,picture)
register short          row, col;
register CONNECTOR      *picture;
{
```

```
    Put(DIRECT,picture->pid,Newmsg(32,"mark","at=#2s",row,col));
}


clip_window(node)
register MAPNODE    *node;
{
    register MAPNODE    *temp;
    register short      prio = 127, count, *count_addr, *n;
    char                *m;

    for ( ; node; node = node->pre)
    {
        m = Newmsg(1000,"cut","inHI=#s#s#A",prio--,0,950,NULL);
        count_addr = (short *) (Find_triple(m,"inHI",0,NULL,0,NULL) + 2);
        n = count_addr + 1;
        count = 0;
        for (temp = node->pre; temp; temp = temp->pre)
        {
            *n++ = temp->row;
            *n++ = temp->col;
            *n++ = temp->out_ht;
            *n++ = temp->out_wd;
            count++;
        }
        *count_addr = count;
        Put(DIRECT,node->window.pid,m);
    }
}

MAPNODE *find_window(map,window,row,col)
register LIST   *map;
register WINDOW *window;
register short  row, col;
{
    register MAPNODE    *node;

    for (node = map->first; node; node = node->nxt)
    {
        query_window(window,node->window,row,col);
        if (window->area != 'N')
            break;
    }
    window->previous = window->node;
    return(window->node = node);
}

query_window(window,conn,row,col)
register WINDOW *window;
CONNECTOR       conn;
register short  row, col;
{
```

```
	register char	*p, *reply;

	if (window->hdr)
		Free(window->hdr);
	window->hdr = NULL;
	window->elem_row = window->elem_col = -1;
	reply = Call(DIRECT,conn.pid,Newmsg(64,"w","inHI=#2s",row,col),0,0);
	p = Find_triple(reply,"inHI",0,none,1,NULL);
	p += 2 * sizeof(short);
	window->area = *p++;
	window->bar = *p++;
	window->row = *((short *) p)++;
	window->col = *((short *) p)++;
	long_align(p);
	if (*(short*)p)
	{
		window->hdr = (P_E_HDR *) Alloc(*(short*)p,YES);
		memcpy(window->hdr,p,*(short*)p);
	}
	Free(reply);
}

MAPNODE *new_node(map,name)
register LIST	*map;
register char	*name;
{
	register MAPNODE	*node = NULL;
	register short		i;

	for (i = POOL_SIZE, node = map->pool; node->pool && i; ++node, --i) ;
	if (!i)
		node = (MAPNODE *) Alloc(sizeof(MAPNODE),YES);
	memset(node,0,sizeof(MAPNODE));
	node->pool = i;
	strcpy(node->name,name);
	return(node);
}

free_node(node)
register MAPNODE	*node;
{
	if (node->pool)
		node->pool = NULL;
	else
		Free(node);
}

map_after(node,pred,map)
register MAPNODE	*node, *pred;
register LIST		*map;
{
	if (pred)
	{
```

```
            node->nxt = pred->nxt;
            node->pre = pred;
            if (pred->nxt)
                (pred->nxt)->pre = node;
            pred->nxt = node;
        }
        else
        {
            if (node->nxt = map->first)
                (map->first)->pre = node;
            node->pre = NULL;
        }
        if (!node->pre)
            map->first = node;
        if (!node->nxt)
            map->last = node;
        ++map->count;
}

unmap(node,map)
register MAPNODE     *node;
register LIST        *map;
{
        if (node->pre)
            (node->pre)->nxt = node->nxt;
        else
            map->first = node->nxt;
        if (node->nxt)
            (node->nxt)->pre = node->pre;
        else
            map->last = node->pre;
        --map->count;
}

remap(window,node,new_picture,map,sel)
register CONNECTOR     *window, *new_picture;
register MAPNODE       *node;
register SELECTION     *sel;
LIST                   *map;
{
        if (window)
            for (node = map->first;
                 node && window->pid != node->window.pid; node = node->nxt) ;
        if (node)
        {
            end_edit(node,'X',0,0,NULL);
            if (new_picture && new_picture->pid != node->picture.pid)
                if (node == sel->map)
                {
                    sel->map = NULL;
                    sel->pending = NO;
                }
            node->picture = *new_picture;
```

```
        }
    }

    align window(screen,node)
    register SCREEN     *screen;
    register MAPNODE    *node;
    {
        register short  temp;

        if (screen->char_align)
        {
            if (node->tight)
            {
                temp = ((node->row % VCHAR_HT) || node->outer ? VCHAR_HT : 0);
                node->row = (node->row / VCHAR_HT) * VCHAR_HT - node->outer + temp;
                temp = ((node->col % VCHAR_WD) || node->outer ? VCHAR_WD : 0);
                node->col = (node->col / VCHAR_WD) * VCHAR_WD -
                            (node->outer + node->width/200) + temp;
            }
            else
            {
                node->row = ((node->row + VCHAR_HT-1) / VCHAR_HT) * VCHAR_HT;
                node->col = ((node->col + VCHAR_WD-1) / VCHAR_WD) * VCHAR_WD;
            }
            if (node->row < screen->meta_row)
                node->row += (screen->meta_row + VCHAR_HT-1) / VCHAR_HT * VCHAR_HT;
            if (node->col < screen->meta_col)
                node->col += (screen->meta_col + VCHAR_WD-1) / VCHAR_WD * VCHAR_WD;
            if (node->out_ht > screen->meta_ht)
                node->height = screen->meta_ht - (node->top + node->bottom);
            if (node->out_wd > screen->meta_wd)
                node->width = screen->meta_wd - (node->left + node->right);
            if (!node->tight)
            {
                temp = (node->height % VCHAR_HT ? VCHAR_HT : 0);
                node->height = (node->height/VCHAR_HT) * VCHAR_HT + temp;
                temp = (node->width % VCHAR_WD ? VCHAR_WD : 0);
                node->width = (node->width/VCHAR_WD) * VCHAR_WD + temp;
            }
        }
        node->out_ht = node->height + node->top + node->bottom;
        node->out_wd = node->width + node->left + node->right;
    }

    Status(msg,size)
    register char   *msg;
    register long   size;
    {
        register char   *m;
```

```
    *(m = Alloc(size,YES)) = NULL;
    strcat(m,Find triple(msg,"orig",size,none,1,NULL));
    strcat(m," ");
    strcat(m,Find triple(msg,"stat",size,none,1,NULL));
    strcat(m," in-");
    strcat(m,Find triple(msg,"req ",size,none,1,NULL));
    Note(m,"ERROR");
    Free(m);
}

reply status(req,mid,stat,code)
register char    *req, *mid, *stat;
register long    *code;
{
    register char   *type, *msg;

    type = "failed";
    if (!mid)
        type = "status";
    else if (*mid == '-')
        mid++;
    else if (*mid == '+')
    {
        type = "done";
        mid++;
    }
    msg = Newmsg(strlen(stat)+100,type,
        "orig=#S; stat=#S; code=#1","console",stat,code);
    if (mid)
    {
        Append triple(msg,"req ",[illegible]len(mid)+1,mid);
        [illegible]y(req,msg);

    else
        Put(DIRECT,(long)req,[illegible]
}

info(dialogue,string,window)
CONNECTOR        dialogue, window;
register char   *string;
{
    Put(DIRECT,dialogue,pid,Newmsg(strlen(string)+100,"info",
        "text=#S; near=#C; wait=#S",string,&window,5));
}
    Mo[illegible]               : %M% %I%
    Date submitted     : %E% %U%
    Author             : Frank Kol[illegible]
    Origin             : cX
    Description        : Picture Manager

*******************************************************************/
```

PROGRAM LISTING B

```
#ifndef lint
static char SrcId[] = "%Z% %M%:%I%";
#endif
/* Picture manager:  global data */

#include    <cX.h>                                  /* cX definitions */
#include    <HI.h>                                  /* picture, etc. definitions */
#include    <memory.h>
#include    <string.h>
static long none = 0;

typedef struct element_node                         /* links picture elements: */
{
    struct element_node *nxt;                       /*     ->next node */
    struct element_node *pre;                       /*     ->preceding node */
    unsigned char        changed;                   /*     'element has changed' */
    unsigned char        marked;                    /*     'element is marked' */
    unsigned char        deleted;                   /*     'no longer in use' */
    unsigned char        pool;                      /*     'local buffer pool' */
    short                length;                    /*     (start of element) */
    /***** NOTE: 'length' must start on a long-word boundary *****/
} ELEMENT;

typedef struct current_state                        /* current data: */
{
    char                 *msg;                      /*     ->current msg. */
    CONNECTOR            sender;                    /*     conn. to msg. sender */
    long                 size;                      /*     size of msg. */
    long                 appl;                      /*     relevant application */
    short                appl_row, appl_col;        /*     application 'origin' */
    CONNECTOR            owner;                     /*     conn. to owning proc. */
    char                 *mark;                     /*     current mark element */
    char                 *old_mark;                 /*     copy of previous mark */
    char                 *erase_mark;               /*     element to erase mark */
    unsigned char        display_mark;              /*     'display mark' */
    unsigned char        private;                   /*     'private picture' */
    unsigned char        check;                     /*     'check size' */
    unsigned char        debug;                     /*     'print diagnostics' */
    char                 highlight;                 /*     type of highlighting */
    char                 name[32];                  /*     picture's name */
    char                 file[64];                  /*     picture file's name */
    long                 status_code;               /*     current status ... */
    char                 *status_string;            /*     ... */
} CURRENT;


typedef struct view_node                            /* links viewports: */
{
    struct view_node    *nxt;                       /*     ->next node */
    CONNECTOR           owner;                      /*     owner of viewport */
    short               row, col;                   /*     start of viewport */
    short               height, width;              /*     extent */
} VIEW;
```

```
typedef struct appl_node                                /* links applications: */
{
    struct appl_node    *nxt;                           /*      ->next node */
    long                name;                           /*      name of application */
    CONNECTOR           conn;                           /*      conn. to application */
    short               row, col;                       /*      origin */
} APPL;

typedef struct anim_node                                /* links animation processes: */
{
    struct anim_node    *nxt;                           /*      ->next node */
    long                name;                           /*      name of element */
    CONNECTOR           conn;                           /*      conn. to process */
} ANIM;

typedef struct affected_area                            /* area changed by a request: */
{
    short               r1, c1;                         /*      upper left front */
    short               r2, c2;                         /*      lower right back */
    char                color;                          /*      background color */
    char                pattern;                        /*      background pattern */
    short               max_height;                     /*      max. height */
    short               max_width;                      /*      max. width */
    short               height, width;                  /*      current size */
} AREA;

typedef struct lists                                    /* list pointers, etc.: */
{
    ELEMENT             *first;                         /*      ->pict. element list */
    ELEMENT             *last;                          /*      ->end of p.e. list */
    ELEMENT             *current;                       /*      ->last p.e. changed */
    VIEW                *views;                         /*      ->viewport list */
    APPL                *appls;                         /*      ->applications list */
    ANIM                *anims;                         /*      ->animation list */
    int                 changes;                        /*      #changes in list */
    int                 erases;                         /*      #erasures in list */
    int                 size;                           /*      #picture elements */
    struct                                              /*      element pool descr.: */
        {
            long                n;                      /*          #elements */
            long                size;                   /*          size of elements */
            ELEMENT             *ptr;                   /*          ->element buffer */
        } pool;
  LST;

/*  local functions  */

char        *value(), *tag();
ELEMENT     *mark_number(), *mark_area(), *mark_elements(), *new_element();
P_E_HDR     *first_macro(), *next_macro();

/* Picture manager:  main-line */

PROCESS(Picture)
{
```

```
        CURRENT            cur;
        AREA               area;
        LIST               list;
        register VIEW      *view;
        register ANIM      *anim;

        set_event_key("Picture mgr.");
        init_PM(&cur,&area,&list);
        draw_picture(&cur,&area,&list);
        for (view = list.views; view; view = view->nxt)
            Put(DIRECT,view->owner.pid,Newmsg(32,"unmap",NULL));
        for (anim = list.anims; anim; anim = anim->nxt)
            Put(DIRECT,anim->conn.pid,Newmsg(32,"quit",NULL));
        Exit();
    }

    init_PM(cur,area,list)
    register CURRENT     *cur;
    register AREA        *area;
    register LIST        *list;
    {
        area->color = BLACK;
        area->pattern = 0;
        *cur->name = *cur->file = NULL;
        area->max_height = area->max_width = 0;
        list->current = list->first = list->last = NULL;
        list->views = NULL;
        list->appls = NULL;
        list->anims = NULL;
        list->size = list->pool.n = 0;
        cur->debug = cur->check = cur->private = cur->display_mark = NO;
        cur->mark = cur->old_mark = cur->erase_mark = NULL;
    }

    draw_picture(cur,area,list)
    CURRENT           *cur;
    register AREA     *area;
    register LIST     *list;
    {
        register char         *msg;
        register short        transaction = 0, result = 0, go = YES;
        register ELEMENT      *element;
        long                  status[11], list_size = 0, *req = NULL;

        while (go)
        {
            cur->msg = msg = Get(0,&cur->sender,&cur->size);
            if (!transaction)
            {
                list->changes = list->erases = area->r2 = area->c2 = 0;
                area->r1 = area->c1 = 32767;
```

```
                cur->appl = NULL;
                if (list->appls)
                    check_appl(cur,list->appls);
            }
            if (*msg == '[' && transaction < 10)
                status[++transaction] = 0;
            else if (*msg == ']')
                --transaction;
            else
                qo = Request(cur,area,list,msg,cur->size,cur->appl);
            if (!transaction)
            {
                if (list->changes)
                    notify(cur,area,list);
                for (element = list->first; element; element = element->nxt)
                {
                    element->changed = element->marked = NO;
                    if (element->deleted && !Any_msg(NULL))
                        delete_element(list,element);
                }
                if (Find_triple(msg,"rply",cur->size,NO,0,NULL) && result >= 0)
                    reply_status(msg ,"completed",result);
            }
            free_requests(msg,cur->s  &req,&list_size);
        }
    }

    check_appl(cur,appl)
    register CURRENT    *cur;
    register APPL       *appl;
    {
        for ( ; appl && (appl->conn.pid != cur->sender.pid); appl = appl->nxt);
        if (appl)
        {
            if (!(cur->appl = appl->name))
                cur->appl = -1;
            cur->appl_row = appl->row;
            cur->appl_col = appl->col;
        }
    }

    free_requests(msg,size,req,list_size)
    register char   *msg, **req;
    register long   size, *list_size;
    {
        register char    *temp, *next;

        if (msg)
        {
```

```
            *(char**)msg = *req;
            *req = msg;
            *list_size += size;
            if (!Any_msg(NULL) || *list_size > 1000)
                for (temp = *req, *req = NULL, *list_size = 0; temp; temp = next)
                {
                    next = *(char**)temp;
                    Free(temp);
                }
        }

Request(cur,area,list,msg,size,appl)
register CURRENT    *cur;
register AREA       *area;
register LIST       *list;
register long       msg, size, appl;
{
    register short    go = YES;

    if (!strcmp(msg,"write"))
        Draw(list,msg,size);
    else if (!strcmp(msg,"edit"))
        Edit_text(cur,area,list,msg,size,appl);
    else if (!strcmp(msg,"mark"))
        Move_mark(cur,area,list);
    else if (!strcmp(msg,"hit"))
        Hit(list,msg,size,appl);
    else if (!strcmp(msg,"move"))
        Move(area,list,msg,size,appl);
    else if (!strcmp(msg,"erase"))
        Erase(area,list,msg,size,appl);
    else if (!strcmp(msg,"read"))
        Copy(cur,area,list,msg,size,appl);
    else if (!strcmp(msg,"replace"))
        Replace(area,list,msg,size,appl);
    else if (!strcmp(msg,"change"))
        Change(area,list,msg,size,appl);
    else if (!strcmp(msg,"animate"))
        Animate(cur,list);
    else if (!strcmp(msg,"alter") || !strcmp(msg,"cancel"))
        Alter(cur,list);
    else if (!strcmp(msg,"number"))
        Query_number(list,msg,size,appl);
    else if (!strcmp(msg,"mark?"))
        Query_mark(cur);
    else if (!strcmp(msg,"save"))
        Save_picture(cur,list);
    else if (!strcmp(msg,"set"))
        Set_mark(cur,area,list);
    else if (!strcmp(msg,"restore"))
        Restore_mark(cur,area.list);
```

```
    else if (!strcmp(msg,"bkgd"))
        ...ound(area,list,msg, ...e ;
    else if (!strcmp(msg,"create"
        go = New picture(cur,ar ...t);
    else if (!strcmp(msg,"init"
        cur->private = go = New ...ture(cur,area,list);
    else if (!strcmp(msg,"open"))
        go = Old picture(cur,list);
    else if (!strcmp(msg,"appl"))
        Appl(cur,list);
    else if (!strcmp(msg,"quit"))
    {
        if (go = (cur->sender.pid != cur->owner.pid))
            reply_status(msg,msg,"not authorized",0);
    }
    else if (!strcmp(msg,"query"))
        Query(cur,list);
    else if (!strcmp(msg,"failed"))
        Status(msg,size);
    else if (!strcmp(msg,"done") || !strcmp(msg,"status"))
        ;
    else if(!Change_attribute(list,msg,size,appl))
    {
        if (!strcmp(msg,"view"))
            Viewport(cur,area,list);
        else if (!strcmp(msg,"debug"))
            cur->debug = !cur->debug;
        else
            reply_status(msg,"-\'unknown\'",msg,0);
    }
    return(go);
}

Change attribute(list,msg,size,appl)
register LIST      *list;
register long      msg, size, appl;
{
    static char          msgids[] = "select\0blink\0invert\0hide\0highlight\0";

    register char        *p;
    register short       new state, changed, type;
    register ELEMENT     *element;
    register P_E_HDR     *hdr;

    for (p = msgids, type = 0; *p && strcmp(msg,p); p += strlen(p)+1, ++type);
    if (!*p)
        return(NO);
    list->current = element = mark elements(list,NULL,NULL,msg,size,appl);
    new state = !(short)Find triple(msg,"off ",size,NO,0,NULL);
    for ( ; element; element = element->nxt)
        if (element->marked)
        {
            hdr = (P E HDR *) &element->length;
```

```
            switch (type)
            {
                case 0:     changed = hdr->attr.selected || new_state;
                            if (hdr->attr.selected = new_state)
                                Put(NEXT,"Console",Newmsg(hdr->length+50,
                                    "write","data=%e%e; type=%c",hdr,NULL,'P'));
                            break;
                case 1:     changed = hdr->attr.blink != new_state;
                            hdr->attr.blink = new_state;
                            break;
                case 2:     changed = hdr->attr.invert != new_state;
                            hdr->attr.invert = new_state;
                            break;
                case 3:     changed = hdr->attr.hidden != new_state;
                            hdr->attr.hidden = new_state;
                            break;
                case 4:     changed = hdr->attr.highlight != new_state;
                            hdr->attr.highlight = new_state;
            }
            if (element->changed = changed)
                list->changes++;
            element->marked = NO;
        }
    return(YES);
}

Query(cur,list)
CURRENT         *cur;
register LIST   *list;
{
    unsigned                n_elem = 0, n_views = 0;
    register unsigned       min_r = 65535, min_c = 65535;
    register unsigned       max_r = 0, max_c = 0, pic_ht = 0, pic_wd = 0;
    register ELEMENT        *element;
    register P_E_HDR        *hdr;
    register VIEW           *view;

    for (element = list->first; element; element = element->nxt)
    {
        hdr = (P_E_HDR *) &element->length;
        if (hdr->row < min_r) min_r = hdr->row;
        if (hdr->col < min_c) min_c = hdr->col;
        if (hdr->row + hdr->height > max_r) max_r = hdr->row + hdr->height;
        if (hdr->col + hdr->width > max_c) max_c = hdr->col + hdr->width;
        n_elem++;
    }
    if (n_elem)
    {
        pic_ht = max_r - min_r;
        pic_wd = max_c - min_c;
    }
    else
```

```
        pic_ht = pic_wd = max_r = max_c = min_r = min_c = 0;
    for (view = list->views; view; view = view->nxt, n_views++);
    Reply(cur->msg,
        Newmsg(256,"status","or  ; size=#2s; low=#2s; high=#2s; cnt=#s; \
        view=#s; name=#S; file=  picture",
        pic_ht,pic_wd,min_r,min_c,max_r,max_c,n_elem,n_views,
        cur->name,cur->file)).
}

Query_number(list,msg,size,appl)
register LIST         *list;
register long         msg, size, appl;
{
    register unsigned   n = 0;
    register ELEMENT    *element, *temp;

    if (element = mark_elements(list,NULL,NULL,msg,size,appl))
    {
        for (temp = list->first; temp != element; temp = temp->nxt, n++);
        Reply(msg,Newmsg(element->length+32,"number",
               "num=#s; elem=#e",n,&element->length));
    }
    else
        reply_status(msg,"-number","too high",0);
}

Draw(list,msg,size)
register LIST     *list;
register long     msg, size;
{
    register ELEMENT     *after;
    register long        *p;

    if (p = (long *) Find_triple(msg,"data",size,NULL,4,NULL))
    {
        if (Find_triple(msg,"back",size,NO,0,NULL))
            after = NULL;
        else
            after = list->last;
        if (!draw_elements(p,*(p-1),list,after))
            reply_status(msg,"-write","bad length/type/macro",0);
    }
    else
        reply_status(msg,"-write","missing \'data\'",0);
}

draw_elements(p,list_len,list,after)
register char        *p;
register long        list_len;
register LIST        *list;
register ELEMENT     *after;
{
```

```
    register ELEMENT     *element;
    register short       length, number = 0;

    while ((length = *(short *) p)
          && (list_len -= length) >= 0
          && strchr("tlreacdsmn", ((P_E_HDR*)p)->type))
    {
        if (((P_E_HDR*)p)->type == 'm' && !check_macro(p))
            break;
        element = new_element(list,length+sizeof(ELEMENT),after);
        memcpy(&element->length,p,length);
        if (!((P_E_HDR*)p)->height)
            define_box(&element->length);
        number++;
        p += length;
        Long_align(p);
    }
    list->size += number;
    list->changes += number;
    list->current = element;
    return(length ? NO : YES);
}

define_box(hdr)
register P_E_HDR      *hdr;
{
    register char     *val;

    val = value(hdr);
    if (hdr->type == 't')
    {
        hdr->height = VCHAR_HT;
        hdr->width = VCHAR_WD * strlen(val+8);
    }
    else if ((hdr->type == 'n') || (hdr->type == 'm'))
        ;
}

check_macro(hdr)
register P_E_HDR      *hdr;
{
    register P_E_HDR     *temp, *first;
    short                len;
    char                 *p, macro_type;

    for (first = temp = first_macro(hdr,&macro_type,&len,&p); temp;
        temp = next_macro(&len,&p))
    {
        if (macro_type == 'L')
            temp->attr.hidden = YES;
        if (!temp->height)
            define_box(temp);
```

```
    }
    if (macro_type == 'L')
        first=>attr.hidden = NO;
    return(p ? YES : NO);
}

P_E_HDR *first_macro(hdr,type,len,p)
register P_E_HDR     *hdr;
register char        *type;
register short       *len;
register char        **p;
{
    register P_E_HDR     *temp;

    *p = value(hdr);
    if (type)
        *type = **p;
    (*p)++;
    Long_align(*p);
    temp = (P_E_HDR *) *p;
    *len = hdr->length - (*p - (char *) hdr);
    if (temp->length && temp->length < *len && strchr("tlreacdsmn",temp->type))
        return(temp);
    p = NULL;
    return(NULL);
}

P_E_HDR *next_macro(len,p)
register short       *len;
register char        **p;
{
    register P_E_HDR     *temp;

    if (*p)
    {
        temp = (P_E_HDR *) *p;
        *p += temp->length;
        Long_align(*p);
        *len -= (*p - (char *) temp);
        temp = (P_E_HDR *) *p;
        if (temp->length)
            if (temp->length < *len && strchr("tlreacdsmn",temp->type))
                return(temp);
            else
                *p = NULL;
    }
    return(NULL);
}

Replace(area,list,msg,size,appl)
AREA              *area;
LIST              *list;
register long     msg, size, appl;
```

```
{
    register char           *p;
    register short          length = 0;
    register ELEMENT        *temp;
    register P_E_HDR        *hdr, *temp_hdr = NULL;
    register long           list_len;
    ELEMENT                 *after = NULL;

    if (Find_triple(msg,"@\0\0\0\0",size,NO,0,NULL))
    {
        Erase(area,list,msg,size,appl);
        after = list->current;
    }
    if (p = Find_triple(msg,"data",size,NULL,1,NULL))
    {
        list_len = *((long *)(p-4));
        while ((length = *(short *) p) && (list_len -= length) > 0)
        {
            hdr = (P_E_HDR *) p;
            if (hdr->type == 'm' && !check_macro(hdr))
                break;
            for (temp = list->last; temp &&
                ((P_E_HDR*)&temp->length)->row != hdr->row &&
                ((P_E_HDR*)&temp->length)->col != hdr->col; temp = temp->pre);
            if (temp)
            {
                temp_hdr = (P_E_HDR *) &temp->length;
                temp=>deleted = YES;
                after = temp->pre;
            }
            draw_elements(hdr,length,list,after);
            if (temp_hdr && (hdr->type != 't' || hdr->height != temp_hdr->height
                || hdr->width != temp_hdr->width))
            {
                change_area(area,temp_hdr->row,temp_hdr->col,
                            temp_hdr->height,temp_hdr->width);
                list->erases++;
            }
            p += length;
            Long_align(p);
        }
    }
    if (length)
        reply_status(msg,"-replace","bad length/type/macro",0);
}

Erase(area,list,msg,size,appl)
AREA            *area;
register LIST   *list;
register long   msg, size, appl;
{
    register ELEMENT        *element = NULL;
    register P_E_HDR        *hdr;
    int                     number;
```

```
    if (element = mark_elements(list,NULL,&number,msg,size,appl))
    {
        list->current = element->pre;
        for ( ; element; element = element->nxt)
            if (element->marked)
            {
                element->deleted = YES;
                hdr = (P_E_HDR*) &element->length;
                change_area(area,hdr->row,hdr->col,hdr->height,hdr->width);
            }
        list->erases += number;
        list->changes += number;
    }
}

Copy(cur,area,list,msg,size,appl)
CURRENT             *cur;
register AREA       *area;
register LIST       *list;
register long       msg, size, appl;
{
    register ELEMENT    *element;
    register short      bkgd, *p;
    short               *q;
    unsigned int        length = 0;

    if (bkgd = (short) Find_triple(msg,"bkgd",size,NO,0,NULL))
    {
        p = (short *) Find_triple(msg,"@pos",size,&none,0,NULL);
        q = (short *) Find_triple(msg,"@end",size,&none,0,NULL);
        change_area(area,*p,*(p+1),*q-*p,*(q+1)-*(p+1));
    }
    if ((element = mark_elements(list,&length,NULL,msg,size,appl)) || bkgd)
        send(cur,area,list,0,length,element,NO,NO,bkgd);
    else
        Reply(msg,Newmsg(64,"write",NULL));
}

Move(area,list,msg,size,appl)
AREA    *area;
LIST    *list;
long    msg, size, appl;
{
    register ELEMENT    *element;
    register P_E_HDR    *hdr;
    register int        delta_row, delta_col, by_offset = NO, row = 0, col = 0;
    register char       *p;
    int                 n;

    if (p = Find_triple(msg,"by  ",size,NULL,4,NULL))
    {
        by_offset = YES;
```

```
        delta_row = *((short *) p)++;
        delta_col = *(short *) p;
    }
    else if (p = Find_triple(msg,"[illegible]",size,NULL,4,NULL))
    {
        row = *((short *) p)++;
        col = *(short *) p;
    }
    if (list->current = element = mark_elements(list,NULL,&n,msg,size,appl))
    {
        if (!by_offset)
        {
            hdr = (P_E_HDR *) &element->length;
            delta_row = row - hdr->row;
            delta_col = col - hdr->col;
        }
        for ( ; element; element = element->nxt)
            if (element->marked)
            {
                hdr = (P_E_HDR *) &element->length;
                change_area(area,hdr->row,hdr->col,hdr->height,hdr->width);
                hdr->row += delta_row;
                hdr->col += delta_col;
                element->changed = YES;
                element->marked = NO;
                element->deleted = (hdr->row < 0 || hdr->col < 0);
            }
        list->changes += n;
        list->erases += n;
    }
}

Change(area,list,msg,size,appl)
register AREA     *area;
register LIST     *list;
register long     msg, size, appl;
{
    register ELEMENT    *element = NULL;
    register P_E_HDR    *hdr;
    char                *color, *bkgd, *fill, *pat;

    color = Find_triple(msg,"colr",size,NULL,1,NULL);
    bkgd = Find_triple(msg,"bkgd",size,NULL,1,NULL);
    fill = Find_triple(msg,"fill",size,NULL,1,NULL);
    pat = Find_triple(msg,"pat ",size,NULL,1,NULL);
    if (list->current = element = mark_elements(list,NULL,NULL,msg,size,appl))
        for ( ; element; element = element->nxt)
            if (element->marked)
            {
                hdr = (P_E_HDR*) &element->length;
                if (color)
                    hdr->color = *color;
                if (bkgd)
```

```
                    hdr->bkgrnd = *bkgd;
                if (fill)
                    hdr->fill = *fill;
                if (pat)
                    hdr->pattern = *pat;
                change_area(area,hdr->row,hdr->col,hdr->height,hdr->width);
                list->changes++;
            }
}

Background(area,list,msg,size)
register AREA         *area;
register LIST         *list;
register long         msg, size;
{
    area->color = *Find_triple(msg,"colr",size,&area->color,1,NULL);
    area->pattern = *Find_triple(msg,"pat ",size,&area->pattern,1,NULL);
    change_area(area,0,0,MAX_ROW,MAX_COL);
    list->changes = list->erases = 1;
}

New_picture(cur,area,list)
register CURRENT      *cur;
register AREA         *area;
register LIST         *list;
{
    register ELEMENT        *element;
    register long           max, maxe;
    short                   def_max = 20, def_maxe = 100;
    char                    def_bkgd = BLACK, def_pat = 0;

    for (element = list->first; element; element = element->nxt)
        element->deleted = YES;
    list->current = list->first = list->last = NULL;
    list->changes = list->erases = list->size = 0;
    if (Find_triple(cur->msg,"file",cur->size,NO,0,NULL))
        return(Old_picture(cur,list));
    else
    {
        cur->owner = cur->sender;
        strcpy(cur->name,Find_triple(cur->msg,"name",cur->size,&none,1,NULL));
        area->max_height =
            *(short*)Find_triple(cur->msg,"size",cur->size,&none,4,NULL);
        area->max_width =
            *(short *) (Find_triple(cur->msg,"size",cur->size,&none,4,NULL)+2);
        area->color = *Find_triple(cur->msg,"bkgd",cur->size,&def_bkgd,1,NULL);
        area->pattern = *Find_triple(cur->msg,"pat ",cur->size,&def_pat,1,NULL);
        cur->highlight = *Find_triple(cur->msg,"high",cur->size,&none,1,NULL);
        cur->check = (area->max_height != 0);
        max =
            (*(short*)Find_triple(cur->msg,"max ",cur->size,&def_max,2,NULL))+1;
        maxe = *(short*)Find_triple(cur->msg,"maxe",cur->size,&def_maxe,2,NULL);
        if (maxe & 1)
            ++maxe;
```

```
            list->pool.n = max;
            list->pool.size = maxe + sizeof(ELEMENT) + 10;
            list->pool.ptr = (ELEMENT *) Alloc(max*list->pool.size,YES);
            memset(list->pool.ptr,0,max*list->pool.size);
            change area(area,0,0,MAX ROW,MAX COL);
            list->changes = list->erases = 1;
            reply status(cur->msg,"+create","complete",0);
            return(YES);
        }
}

Old picture(cur,list)
register CURRENT    *cur;
register LIST       *list;
{
    register char   *p = (char*)1;
    CONNECTOR       file;

    strcpy(cur->name,Find triple(cur->msg,"name",cur->size,&none,1,NULL));
    strcpy(cur->file,Find_triple(cur->msg,"file",cur->size,cur->name,1,NULL));
    if (*cur->file)
    {
        if (Connect to(NEXT,"File mgt",Newmsg(64,"open",
            "name=#S; omod=#S; amod=#S",cur->file,"R",NULL),&file))
        {
            cur->owner = cur->sender;
            while (p)
                if (p = Call(DIRECT,file.pid,
                    Newmsg(64,"read","conn=#C; size=#1",&file,-1),0,0))
                        if (p = Find triple(p,"data",0,NULL,4,NULL))
                            draw elements(p,*(long*)(p-4),list,NULL);
            Put(DIRECT,file.pid,Newmsg(32,"close","conn=#C",&file));
            reply status(cur->msg,"+open","complete",0);
            return(YES);
        }
        else
            reply_status(cur->msg,"-open","can't open file",0);
    }
    else
        reply status(cur->msg,"-open","no file name",0);
    return(NO);
}

Save picture(cur,list)
CURRENT     *cur;
LIST        *list;
{
    register char       *file name, *m, *p;
    register ELEMENT    *element;
    CONNECTOR           file;
    unsigned int        length = 0, num;
```

```
	if (!(file_name = Find_triple(cur->msg,"file",cur->size,NULL,1,NULL)))
		file_name = cur->file;
	if (*file_name)
		if (element =
			mark_elements(list,&length,&num,cur->msg,cur->size,cur->appl))
		{
			if (!Connect_to(NEXT,"File mgt",Newmsg(64,"open",
				"name=%S; omod=%S; amod=%S",file_name,"W",NULL),&file))
				    Connect_to(NEXT,"File mgt",Newmsg(64,"create",
					"name=%S; omod=%S; amod=%S",file_name,"W",NULL),&file);
			if (file.pid)
			{
				num = length + 4 * num + 4;
				m = Newmsg(num+50,"write","conn=%C; data=%A",&file,num,NULL);
				p = Find_triple(m,"data",0,NULL,1,NULL);
				for ( ; element; element = element->nxt)
					if (element->marked)
					{
						memcpy(p,element,element->length);
						p += element->length;
						Long_align(p);
					}
				*(short *) p = NULL;
				Put(DIRECT,file.pid,m);
				Put(DIRECT,file.pid,Newmsg(32,"close","conn=%C",&file));
				reply_status(cur->msg,"+save","picture saved",0);
			}
			else
				reply_status(cur->msg,"-save","can't open/create file",0);
		}
		else
			reply_status(cur->msg,"-save","no elements",0);
	else
		reply_status(cur->msg,"-save","no file name",0);
}

Appl(cur,list)
CURRENT		*cur;
register LIST	*list;
{
	register APPL	*appl;
	register long	name;
	register short	*p;

	name = *(long *) Find_triple(cur->msg,"name",cur->size,&none,4,NULL);
	for (appl = list->appls; appl && appl->name != name; appl = appl->nxt);
	if (!appl)
		appl = (APPL *) Alloc(sizeof(APPL),YES);
	appl->conn = cur->sender;
	p = (short *) Find_triple(cur->msg,"org ",cur->size,&none,2,NULL);
	appl->row = *p++;
	appl->col = *p;
	appl->name = name;
```

```
    appl->conn =
        *(CONNECTOR *) Find triple(cur->msg,"appl",cur->size,&none,4,NULL);
    appl->nxt = list->appls;
    list->appls = appl;
}

Move mark(cur,area,list)
register CURRENT     *cur;
register AREA        *area;
register LIST        *list;
{
    register P E HDR     *hdr;
    register short       *pos;
    char                 *q;

    if (pos = (short *) Find_triple(cur->msg,"at  ",cur->size,NULL,4,NULL))
    {
        if (cur->mark)
            erase_mark(cur,area);
        else
        {
            q = cur->mark = Alloc(sizeof(P E HDR)+30,YES);
            draw_line(&q,0,0,VCHAR_HT,0,NULL,YELLOW,'S',0,1,NULL);
        }
        hdr = (P E HDR *) cur->mark;
        hdr->row = *pos++ - ((hdr->height - VCHAR_HT) / 2);
        hdr->col = *pos;
        cur->display mark = YES;
        list->changes++;
    }
}

Q e v mark(cur)
r    ter CURRENT     *cur;
{
    regist   _E_HDR     *hdr;

    if (hdr = (P E HDR *) cur->ma
        Reply(cur->msg,Newmsg(6  "mark","at=%2s",hdr->row,hdr->col));
    else
        reply_status(cur->msg,"-mark?","no mark defined",0);
}

Set mark(cur,area,list)
register CURRENT     *cur;
register AREA        *area;
register LIST        *list;
{
    register P_E_HDR     *hdr;

    if ((hdr = (P E HDR*)Find_triple(cur->msg,"data",cur->size,NULL,1,NULL))
        && hdr->length)
```

```
    {
        if (cur->mark)
        {
            erase_mark(cur,area);
            Free(cur->mark);
            Free(cur->erase_mark);
            cur->erase_mark = NULL;
        }
        cur->mark = Alloc(hdr->length,YES);
        memcpy(cur->mark,hdr,hdr->length);
        cur->display_mark = YES;
    }
    else
    {
        if (cur->old_mark)
            Free(cur=>old_mark);
        cur->old_mark = cur->mark;
        cur->mark = NULL;
    }
    list->changes++;
}

Restore_mark(cur,area,list)
register CURRENT    *cur;
register AREA       *area;
register LIST       *list;
{
    if (cur->old_mark)
    {
        if (cur->mark)
        {
            erase_mark(cur,area);
            Free(cur->mark);
            Free(cur->erase_mark);
            cur->erase_mark = NULL;
        }
        cur->mark = cur->old_mark;
        cur->old_mark = NULL;
        list->changes++;
    }
}


erase_mark(cur,area)
register CURRENT    *cur;
register AREA       *area;
{
    if (!cur->erase_mark)
        cur->erase_mark = Alloc(*(short*)cur->mark,YES);
    memcpy(cur->erase_mark,cur->mark,*(short*)cur->mark);
    ((P_E_HDR *)cur->erase_mark)->color = area->color;
}
```

```
Edit_text(cur,area,list,msg,size,appl)
CURRENT              *cur;
AREA                 *area;
register LIST        *list;
register long        msg, size;
long                 appl;
{
     register char   *p, c, *text_start, *new;
     register short  shift, offset, sel_offset, ok = YES;
     short           sel_length;
     ELEMENT         *element;
     P_E_HDR         *hdr;

     if (list->current = element = mark_elements(list,NULL,NULL,msg,size,appl))
     {
          offset = *(short *) Find_once(msg,"offs",size,&none,2,NULL);
          hdr = (P_E_HDR *) &element->length;
          if (hdr->type == 't')
          {
               text_start = (p = value(hdr) + sizeof(long)) + 2 * sizeof(short);
               if (shift = *(short*)Find_once(msg,"shft",size,&none,2,0))
                    shift_text(p,text_start,shift);
               if (Find_once(msg,"sel ",size,NO,0,NULL))
               {
                    sel_offset = *((short *) p)++;
                    sel_length = *(short *) p;
                    ok = (offset < sel_length);
                    offset += sel_offset;
               }
               if (ok = (ok && (offset < strlen(text_start))))
               {
                    p = text_start + offset;
                    if (new = Find_once(msg,"new ",size,NULL,1,NULL))
                    {
                         while (c = *new++)
                              if (c > 31 && c < 127 && *p)
                                   *p++ = c;
                              else if (c == 8 && p > text_start)
                                   *--p = ' ';
                    }
                    if (Find_once(msg,"blnk",size,NO,0,NULL))
                         for ( ; *p; *p++ = ' ');
                    if (Find_triple(msg,"by  ",size,NO,0,NULL))
                    {
                         Move(area,list,msg,size,appl);
                         Draw(list,msg,size);
                    }
                    else
                    {
                         element->changed = YES;
                         list->changes++;
                    }
                    Move_mark(cur,area,list);
                    if (Find_once(msg,"last",size,NO,0,NULL))
                         list=>erases = 0;
```

```
                }
                else
                    reply_status(msg,"-edit","outside text string",0);
            }
            else
                reply_status(msg,"-edit","not a text element",0);
        }
        else
            reply_status(msg,"-edit","not found",0);
    }

    shift_text(sel,text,nchars)
    register short    *sel, nchars;
    register char     *text;
    {
        register short   length, n;

        if (length = strlen(text))
            if (nchars < 0 && (n = length + nchars) > 0)
            {
                memcpy(text,text+n,-nchars);
                memset(text-nchars,' ',n);
                if (*sel - n >= 0)
                    *sel -= n;
                else
                {
                    *sel = 0;
                    *(sel+1) += *sel - n;
                }
            }
            else if (nchars > 0 && (n = length - nchars) > 0)
            {
                memcpy(text+length,text+nchars,nchars);
                memset(text,' ',n);
                if (*sel + n < length)
                    *sel -= n;
                else
                {
                    *sel = length - n;
                    *(sel+1) -= *sel + n - length;
                }
            }
    }

    Animate(cur,list)
    register CURRENT    *cur;
    register LIST       *list;
    {
        register ANIM    *anim;
        register char    *name;
        register long    pid;
        char             *m;
```

```
    if (name = Find triple(cur->msg,"name",cur->size,NULL,2,NULL))
        if (strlen(name) < 16)
        {
            for (anim = list->anims; anim && strcmp(name,anim->name);
                anim = anim->nxt);
            if (!anim)
                if (pid = NewProc(name,"//processes/animate",YES,-1))
                {
                    anim = (ANIM *) Alloc(sizeof(ANIM),YES);
                    anim->conn.pid = pid;
                    strcpy(anim->name,name);
                    anim->nxt = list->anims;
                    list->anims = anim;
                    m = Alloc(cur->size,YES);
                    memcpy(m,cur->msg,cur->size);
                    Put(DIRECT,anim->conn.pid,m);
                }
                else
                    reply_status(cur->msg,"-animate","not supported",0);
            else
                reply_status(cur->msg,"-animate","duplicate name",0);
        }
        else
            reply_status(cur->msg,"-animate","name too long",0);
}

Alter(cur,list)
register CURRENT    *cur;
register LIST       *list;
{
    register ANIM   *anim;
    register char   *name;
    CONNECTOR       conn;

    if (name = Find_triple(cur->msg,"name",cur->size,NULL,2,NULL))
    {
        for (anim = list->anims; anim && strcmp(name,anim->name);
            anim = anim->nxt);
        if (anim)
        {
            conn = anim->conn;
            if (!strcmp(cur->msg,"cancel"))
            {
                list->anims = anim->nxt;
                Free(anim);
            }
            Forward(DIRECT,conn.pid,cur->msg);
            cur->msg = NULL;
        }
        else
            reply_status(cur->msg,cur->msg,"not found",0);
    }
}
```

```
Hit(list,msg,size,appl)
register LIST     *list;
register long     msg, size, appl;
{
    register short       *p, tolerance;
    register ELEMENT     *element;
    register P_E_HDR     *hdr;
    ELEMENT              *find_box();

    tolerance = *(short *) Find_triple(msg,"tolr",size,&none,2,NULL);
    if (p = (short *) Find_triple(msg,"pos ",size,&none,4,NULL))
        if (list->current = element = find_box(*p,*(p+1),list,appl))
        {
            hdr = (P_E_HDR *) &element->length;
            if (Find_triple(msg,"sel ",size,NO,0,NULL) && hdr->attr.selectable)
            {
                hdr->attr.selected = YES;
                if ((hdr->type == 'm') && (*value(hdr) == 'L'))
                    sel_list(hdr);
                element=>changed = YES;
                list->changes++;
            }
            Reply(msg,Newmsg(hdr->length+50,"write","data=#e#e",hdr,NULL));
        }
        else
            reply_status(msg,msg,"not found",0);
    else
        reply_status(msg,msg,"missing \'pos\'",0);
}

ELEMENT *find_box(row,col,list,appl)
register short  row, col;
register LIST   *list;
register long   appl;
{
    register P_E_HDR     *hdr;
    register ELEMENT     *element;

    for (element = list->last; element; element = element->pre)
    {
        hdr = (P_E_HDR *) &element->length;
        if (in_box(hdr->row,hdr->col,hdr->height,hdr->width,row,col)
            &&-!element->deleted)
                if (!appl || (appl == -1 && !*(long*)(hdr+1))
                          || appl == *(long*)(hdr+1))
                    break;
    }
    return(element);
}

in_box(r,c,h,w,c1,c2)
register short  r, c, c1, c2, h, w;
```

```
{
        if ((c1 < r) || (c2 < c))
            return(NO);
        if ((c1 > r + h) || (c2 > c + w))
            return(NO);
        return(YES);
}

sel_list(hdr)
register P_E_HDR    *hdr;
{
        register P_E_HDR    *temp, *first;
        short               len;
        char                *p;

        for (first = temp = first_macro(hdr,NULL,&len,&p);
            temp && temp->attr.hidden; temp = next_macro(&len,&p));
        if (temp)
        {
            temp->attr.hidden = YES
            if (!(temp = next_macro(&len,&p)))
                temp = first;
            temp->attr.hidden = NO;
        }
}

Viewport(cur,area,list)
register CURRENT    *cur;
register AREA       *area;
register LIST       *list;
{
        register VIEW   *view, *prev = NULL;
        CONNECTOR       *conn;
        ELEMENT         *element;
        unsigned int    length = 0;
        char            *p;

        if (p = Find_triple(cur->msg,"area",cur->size,NULL,8,NULL))
        {
            for (view = list->views; view && (view->owner.pid != cur->sender.pid);
                view = view->nxt) ;
            if (view)
                memcpy(&view->row,p,4*sizeof(short));
            else
            {
                view = (VIEW *) Alloc(sizeof(VIEW),YES);
                view->nxt = list->views;
                view->owner = cur->sender;
                memcpy(&view->row,p,4*sizeof(short));
                list->views = view;
            }
```

```
            change_area(area,view->row,view->col,view->height,view->width);
            element = mark_area(area->r1,area->c1,area->r2,area->c2,list,
                        MAX_P_E,NULL,NULL,NULL,&length,NULL,cur->appl);
            send(cur,area,list,0,length,element,YES,cur->display_mark,YES);
        }
        else
        {
            conn = (CONNECTOR *) Find_triple(cur->msg,"conn",0,&cur->sender,8,NULL);
            for (view = list->views; view && (view->owner.pid != conn->pid);
                    prev = view, view = view->nxt) ;
            if (view)
            {
                if (prev)
                    prev->nxt = view->nxt;
                else
                    list->views = view->nxt;
                Free(view);
            }
        }
    }

    change_area(area,row,col,height,width)
    register AREA   *area;
    register short  row, col, height, width;
    {
        if (row < area->r1)
            area->r1 = row;
        if (col < area->c1)
            area->c1 = col;
        if (row + height > area->r2)
            area->r2 = row + height;
        if (col + width > area->c2)
            area->c2 = col + width;
    }

    notify(cur,area,list)
    register CURRENT        *cur;
    register AREA           *area;
    LIST                    *list;
    {
        register VIEW           *view;
        register int            length;

        for (view = list->views; view; view = view->nxt)
        {
            length = mark_changes(list->first,
                view->row,view->col,view->height,view->width);
            send(cur,area,list,&view->owner,length,list->first,
                YES,cur->display_mark,list->erases);
        }
    }
```

```
mark_changes(element,r,c,h,w)
register ELEMENT    *element;
register short      r, c, h, w;
{
    register P_E_HDR    *hdr;
    register int        list_length = 0;

    for ( ; element && !element->changed; element = element->nxt) ;
    for ( ; element; element = element->nxt)
    {
        hdr = (P_E_HDR *) &element->length;
        if (element->marked = (element->changed && !hdr->attr.hidden &&
            (hdr->row + hdr->height >= r) && (hdr->row <= r + h) &&
            (hdr->col + hdr->width >= c) && (hdr->col <= c + w)))
                list_length += hdr->length + 3;
    }
    return(list_length);
}

send(cur,area,list,proc,length,element,modify,mark,redraw)
register CURRENT            *cur;
AREA                        *area;
LIST                        *list;
register CONNECTOR          *proc;
register unsigned int       length;
register ELEMENT            *element;
register unsigned short     modify, mark, redraw;
{
    register P_E_HDR        *hdr;
    register short          element_length;
    char                    *m, *p, *set_mark();
    ELEMENT                 *redraw_bkgd();

    if (redraw)
        element = redraw_bkgd(area,list,&m,&p);
    else
        p = (m = Newmsg(length+300,
                "write","data=#A; type=#c",length+250,NULL,'P')) + 24;
    if (element)
        for ( ; element; element = element->nxt)
        {
            if (element->marked && !element->deleted)
            {
                element->marked = NO;
                element_length = element->length;
                memcpy(p,&element->length,(long)element_length);
                hdr = (P_E_HDR *) p;
                if (modify)
                {
                    if (hdr->attr.selected)
                        element_length = set_select(hdr,cur->highlight);
                    if ((hdr->type == 'm') && (*value(hdr) == 'L'))
                        element_length = macro_list(hdr);
```

```
                    if ((hdr->type == 't'))
                        element_length = check_text(hdr,hdr->length);
                    if (cur->appl)
                        element_length =
                            change_origin(hdr,cur->appl_row,cur->appl_col);
                }
                p += element_length;
                Long_align(p);
            }
        }
    if (mark)
        p = set_mark(p,cur);
    *(short *) p = NULL;
    if (proc)
        Put(DIRECT,proc->pid,m);
    else
        Reply(cur->msg,m);
}

change_origin(hdr,row,col)
register P_E_HDR      *hdr;
register short        row, col;
{
    if ((hdr->row -= row) < 0)
        return(0);
    if ((hdr->col -= col) < 0)
        return(0);
    return(hdr->length);
}

char *set_mark(p,cur)
register char         *p;
register CURRENT      *cur;
{
    if (cur->erase_mark)
    {
        memcpy(p,cur->erase_mark,*(short*)cur->erase_mark);
        p += *(short *) p;
    }
    if (cur->mark)
    {
        memcpy(p,cur->mark,*(short*)cur->mark);
        p += *(short *) p;
    }
    return(p);
}

ELEMENT *redraw_bkgd(area,list,buf,ptr)
register AREA     *area;
register LIST     *list;
register char     **buf, **ptr;

    ELEMENT     *element;
```

```
    int         length, num;

    element = mark_area(area->r1,area->c1,area->r2,area->c2,
                list,MAX_P_E_HDR,NULL,NULL,&length,&num,NULL);
    length += (4 * num) + 150;
    *buf = Newmsg(length+50,"write","data=#A; type=#c",length,NULL,'P');
    *ptr = *buf + 24;
    draw_filled_rect(ptr,area->r1,area->c1,(area->r2)-(area->r1),
        (area->c2)-(area->c1),NULL,0,0,area->color,area->pattern,0,0,0,NULL);
    return(element);
}

set_select(hdr,high_option)
register P_E_HDR    *hdr;
register char       high_option;
{
    register short  length;

    length = hdr->length;
    if (!high_option)
        hdr->attr.invert = !hdr->attr.invert;
    else if (high_option == 'I')
        hdr->attr.invert = !hdr->attr.invert;
    else if (high_option == 'H')
        hdr->attr.highlight = !hdr->attr.highlight;
    else if (high_option == 'C')
    {
        if (hdr->type != 'm')
        {
            hdr->color = (hdr->color + 1) % 7 + 1;
            if (hdr->fill)
                hdr->fill = (hdr->fill + 1) % 7 + 1;
        }
        else
            macro_color(hdr);
    }
    else if (hdr->type == 't')
        sel_text(hdr,high_option);
    return(length);
}

macro_list(hdr)
register P_E_HDR    *hdr;
{
    register P_E_HDR    *temp;
    register short      row, col;
    short               len;
    char                *p;

    row = hdr->row;
    col = hdr->col;
    for (temp = first_macro(hdr,NULL,&len,&p);
        temp && temp->attr.hidden; temp = next_macro(&len,&p));
```

```
    if (temp)
    {
        memcpy(hdr,temp,temp->length);
        hdr->row = row;
        hdr->col = col;
    }
    return(hdr->length);
}

macro_color(hdr)
register P_E_HDR    *hdr;
{
    register P_E_HDR    *temp;
    short               len;
    char                *p;

    for (temp = first_macro(hdr,NULL,&len,&p); temp; temp = next_macro(&len,&p))
    {
        temp->color = (temp->color + 1) % 7 + 1;
        if (temp->fill)
            temp->fill = (temp->fill + 1) % 7 + 1;
    }
}

sel_text(hdr,high_option)
register P_E_HDR    *hdr;
register char       high_option;
{
    register TEXT_OPTIONS    *opt;

    opt = (TEXT_OPTIONS *) value(hdr);
    if (high_option == 'b')
        opt->border = YES;
    else if (high_option == 'U')
        opt->underline = YES;
    else if (high_option == 'B')
        opt->bold = YES;
}

check_text(hdr,length)
register P_E_HDR    *hdr;
register short      length;
{
    register char            *p;
    char                     *h;
    register TEXT_OPTIONS    *opt;

    opt = (TEXT_OPTIONS *) value(hdr);
    if (opt->border && hdr->fill)
    {
        opt->border = NO;
        p = (char *) hdr + length;
        long_align(p);
```

```
            n = p;
            draw_rect(&n,hdr->row-3,hdr->col-3,hdr->height+6,hdr->width+6,
                NULL,hdr->fill,'S',1,NULL);
            length = n - (char*)hdr;
        }
        return(length);
}

ELEMENT *mark_elements(list,length,num,msg,size,appl)
LIST                    *list;
unsigned int            *length, *num;
long                    msg, size, appl;
{
    register short      row = 0, col = 0, number = 0, count = 1;
    register short      to_row = MAX_ROW, to_col = MAX_COL, *p;
    register ELEMENT    *element;
    register char       *tag_pat = NULL;
    char                what = NULL, tag_buf[200], *text_pat = NULL, dflt = YES;
    long                *triple, attr = NULL;

    element = NULL;
    while (p = (short*)Find_triple(msg,"@\0\0\0",size,NULL,0,&triple))
    {
        switch (*triple)
        {
            case Keypack('@','c','n','t'):   count = *p;
                                             break;
            case Keypack('@','a','t','t'):   attr |= *(long *) p;
                                             break;
            case Keypack('@','s','e','l'):   attr |= 0x8000;
                                             break;
            case Keypack('@','n','u','m'):   number = *p;
                                             what = NULL;
                                             break;
            case Keypack('@','p','o','s'):   row = *p++;
                                             col = *p;
                                             what = 'A';
                                             break;
            case Keypack('@','e','n','d'):   to_row = *p++;
                                             to_col = *p;
                                             what = 'A';
                                             break;
            case Keypack('@','t','x','t'):   text_pat = Alloc(500,YES);
                                             if (!makpat(p,text_pat))
                                             {
                                                Free(text_pat);
                                                text_pat = NULL;
                                             }
                                             break;
            case Keypack('@','t','a','g'):   if (!makpat(p,(tag_pat = tag_buf)))
                                                tag_pat = NULL;

        }
        triple = NULL;
        dflt = NO;
```

```
	}
	if (dflt)
		count = MAX_P_E;
	if (!what)
		element = mark_number(number,tag_pat,text_pat,
			list,count,attr,length,num,appl);
	else if (what == 'A')
		element = mark_area(row,col,to_row,to_col,list,count,
			attr,tag_pat,text_pat,length,num,appl);
	if (text_pat)
		Free(text_pat);
	return(element);
}

ELEMENT *mark_area(row,col,to_row,to_col,list,
		count,attr,tag_pat,text_pat,length,num,appl)
register short		row, col, to_row, to_col, count;
long			attr;
LIST			*list;
char			*tag_pat, *text_pat;
unsigned int		*length, *num;
{
	register P_E_HDR	*hdr;
	register ELEMENT	*element = NULL, *temp;
	register long		total_length = 0;
	unsigned int		orig_count;

	if (row >= 0 && col >= 0 && to_row >= 0 && to_col >= 0)
	{
		orig_count = count;
		for (temp = list->first; temp && count; temp = temp->nxt)
		{
			hdr = (P_E_HDR *) &temp->length;
			if (hdr->row <= to_row && hdr->col <= to_col
				&& row < hdr->row + hdr->height && col < hdr->col + hdr->width
				&& valid(hdr,tag_pat,text_pat,attr,appl) && !temp->deleted)
				{
					total_length += temp->length;
					temp->marked = YES;
					if (!element)
						element = temp;
					count--;
				}
		}
		if (length)
			*length = total_length;
		if (num)
			*num = orig_count - count;
	}
	return(element);
}
```

```
ELEMENT *mark_number(n,tag_pat,text_pat,list,count,attr,length,num,appl)
register short      n, count;
register long       tag_pat, text_pat, attr;
register LIST       *list;
unsigned int        *length, *num;
{
    register ELEMENT    *element = NULL, *temp = NULL;
    register long       total_length = 0;
    unsigned int        orig_count;

    if (n == -1)
        temp = list->last;
    else
        for (temp = list->first; temp && n--; temp = temp->nxt);
    for (orig_count = count; temp && count; temp = temp->nxt)
        if (valid(&temp->length,tag_pat,text_pat,attr,appl) && !temp->deleted)
        {
            total_length += temp->length;
            temp->marked = YES;
            if (!element)
                element = temp;
            count--;
        }
    if (length)
        *length = total_length;
    if (num)
        *num = orig_count - count;
    return(element);
}

valid(hdr,tag_pat,text_pat,attr,appl)
register P_E_HDR    *hdr;
register char       *tag_pat, *text_pat;
register long       attr, appl;
{
    register char    *target, ok = YES;
    long             temp;

    if (tag_pat)
        if (target = tag(hdr))
            ok = amatch(target,tag_pat);
        else
            ok = NO;
    if (text_pat)
        if (hdr->type == 't')
            ok = ok && amatch(value(hdr)+8,text_pat);
        else
            ok = NO;
    if (attr)
    {
        memcpy(&temp,&hdr->attr,sizeof(long));
        ok = ok && (temp & attr);
```

```
    }
    if (appl)
    {
        if (appl == -1)
            ok = ok && (!*(long*)(hdr+1));
        else
            ok = ok && (appl == *(long*)(hdr+1));
    }
    return(ok);
}

Status(msg,size)
register char    *msg;
register long    size;
{
    register char    *m;

    *(m = Alloc(size,YES)) = NULL;
    strcat(m,Find_triple(msg,"orig",size,&none,1,NULL));
    strcat(m," ");
    strcat(m,Find_triple(msg,"stat",size,&none,1,NULL));
    strcat(m," in ");
    strcat(m,Find_triple(msg,"req ",size,&none,1,NULL));
    Note(m,"ERROR");
    Free(m);
}

reply_status(cur,mid,stat,code)
register char    *cur, *mid, *stat;
register long    *code;
{
    register char    *type;

    type = "failed";
    if (*mid == '-')
        mid++;
    else if (*mid == '+')
    {
        type = "done";
        mid++;
    }
    Reply(cur,Newmsg(strlen(mid)+strlen(stat)+50,type,
        "orig=%S; req=%S; stat=%S; code=%l","picture",mid,stat,code));
}

ELEMENT *new_element(list,size,after)
register LIST       *list;
register long       size;
register ELEMENT    *after;
{
    register ELEMENT    *element;
    register long       i = 0;
```

```
    if (size <= list->pool.size)
        for (i = list->pool.r, element = list->pool.ptr;
             element->pool && i && !element->deleted;
             (char*)element += list->pool.size, --i) ;
    if (i)
    {
        if (element->deleted)
            delete element(list,element);
        element->pool = YES;
    }
    else
    {
        element = (ELEMENT *) Alloc(size,YES);
        element->pool = NO;
    }
    element->nxt = NULL;
    if (element->pre = list->last)
        (list->last)->nxt = element;
    else
        list->first = element;
    list->last = element;
    element->changed = YES;
    element->deleted = element->marked = NO;
    return(element);
}

delete element(list,element)
register ELEMENT     *element;
register LIST        *list;
{
    if (element->pre)
        (element->pre)->nxt = element->nxt;
    else
        list->first = element->nxt;
    if (element->nxt)
        (element->nxt)->pre = element->pre;
    else
        list->last = element->pre;
    if (element->pool)
        element->pool = NULL;
    else
        Free(element);
    --list->size;
}

char *value(hdr)
register P_E_HDR     *hdr;
{
    register char    *p;
```

```
        p = (char *) hdr + sizeof(P_E_HDR);
        if (hdr->attr.appl)
            p += 4;
        if (hdr->attr.tagged)
            while (*p++);
        Long_align(p);
        return(p);
    }


    char *tag(hdr)
    register P_E_HDR      *hdr;
    {
        register char    *p;

        p = (char *) hdr + sizeof(P_E_HDR);
        if (hdr->attr.appl)
            p += 4;
        if (hdr->attr.tagged)
            return(p);
        return(NULL);
    }
```

What is claimed is:

1. A human interface in a data processing system, said data processing system comprising at least one application process and at least one video display unit comprising a screen viewable by a system user, said interface comprising:

means for representing information within said data processing system by means of at least one abstract, device-independent picture, said picture being represented by a plurality of picture elements at least some of which are defined by said one application process;

a picture manager process for manipulating said plurality of picture elements in response to a first message sent to said picture manager process by said one application process;

a window manager process for managing the display of a window of said picture on said video display unit screen, said window manager process managing a plurality of parameters relating to said window including the size of said window;

a console manager process for coordinating the operation of said picture manager process and said window manager process, said console manager process generating a second message, comprising size information, in response to a third message sent to said console manager process by said one application process, and providing said second message to said window manager process; and said window manager process adjusting the size of said window in response to said size information contained in said second message.

2. The human interface as recited in claim 1 wherein said console manager process generates a fourth message in response to a fifth message sent to said console manager process by said one application process, said fourth message comprising information relating to a second window, including information relating to the size of said second window; and means for creating a second window manager process in response to said fourth message, said second window manager process creating a second window on said video display unit screen onto said one picture, the size of said second window being determined by said size information contained in said fourth message, the sizes of said window and said second window being independent of one another.

3. The human interface as recited in claim 1 and further comprising:

an output manager process for coupling the informational content of said window to said video display unit for display thereon, said output manager process being responsive to a fourth message generated by said window manager process comprising information relating to picture elements from said window of said picture, said output manager process translating said information in said fourth message into viewable images on said screen.

* * * * *